United States Patent [19]
Dawson

[11] Patent Number: 4,893,612
[45] Date of Patent: Jan. 16, 1990

[54] RADIANT ENERGY COLLECTOR

[76] Inventor: Robert E. Dawson, 1656 Susquehanna Rd., Rydel, Pa. 19046

[21] Appl. No.: 121,716

[22] Filed: Nov. 17, 1987

Related U.S. Application Data

[63] Continuation-in-part of Ser. No. 124,032, Feb. 25, 1980, abandoned, which is a continuation of Ser. No. 907,151, May 17, 1978, abandoned.

[51] Int. Cl.$^4$ .............................. F24J 2/08; F24J 2/10
[52] U.S. Cl. .................................... 126/438; 126/440; 126/449; 350/442
[58] Field of Search ............... 126/438, 440, 449, 451; 350/445, 452, 442, 620

[56] References Cited

U.S. PATENT DOCUMENTS

| | | | |
|---|---|---|---|
| 1,393,573 | 2/1921 | Ritter | 350/452 |
| 1,575,309 | 3/1926 | Anderson | 126/449 X |
| 1,683,266 | 9/1928 | Shipman | 126/440 |
| 3,125,091 | 3/1964 | Sleeper, Jr. | 126/440 |
| 3,923,301 | 12/1975 | Winston . | |
| 3,957,031 | 5/1976 | Winston . | |
| 3,991,741 | 11/1976 | Northrup et al. | 126/440 |
| 4,002,499 | 1/1977 | Winston . | |
| 4,003,366 | 1/1977 | Lightfoot . | |
| 4,003,638 | 1/1977 | Winston . | |
| 4,011,855 | 3/1977 | Eshelman . | |
| 4,026,273 | 5/1977 | Parker . | |
| 4,048,982 | 9/1977 | Pei | 126/438 |
| 4,048,983 | 9/1977 | Pei | 126/438 |
| 4,058,110 | 11/1977 | Holt . | |
| 4,069,812 | 9/1978 | O'Neill . | |
| 4,116,223 | 9/1978 | Vasilantone | 126/440 |
| 4,131,485 | 12/1978 | Meinel et al. . | |
| 4,171,695 | 10/1979 | Sletten . | |
| 4,230,094 | 10/1980 | Szulmayer | 126/440 X |
| 4,252,107 | 2/1981 | Horton | 126/438 |

OTHER PUBLICATIONS

Solar Energy Handbook, Ametek Inc., Chilton Book Company, Radnor, PA., Second Edition, 1979–1984, pp. 97–98.

Primary Examiner—Margaret A. Focarino
Attorney, Agent, or Firm—Pollock, Vande Sande & Priddy

[57] ABSTRACT

This disclosure describes collectors of solar and other types of radiant energy that are inexpensive and of simple design yet capable of capturing radiation with high levels of efficiency as the incident angle of radiation varies. In a preferred embodiment, a lens extending across the mouth of a bowl-like reflector and around its central axis causes rays entering the lens at an angle to the axis on the side of the lens closest to the energy source to refract and pass directly from the lens to the absorber and causes other similarly angled rays entering and departing the lens on the other side of the axis to refract in an upward direction as they pass to the reflector and then to the absorber, i.e., upward as compared to the extended traces of the incident rays. The reflector and an absorber within it, both shaped and spatially related to cooperate with the lens, capture major proportions of refracted radiation as the angle of incidence changes, thus minimizing energy losses that could otherwise occur through re-reflection of rays from the reflector and out through the lens. Also disclosed are improvements, in absorber-reflector-lens combinations, including polygonal, segmented reflector walls, sectored lenses and lenses with bi-directionally divergent prismatic elements for emitting rays from the lenses to the reflectors and absorbers with both vertical and horizontal refraction vectors which can assist in reducing re-reflection energy losses and in spreading incident rays across the available surface areas of the absorbers.

33 Claims, 29 Drawing Sheets

(A)      (B)      (C)

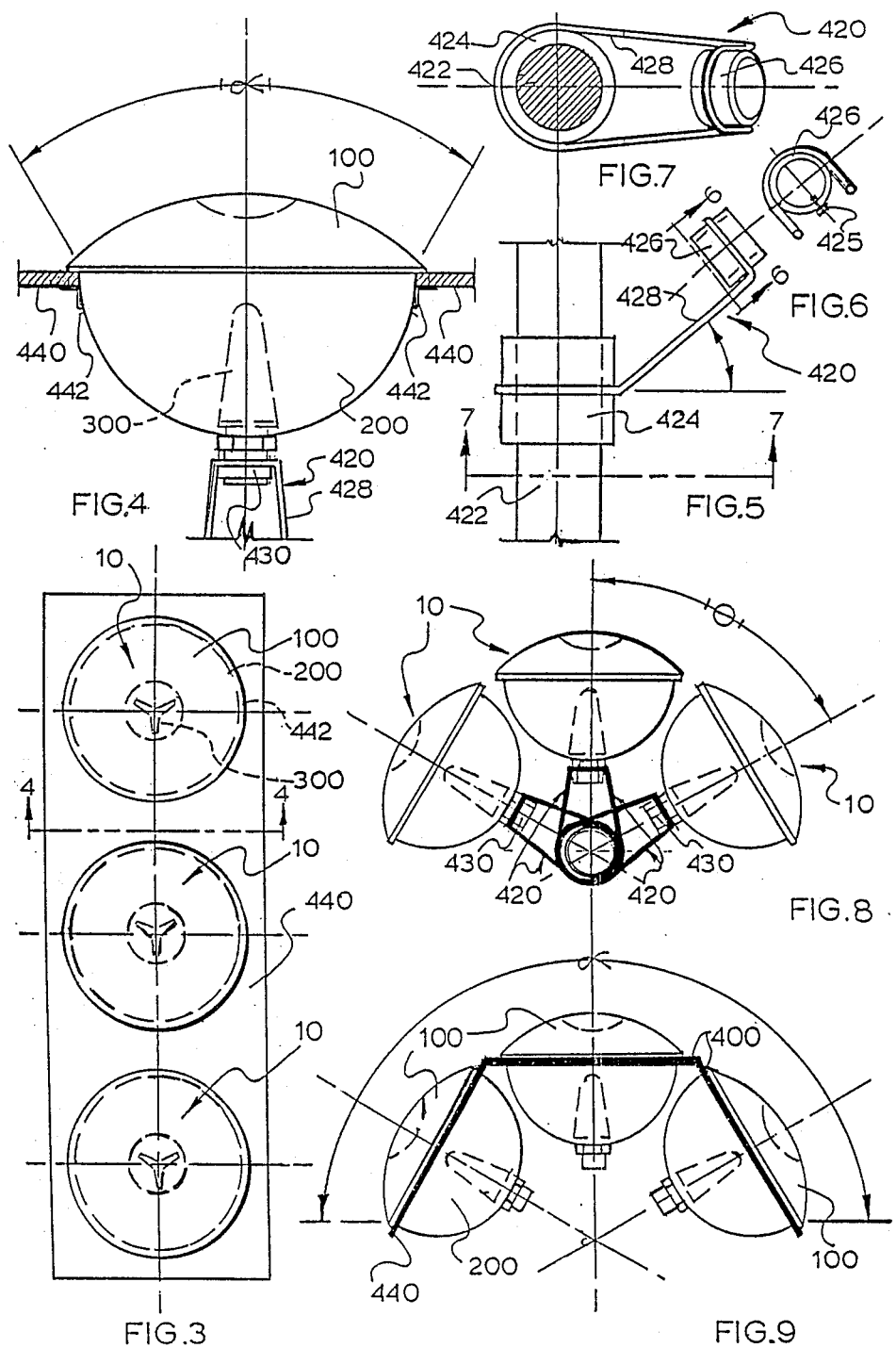

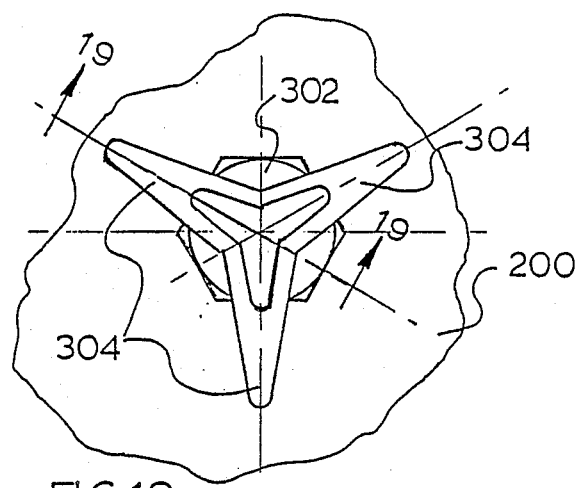
FIG.18
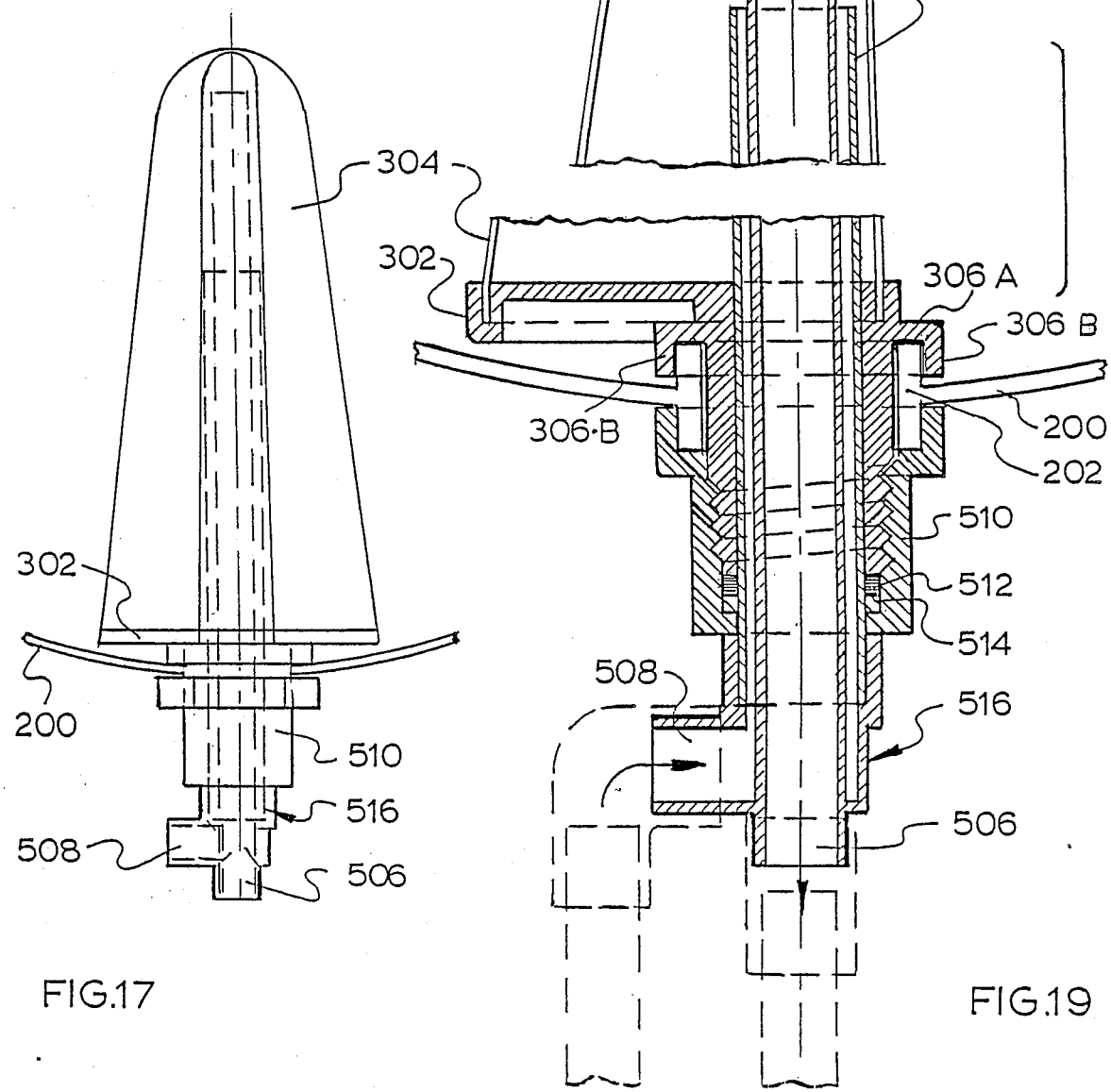
FIG.17
FIG.19

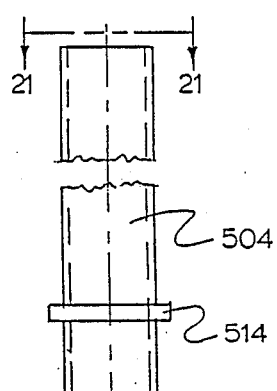
FIG.20
FIG.21
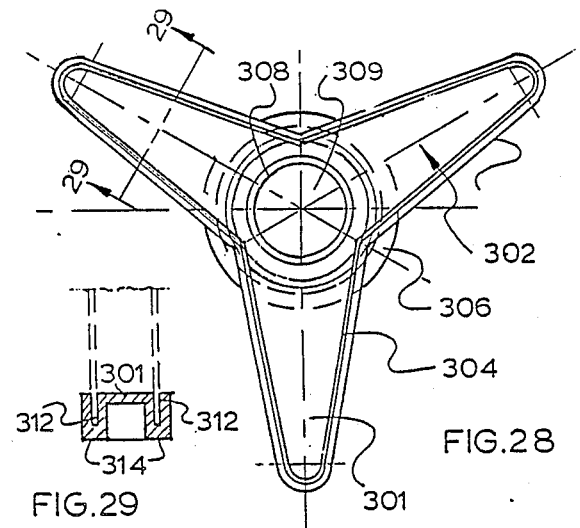
FIG.28
FIG.29
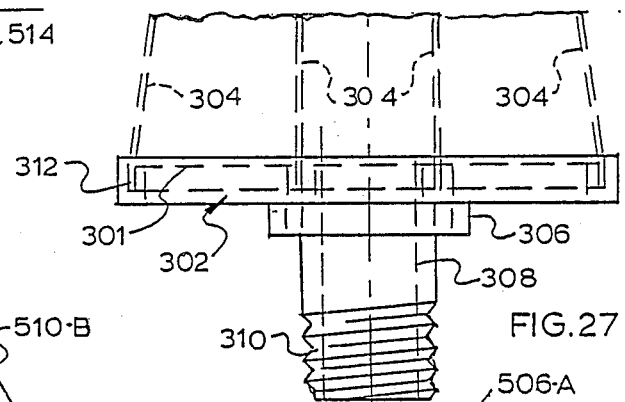
FIG.27
FIG.26
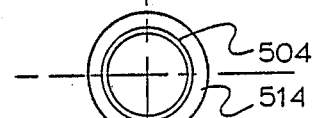
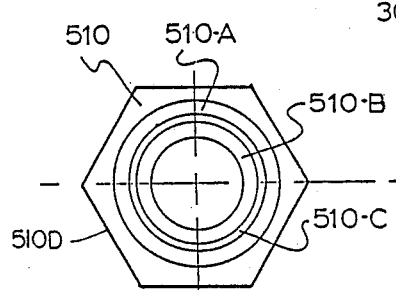
FIG.23
FIG.22
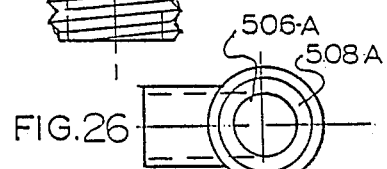
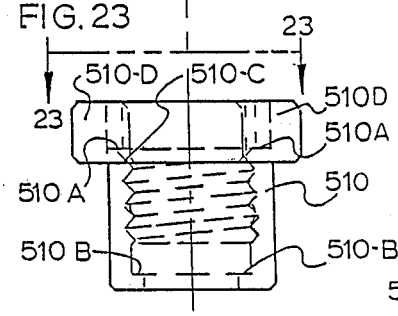
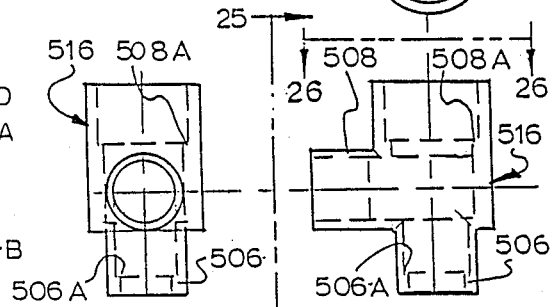
FIG.25
FIG.24

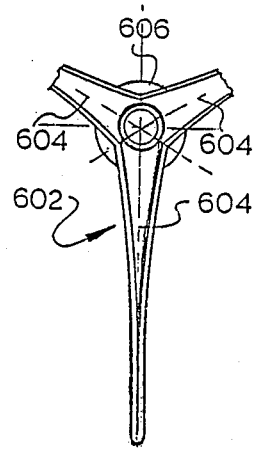
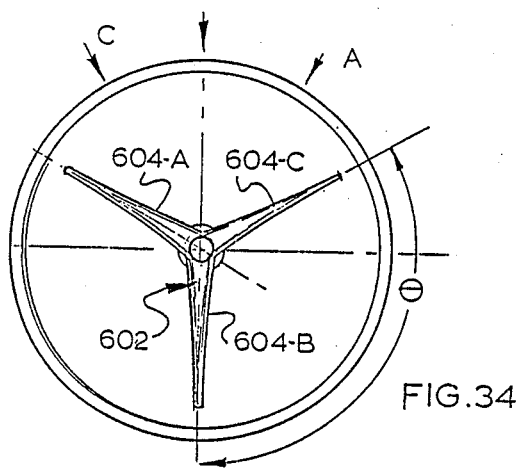
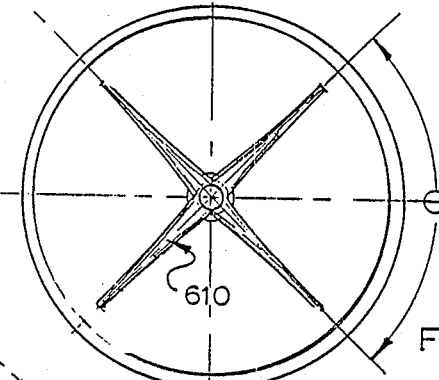
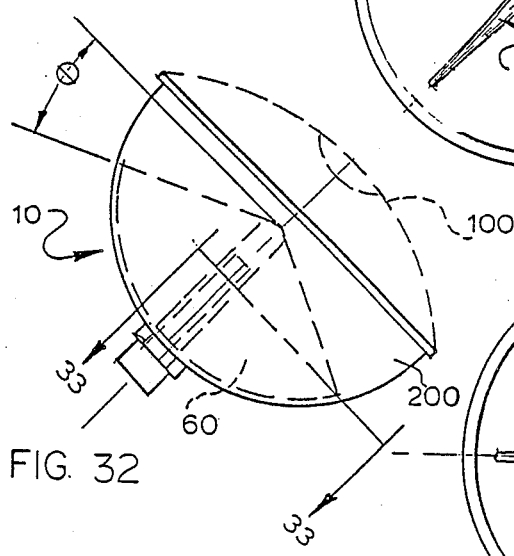
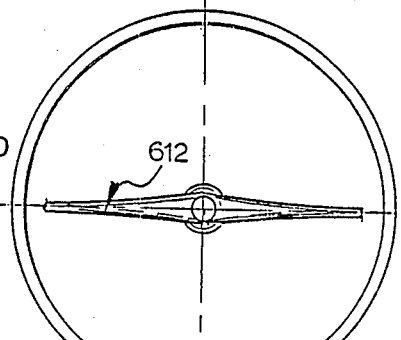
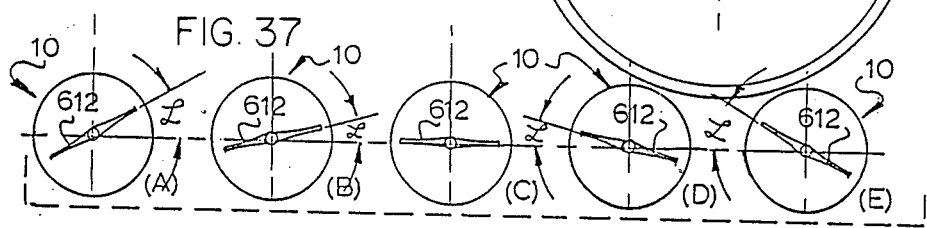
FIG. 33
FIG. 34
FIG. 35
FIG. 36
FIG. 32
FIG. 37

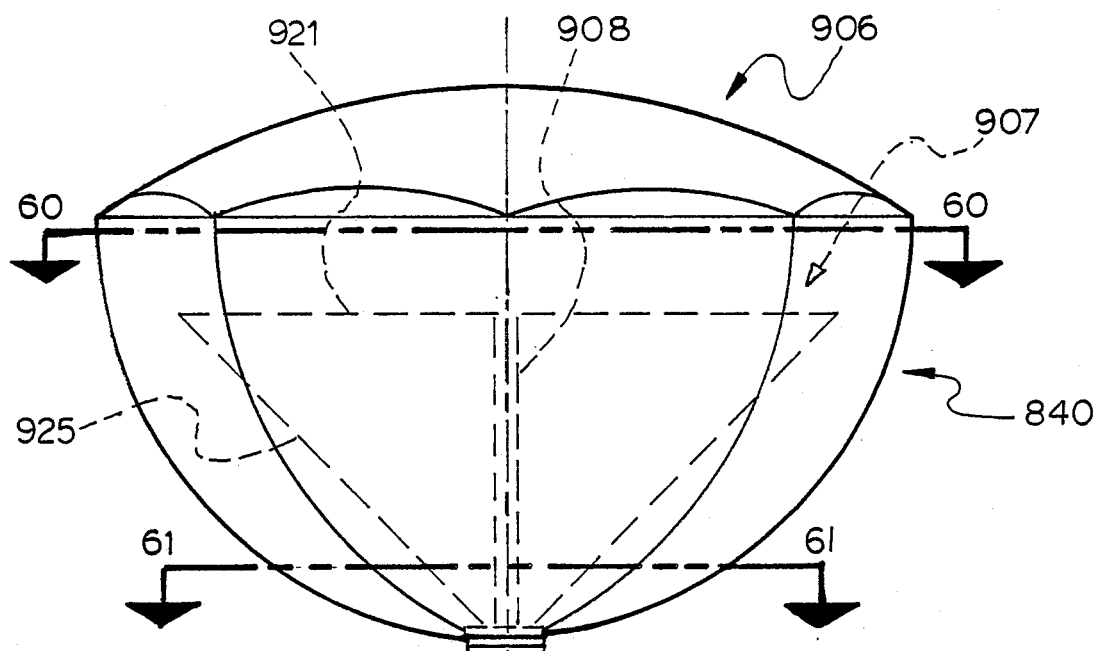
FIG. 59
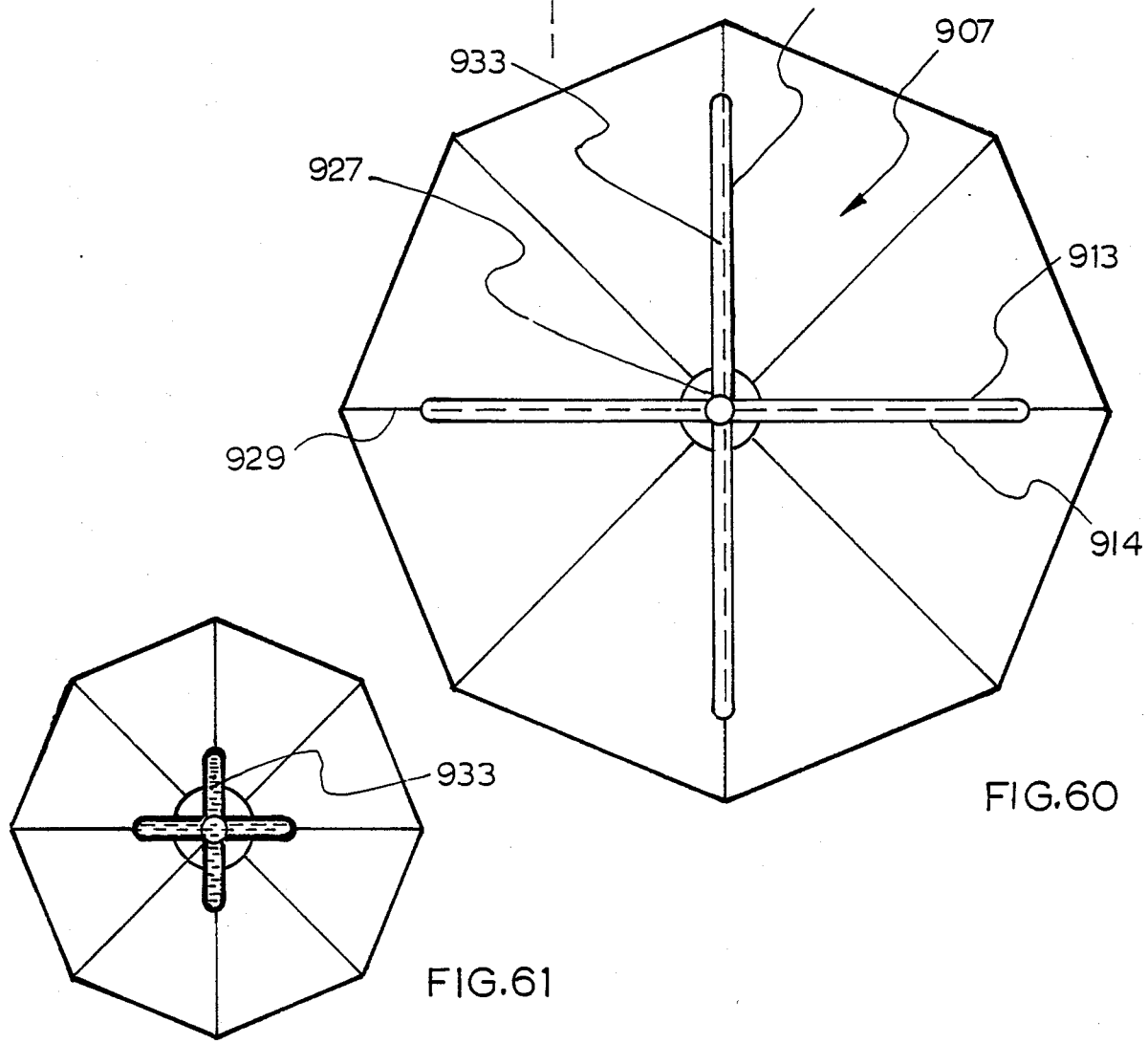
FIG. 60
FIG. 61

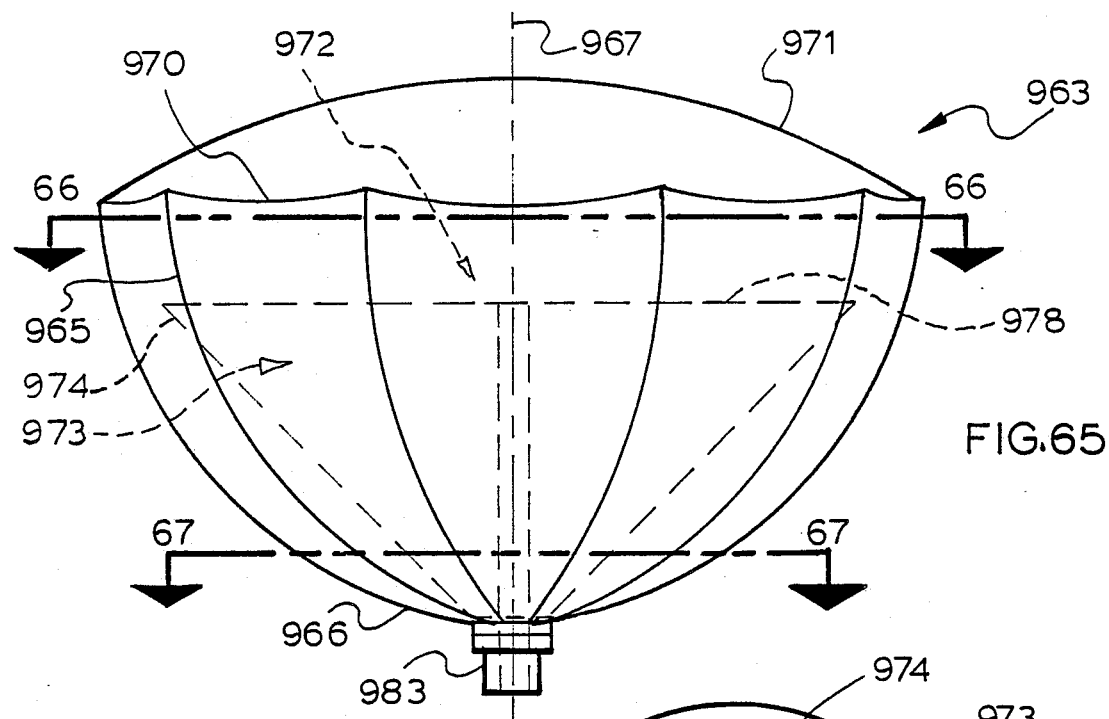
FIG.65
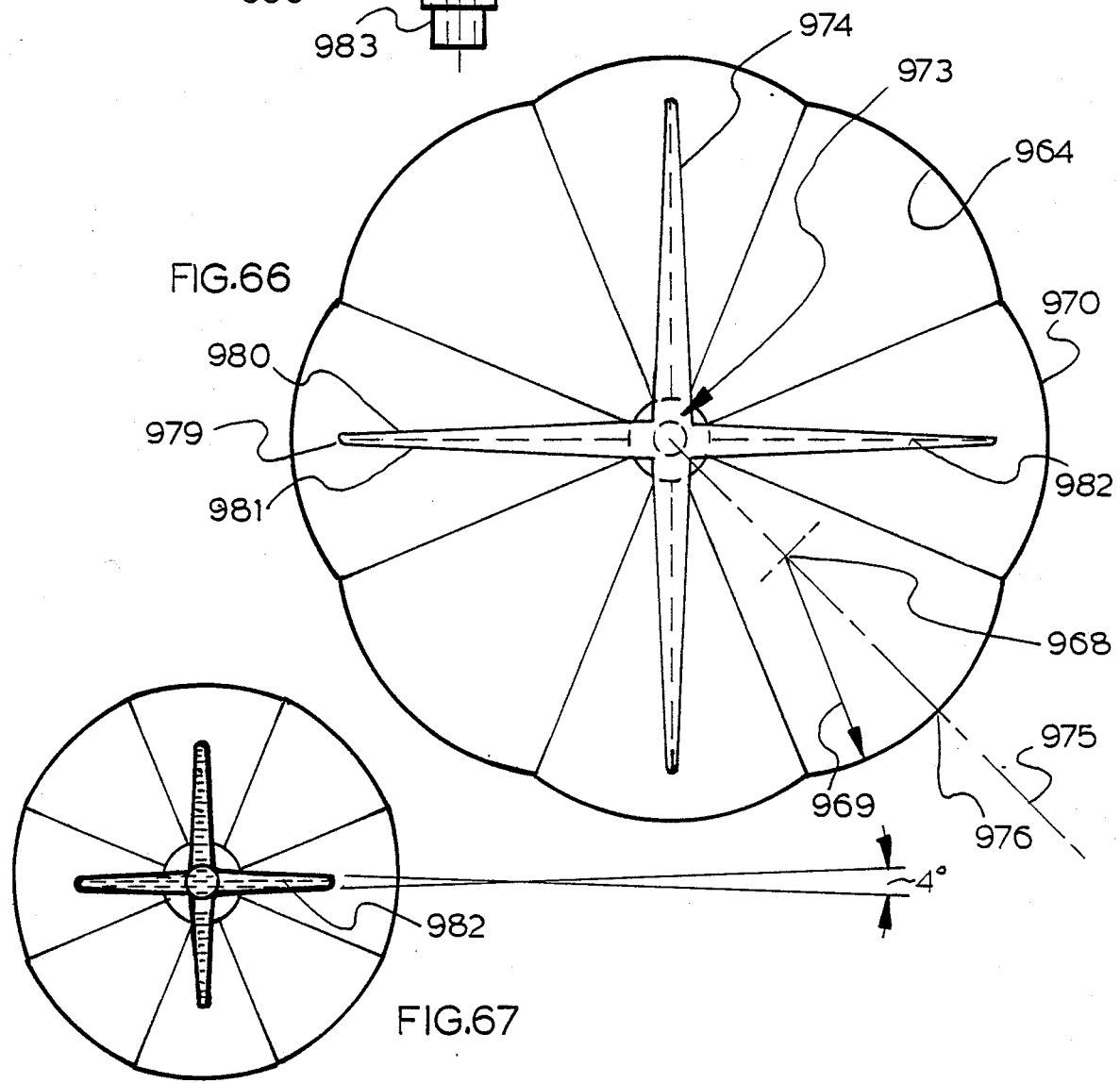
FIG.66
FIG.67

RADIANT ENERGY COLLECTOR

This is a continuation-in-part of U.S. patent application Ser. No. 124,032, filed Feb. 25, 1980, now abandoned which was a continuation of U.S. patent application Ser. No. 907,151, filed May 17, 1978, now abandoned, both of said applications being applications of the applicant herein. Pursuant to 35 U.S.C. §120, applicant claims herein the benefit of the filing dates of both of said prior applications, the entire contents of which are hereby incorporated by reference.

BACKGROUND OF THE INVENTION

The present invention relates to the field of radiant energy collectors, and more particularly to the field of solar energy collectors which utilize at least one lens to refract light that is eventually absorbed by an energy absorbing surface.

A general review of the state of the art in this area is present in the definition report for the National Solar Energy Research, Development and Demonstration Program of the Energy, Research and Development Administration (June, 1975). This report highlights the fact that cost effectiveness is a major concern with solar energy collection devices. In particular, there is a definite need for low cost concentrators with high reliability and long life. Since installation of these concentrators in large numbers is often desirable, the units should preferably be easy to handle, easy to mount in any one of a variety of locations, and easy to maintain. Finally, in the event that one or more of the components thereof fails, the unit should be sufficiently economical to permit replacement rather than repair. There is also a need for collectors capable of maintaining high levels of efficiency as the angle of incidence of the radiation varies substantially, so that tracking equipment, which is expensive, can be dispensed with if desired. Collectors exhibiting these advantages should have utility in collecting solar and other forms of radiant energy fluxes.

A need continues to exist for simple, truly cost effective radiant energy collection units possessing the above described advantages.

SUMMARY OF THE INVENTION

I have invented an improved radiant energy collector for receiving and collecting incident radiation which is not only extremely efficient, but also amenable to low cost, mass production techniques.

In general, my radiant energy collector comprises an absorber; reflector means surrounding the absorber and having an upright axis and a concave reflective inner surface distributed about the axis for reflecting said radiation onto the absorber; and a lens member extending across the axis of and above the reflector means for receiving an energy flux from a source of radiant energy. A plurality of prismatic elements are distributed about the reflector axis in the lens member for (1) receiving incident radiation on one side of the axis from a source located on the other side of the axis, the axis being viewed from a position perpendicular to a plane including the axis and passing through the source, and (2) maintaining, during variation of the angle of incidence between the incident radiation and the axis as viewed in said plane, refraction of the incident radiation and emission of the resultant refracted radiation through emitting surfaces of the prismatic elements which are inclined for continuing, during such variation to direct radiation away from the source, above the absorber and toward the reflector with an upward component of refraction as compared to the inclination of the incident radiation and to distribute the resultant reflected radiation across a portion of the absorber which faces away from the energy source In this simple, cost effective combination, re-reflection and loss of rays can be controlled and the collector can operate efficiently throughout a substantial range of angles of incidence. In accordance with the invention, the prismatic elements may be configured to maintain the above-described refraction, emission and distribution of radiation during relative variations of about 20° or more in the source elevation and/or azimth. Also, the lens member may simultaneously direct different parts of the flux to portions of the absorber respectively facing toward and away from the source.

Earlier preferred embodiments of this invention, described in Serial Nos. 907,151 and 124,032, basically comprise a hemispheroidal or bowl-shaped reflector means which mates with a lens specially configured lens member to cooperate with the interior reflecting surface of the reflector means to concentrate a maximum amount of incident rays on an absorber disposed within the sealed cavity formed between the lens member and reflector means. According to one embodiment of the invention found in those applications, the lens member, which may if desired be or include a Fresnel-like lens element, substantially covers the reflector means and the absorber for transmitting substantially all of the radiation to the reflector means and the absorber. In this embodiment, the lens member includes an inward portion and an outward portion, the inward and outward portions being disposed about and respectively nearer and further from the reflector axis. The inward portion has elements for maintaining transmission of a first portion of the incident radiation into the reflector means while refracting the first portion into transmitted rays which diverge from one another. Also, the outward portion has elements for maintaining transmission of a second portion of the incident radiation into the reflector means while refracting the second portion into transmitted rays which converge with one another during variation of the angle of incident radiation relative to the axis.

According to a preferred embodiment of the above applications, the absorber comprises generally upright, angularly distributed wings extending outwardly from the axis of the reflector means. Such an absorber may be formed from a single sheet of material which has been die stamped into a multi-winged design which is supported by a base, the stamping being sealed at its edges to the base to form a sealed absorber cavity.

These earlier embodiments included novel circulation means to cooperate with the absorber unit and clamp the absorber and circulation means to the reflector element through an aperture formed therein, while at the same time sealing the circulation means with respect to the aperture formed in the absorber base to prevent leakage from the unit. This circulation means, which may comprise a minimum number of easily extruded or molded plastic components, can be provided in any one of a number of alternate designs depending upon the dwell time, heat and output requirements of the particular unit. For example, in one embodiment the circulation means is adapted to form a mist or spray within the absorber chamber for the purpose of encouraging vaporization. In another alternative the circulation path is adapted to take advantage of natural convection of liquid within the absorber chamber so that the warmest liquid is decanted from the chamber and delivered to the collector's output. According to a third option the circulation means is configured to prevent complete drainage of liquid from the absorber in its non-operative mode to thereby protect the absorber from overheating. A counter-current fluid jacket conveying cooler input fluid into the absorber can be provided so that it surrounds a central conduit which conveys a hot output stream into the absorber, thus protecting the portion of the reflector which is adjacent the reflector aperture. The lens and reflector elements may be injection molded with peripheral configurations which snap together to form at least a dust seal therebetween. Since the absorber and circulation units can similarly form a seal with respect to the reflector, dust and dirt can be excluded from the interior of the unit, which is also readily adapted for evacuation, if desired. A simple "screw together" design enables the absorber and circulation means to be easily fitted and sealed with respect to the reflector element, thereby facilitating the rapid assembly or disassembly of the unit by an ordinary mechanic.

The prior applications also disclose the additional and more specific concept of a radiant energy collector which comprises a concave reflector means having a reflective inner surface, a mouth and a central axis, and additional components described below. In the reflector means there is an absorber having a plurality of generally upright, angularly distributed wings extending outwardly from the reflector means axis. A lens member is positioned above the absorber and across the mouth and the axis of the reflector means. It includes a plurality of prismatic elements distributed upon said lens member. These elements receive incident radiation on one side of the axis from a source located on the other side of the axis, the axis being viewed from a position perpendicular to a plane including the axis and passing through the source. Also, the elements maintain, during variation of the angle of incidence between the incident radiation and the axis as viewed in said plane, refraction of the incident radiation and emission of the resultant refracted radiation through emitting surfaces of the elements which are inclined for continuing, during such variation, to direct radiation away from the source, above the absorber and toward the reflector with an upward component of refraction as compared to the inclination of the incident radiation and to distribute the resultant reflected radiation across an absorber wing surface facing away from the energy source. Thus, the re-reflection and loss of rays is controlled and the absorber can operate efficiently throughout a substantial range of angles of incidence.

FIGS. 1-37 herein, and the related descriptive text, disclose the embodiments of the prior applications. When those embodiments are compared with the improvements found in FIGS. 38-78 and the related text herein, it will be seen that the prior embodiments and the present improvements have certain common features.

In common with the prior embodiments, the improved radiant energy collectors disclosed herein include a concave reflector with an upright absorber therein and a lens member mounted above the absorber. As viewed in vertical cross-section, the reflector has bottom and side walls including portions which are more nearly vertical than horizontal. The reflector also has an upright axis upon which the lens member and absorber are positioned. A plurality of wing members is included in the absorber, and these have energy absorbing walls of substantial surface area that are oriented substantially upright and define opposite sides of the respective wing members. As viewed in plan view, the lens member comprises a plurality of prismatic elements which are distributed in one or more arrays in a working portion of the lens member, extending about the above-mentioned axis.

In common with the prior embodiments, the prismatic elements, as viewed in vertical cross-section, have receiving and emitting surfaces which, within individual elements, diverge from one another and which are oriented and positioned in said lens member for performing several functions. First, the primatic elements receive, on both sides of the aforementioned axis, the incident rays of an incoming flux from an energy source. Radiation is received at varying angles of incidence within a predetermined range of acceptance angles which are measured relative to the axis. Secondly, these elements emit departing rays into a space defined by the walls of the reflector and direct portions of the flux in specified ways. The above-mentioned angles of incidence are measured in, and the axis and rays are viewed along a line of sight perpendicular to, a plane including the axis and passing through the energy source.

As in the prior embodiments of the earlier applications, the departing rays constitute portions of the flux which originally entered the lens. The prismatic elements are oriented and positioned to operate on a first portion of the flux which was at least partly composed of a portion of the rays which entered the lens on the side of the axis farthest from the source when viewed along a line of sight perpendicular to the above-mentioned plane. The prismatic elements are so positioned and oriented to cause this first portion of the flux to pass through the lens, to refract toward adjacent side walls of the reflector and to impinge upon and reflect from the reflector surface at higher impingement elevations than would occur in the absence of the above-mentioned divergence of the receiving and emitting surfaces of the prismatic elements. Also, the prismatic elements operate on a second portion of the flux which previously entered the lens member, and this second portion of the flux is at least partly composed of a portion of the rays which entered the lens member on the side of the axis nearest the light source when viewed along a line of sight perpendicular to the above-mentioned plane. This second portion of the flux is caused to pass directly from the lens to the absorber. In such manner, the prismatic elements cooperate with the reflector and absorber for directing portions of the flux to opposite sides of the wing members. Thus, the reflector, lens and absorber have the capability of promoting retention of emitted and reflected rays within the space between the lens member and reflector.

According to a particularly preferred embodiment disclosed in the present application, the emitting surfaces of the prismatic elements in the above-described radiant energy collector are generally planar, bi-directionally inclined surfaces. These are oriented and positioned in the lens member for causing the first portion of the flux to refract with both upward and sideward components of refraction toward adjacent side walls of the reflector and to reflect from said reflector to said absorber wing surfaces. Thus, this embodiment provides "vertical control" of the light, i.e. refracting same with an upward component, along with "horizontal control", i.e. causing said refraction to occur with sideward components of refraction.

Radiant energy collector units including provision for vertical, horizontal or both vertical and horizontal control of the radiant energy, as above-described, are particularly effective when provided with polygonal reflectors in which the wing members extend towards alternate corners of the polygonal figures. The prismatic elements may be arrayed in concentric rings or along first and second perpendicular sets of parallel lines, as described in greater detail below. Certain of the prismatic elements in these arrays may beneficially be arranged to laterally spread emitted radiation with opposite vectors. Also, additional benefits may be obtained through control over the generating loci of the walls of the polygonal reflectors, as described hereinafter.

According to a particularly preferred embodiment, the radiant energy collector is adapted for receiving rays of an incident flux from an external energy source throughout a range of acceptance angles extending to at least about 20° away from opposite sides of a central axis of the collector and measured in a plane passing through said source and including the axis. In this particularly preferred embodiment the collector comprises a concave reflector bowl having a reflective internal surface and a convex lens member secured to one another, thereby providing an enclosed cavity between them. The reflector bowl and lens member are each arranged in a substantially symmetrical manner about this axis.

In this embodiment, an upright absorber is mounted within the above-mentioned cavity and includes a plurality of wing members extending laterally from the axis and toward the inner surfaces of the reflector bowl. These wing members have energy absorbing walls of substantial surface area which define opposite sides of the respective wing members. Oriented substantially upright, these walls define confined fluid heating passages between them.

The concave reflector bowl of this embodiment has a ratio of axial depth, as compared to its width at its mouth, of about 0.6 to about 0.7 to one. This bowl is defined at least in part by a plurality of side wall segments arranged substantially symmetrically about the reflector axis. These, as viewed in plan view or horizontal cross-section, form generally polygonal figures with straight or gently curved convex or concave sides. Narrowing in width as they draw progressively nearer the bottom of the bowl, these segments, as viewed in vertical cross-section, extend downwardly from an upper region of the reflector side walls while curving inwardly toward the bowl axis.

In this same embodiment, within a working portion of the reflector bowl viewed in vertical cross-section, these inwardly curving side wall segments transition from upper sidewall portions which are substantially upright, to a more nearly horizontal orientation as the segments draw nearer to the axis and the bottom of the bowl. These transitions in the wall segments include one or more arcuate intervals which have been generated from at least one generating locus which is located above, and on the opposite side of the axis from, the position(s) of the interval or intervals themselves.

In this improved embodiment, the lens member, which preferably has a generally spherical overall shape includes a plurality of prismatic elements which are preferably integrally formed with the lens and project inwardly therefrom. These, as viewed in plan view, are distributed in one or more arrays in a working portion of the lens member disposed about the axis. As viewed in vertical cross-section, the prismatic elements have receiving and emitting surfaces. Within individual elements, these surfaces diverge from one another. Preferably, the emitting surfaces are generally planar, bi-directionally inclined surfaces. Preferably, whether the inclination of the emitting surfaces is mono- or bi-directional, the angle of inclination in at least one and preferably in each of said directions should approach within about 20% of and as near as possible to, but should be less than, the critical angle which will cause rays to be reflected by the emitting surfaces back through the lens when the radiation is incident upon the lens member at the maximum acceptance angle of the device.

These prismatic elements are oriented and positioned in the lens member for performing several functions. Among their functions are: (1) receiving on both sides of the axis the incident rays of said incoming flux which enter the lens member at varying angles of incidence within a predetermined range of acceptance angles measured relative to the axis, and (2) emitting departing rays into a cavity defined by the walls of the reflector and directing the flux as follows. The above-mentioned angles of incidence and acceptance angles are measured in, and the axis and rays are viewed along a line of sight perpendicular to, a plane including the axis and passing through the energy source.

A first portion of the flux, including a portion of the rays which entered the lens on the side of the axis farthest from the source when viewed along a line of sight perpendicular to the above-mentioned plane, is caused to pass through the lens and is refracted with both upward and sideward components of refraction towards adjacent side wall segments of the reflector. There, the first portion of the flux is caused to impinge and reflect from the side wall segments at locations which positioned laterally (horizontally) for impingement on the absorber wing surfaces and are higher than would occur in the absence of the bi-directional inclination of the receiving and emitting surfaces.

A second portion of the flux, including a portion of the rays which entered the lens on that side of the axis which is nearest the source when viewed along a line of sight perpendicular to the above-mentioned plane, is caused to pass directly from the lens to the absorber and may, during such passage, also be refracted downwards and sidewards. According to a preferred embodiment the prismatic elements cooperate with the reflector and absorber for directing portions of the flux to opposite sides of the wing member surfaces; this can afford an opportunity to direct flux to wing member surfaces which are located on near and far sides of such wings relative to the location of the source.

Sufficient separation should be provided between the underside of the lens member and the top of the absorber for light emitted by the lens member on one side of the axis to pass over the top of the absorber to a surface of the reflector located on the other side of the axis. Consistent with fulfilling this desideratum, it is preferred that the absorber wings extend sufficient distances outwardly from and both upwardly and downwardly in directions perpendicular and parallel to the axis, for intercepting substantially all or a major portion of the rays emitted by the emitting surfaces of the prismatic elements, as the angle of incidence of the flux varies throughout the full range of acceptance angles for which the collector is designed. In this embodiment, the reflector bowl and lens member exert both horizontal and vertical control over the path of the rays emitted into said cavity toward said reflector and, with said absorber, promote retention of emitted and reflected rays within said cavity.

There is no theoretical minimum to the acceptance angle, the device being well adapted to utilize light received parallel to the axis. However, it is anticipated that in order to take advantage of the invention most commercial embodiments will be designed to accept incident fluxes at acceptance angles ranging through at least about 20° away from both sides of the central axis of the collector. Another particularly preferred embodiment includes certain features in addition to those of the previous embodiment, but its range of acceptance angles extends to at least about twenty-two and one-half degrees when viewed from a position perpendicular to the above-mentioned plane which includes the axis, passes through the radiation source and moves with the radiation source through a range of azimuth angles of at least about 90°, more preferably at least about 135°, still more preferably at least about 180° and ideally about 360°. In the alternative, this range of azimuth angles should be sufficient to encompass the sun's azimuth angles between 10 AM and 4 PM at earth latitudes up to about 60°. In this embodiment, the prismatic elements are distributed substantially throughout at least about 50% of the area of the working portion of the lens member, viewed in plan view. Moreover, the prismatic elements are positioned in the above-mentioned array or arrays for causing the first portion of the flux to include the major portion of the total flux entering the working portion of the lens member when the flux is approaching its maximum acceptance angle. Also, the elements cause an amount of flux ranging from a major portion to substantially all of the total flux entering the working portion of the lens member to impinge upon the surfaces of the wing members as radiant energy enters the lens member throughout said range of acceptance angles.

Flux acceptance angles of 45° or more, meaning a 90° or larger cone of acceptance angles, are readily attainable through the improvements described herein. Thus, exertion of horizontal or both horizontal and vertical control over the path of the rays emitted into the cavity toward the reflector provide considerably improved efficiency of utilization of the radiant flux throughout a wide range of angles of incidence.

In each of the above embodiments the absorber wings or wing members have radiant energy absorbing means on (including "in") their outer surfaces. Thus, for example, the radiant energy absorbing surfaces may be blackened copper walls. These may enclose fluid chambers within the wings or wing members, and in such case the collector may include means for introduction and withdrawal of fluid into and from these chambers. Another type of useful energy absorbing surface is the radiation receiving surface(s) of one or more photovoltaic cells present or distributed on (including "in") the absorber wing surfaces. Such cell(s) may be used with or without the above-described fluid chambers. Other energy absorbing means may be employed with or without the winged absorbers which have been described herein to receive and make practical use of the radiant flux captured and controlled with a high level of efficiency by the lens and reflector of this invention.

According to an optional but preferred modification applicable to several of the foregoing embodiments, the lens member, as viewed in plan view, is divided into a plurality of sectors distributed about the axis. Members of a first group of inclined emitting surfaces present in at least a first sector of the lens face are inclined in a first direction for refracting rays with vectors having a given horizontal sense or orientation, while members of a second group of inclined emitting surfaces, present in a second sector of the lens, are inclined in a second direction for refracting rays with vectors having a horizontal sense or orientation divergent from or opposite to the first mentioned horizontal sense or orientation. Such an arrangement is particularly useful in maximizing flux acceptance angle and/or achieving efficient utilization of the several segmented walls and absorber surfaces.

According to another particularly preferred embodiment of the foregoing, the prismatic elements are distributed about the reflector axis and are inclined for maintaining, during relative variations of about 20° or more in the source elevation and azimuth respectively measured from and upon a plane perpendicular to the axis at the bottom of the reflector, refraction of the incident radiation and emission of the resultant refracted radiation through emitting surfaces of the prismatic elements. Moreover, such elements are inclined for continuing, during such variations, to direct radiation away from the source, above the absorber and toward the reflector with an upward component of refraction as compared to the inclination of the incident radiation and to distribute the resultant reflected radiation across a portion of the absorber which faces away from the source. In this manner, re-reflection and loss of rays can be controlled and the collector can operate efficiently throughout a substantial range of variation of the azimuth and elevation of the incident radiation.

According to another of its aspects, the invention provides a radiant energy collector for receiving and collecting incident radiation, comprising an absorber and reflector means surrounding the absorber and having an upright axis and a concave reflective inner surface distributed about the axis for reflecting said radiation onto the absorber. A lens member extends across the axis of and above the reflector means for receiving an energy flux from a source of radiant energy and has a group of prismatic elements distributed in one or more arrays substantially throughout a working portion of the lens and substantially surrounding the axis. In such arrays, individual elements are positioned at progressively greater distances from the axis and the horizontal dimensions of the majority of the elements, whether arranged in circular patterns or not, are sufficiently small to individually fit between pairs of radial lines separated by an angular interval of about 15 degrees or less.

These prismatic elements have emitting surfaces which are formed in the underside of the lens member and which are inclined for (A) maintaining, during relative variations of about 20° or more in the source elevation and azimuth measured from and upon a plane perpendicular to the axis at the bottom of the reflector, refraction of the incident radiation and emission of the resultant refracted radiation and (B) continuing, during such variations, to (1) direct radiation away from the source, above the absorber and toward the reflector with an upward component of refraction through the emitting surfaces of prismatic elements representing a substantial portion of the members of said group, the composition of which portion progressively shifts among different members of said group in response to said relative variations in source elevation and azimuth, and (2) distribute the resultant reflected radiation across a portion of the absorber which faces away from the source, whereby re-reflection and loss of rays can be controlled and the collector can operate efficiently throughout a substantial range of variation of the azimuth and elevation of the incident radiation. In particularly preferred forms of the foregoing, there are about 100 or more of said elements in said group, and/or the horizontal dimensions of the majority of the elements are sufficiently small to individually fit between pairs of radial lines separated by an angular interval of about 12° or less and/or the relative variations of the source elevation and azimuth are about 45° or more.

Objects

A primary object of the present invention is the provision of a high efficiency, low cost radiant energy collector able to meet a variety of energy collection requirements without need for mechanical moving parts.

Another aim of the present invention is the provision of a radiant energy collector featuring a novel injection or compression molded lens element.

A further object of the present invention is the provision of a solar collector having injection-molded lens and reflector elements which snap or bond together to enclose a novel high efficiency absorber.

A further object of the present invention is the provision of an improved solar collection system which is easily assembled from a minimum number of mass produced parts.

A further object of the present invention is the provision of a high efficiency solar collector having fixed lens and reflector portions, and alternate extended-wing absorber portions, including those which are movable.

An additional objective is to provide a maintenance free solar energy collector module which may be permanently positioned for high efficiency, wide angle, uniform collection of the solar radiant energy input, providing a high (e.g. three to one) lens face/absorber area ratio.

These and other objects of the present invention will become apparent from the following more detailed description.

BRIEF DESCRIPTION OF THE DRAWINGS

A number of illustrative embodiments of the invention are disclosed in the accompanying drawings, in which like reference numerals in the several figures identify like parts.

FIG. 3 is a front view of a multiple-unit, partition-mounted assembly of three solar collectors.

FIG. 4 is a cross section on an enlarged scale of a portion of the device illustrated in FIG. 3 taken on section lines 4—4 in FIG. 3, and also showing a portion of a pole support fitted therein.

FIG. 5 is a side view of a solar collector pole support shown mounted on a pole which is broken away.

FIG. 6 is a cross section of a portion of the pole support shown FIG. 5 taken as indicated by section lines 6—6 in FIG. 5.

FIG. 7 is a cross section of a portion of the pole support shown in FIG. 5, taken as indicated by section lines 7—7 in FIG. 5.

FIG. 8 is a top view of three solar colletors fitted on respective pole supports around a single pole.

FIG. 9 is a top view of three solar collectors which have been partition-mounted in a configuration similar to that illustration in FIG. 8.

FIG. 17 is an enlarged side view of an absorber and collection means shown mounted on a portion of a reflector element.

FIG. 18 is a top view of the device illustrated in FIG. 17.

FIG. 19 is a foreshortened and greatly enlarged cross section of the absorber and collection means of FIGS. 17 and 18 taken on section line 19—19 in FIG. 18.

FIG. 20 is a foreshortened side view of the peripheral input pipe illustrated in FIG. 19.

FIG. 21 is a top view of the peripheral input pipe illustrated in FIG. 20.

FIG. 22 is a side elevation of the sealing nut illustrated in FIG. 19.

FIG. 23 is a top view of the sealing nut of FIG. 22.

FIG. 24 is a side view of the T-fitting illustrated in FIG. 19.

FIG. 25 is a view of the T-fitting illustrated in FIG. 24 taken as indicated by the lines and arrows 25—25 in FIG. 24.

FIG. 26 is a top view of the T-fitting illustrated in FIG. 24 taken as indicated by the lines and arrows 26—26 in FIG. 24.

FIG. 27 is a side view of the absorber base illustrated in FIG. 19 showing the absorber wings fitted thereto in phantom.

FIG. 28 is a top view of the absorber illustrated in FIGS. 17–19.

FIG. 29 is a cross section of a portion of the absorber of FIG. 28 taken on section lines 29—29 in FIG. 28, showing the absorber wings in phantom.

FIG. 32 is a diagrammatic side view of a solar collector incorporating an alternative trilateral winged absorber.

FIG. 33 is a sectional view on an enlarged scale of a portion of the trilateral winged absorber of FIG. 32 taken on section lines 33—33 in FIG. 32.

FIG. 34 is a plan view of the device of FIG. 32 showing the position of the trilateral winged absorber with respect to the lens and reflector elements.

FIG. 35 is a plan view similar to FIG. 34 showing another alternative embodiment including a quadrilateral absorber, along with its relationship to the reflector and lens elements.

FIG. 36 is a plan view similar to FIGS. 34 and 35 showing a bilateral winged absorber and its relationship to the lens and reflector elements.

FIG. 37 is a series of diagrammatic views similar to FIG. 36 illustrating rotation of the bilateral winged absorber within the reflector and lens element unit to track the movement of the sun.

FIG. 59 is a side elevation of a collector including a schematic representation of a lens extending across the mouth of the reflector and an absorber shown in phantom line within the resultant cavity.

FIGS. 60 and 61 are sectional views of the collector shown in FIG. 59, taken respectively along section lines 60—60 and 61—61, showing horizontal sections at varying elevations through the wall segments of a polygonal reflector bowl and a section through a lower portion of the three winged absorber.

FIGS. 65-67 depict a further modification of the collectors of FIGS. 59-61 and 62-64. The segmented walls, as viewed in the sectional views 66 and 67, are shown to be convex, i.e. curved outward, and the absorber wings extend toward the vertical centerlines of the wall segments.

FIG. 77 is an enlarged cross-section of a portion of the edge of the absorber wing of FIG. 75.

FIG. 78 is a horizontal cross-section of the fluid control means taken on section line 78—78 of FIG. 76.

DETAILED DESCRIPTION OF THE PREFERRED EMBODIMENTS

Figure 1:
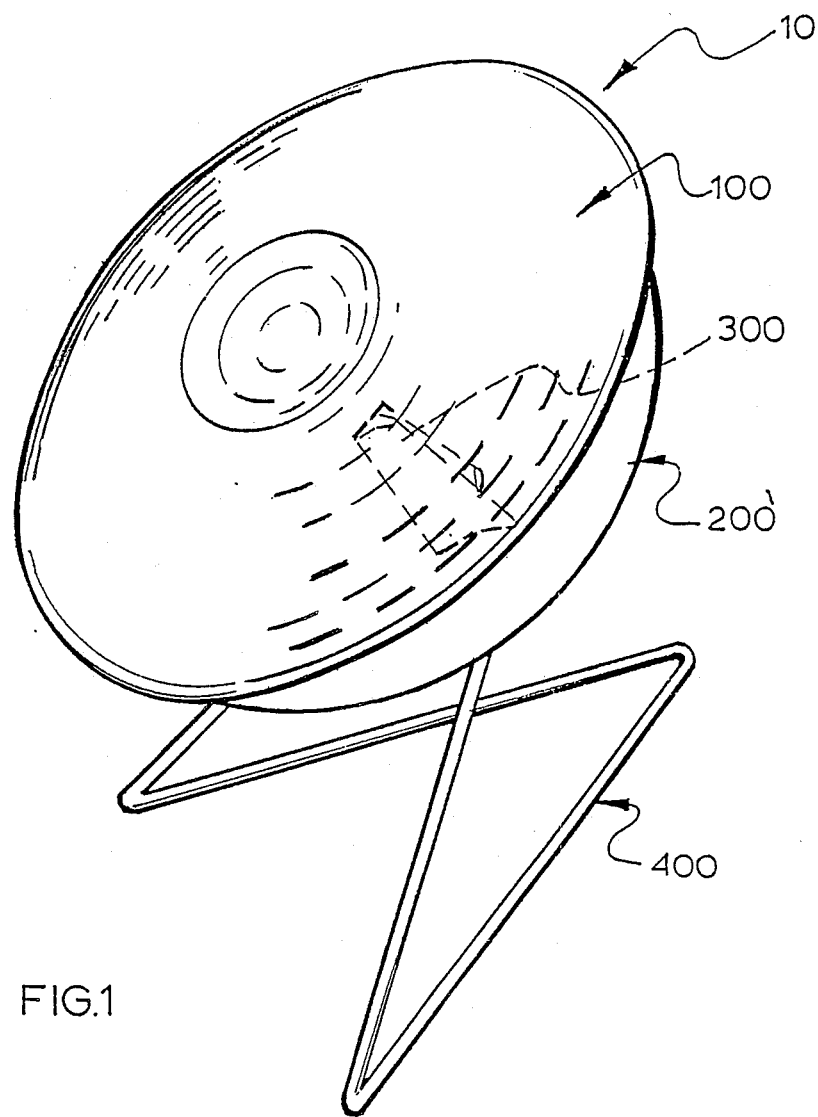
FIG. 1 is an isometric view of a self-supporting solar collector in accordance with the present invention.

Although specific forms of the invention have been selected for illustration in the drawings and the following description is drawn in specific terms for the purpose of describing these forms of the invention, this description is not intended to limit the scope of the invention which is defined in the appended claims.

Figure 2:
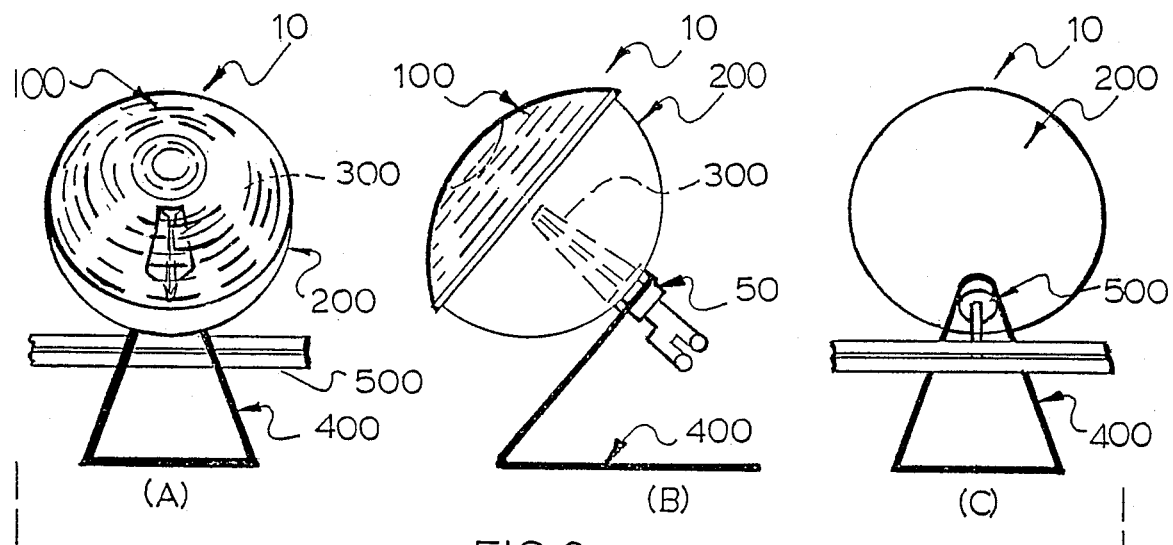
FIG. 2 illustrates the front (view a), side (view b), and back (view c) views, taken on a reduced scale, of the solar collector illustrated in FIG. 1.
Figure 10:
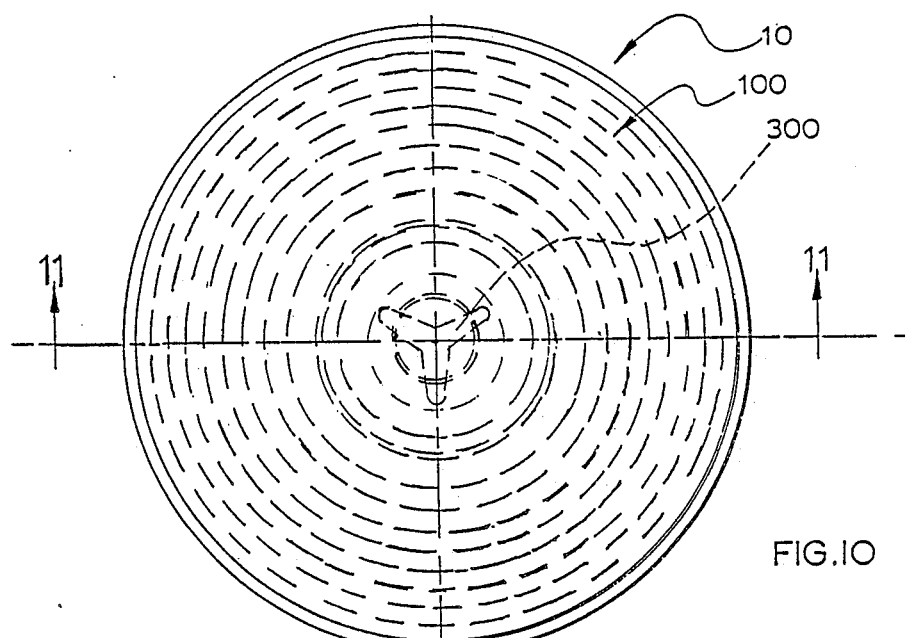
FIG. 10 is a plan view of the solar collector illustrated in FIG. 1, on an enlarged scale.

Referring now to FIGS. 1 and 2, the overall design of a collector, designated generally 10, is shown. The lens element designated generally 100, is sealed with respect to the hemispheroidal reflector element, designated generally 200, either by means of a snap fit or alternate attachment such as solvent or adhesive cement. The preferred embodiment absorber, designated generally 300, is seen to comprise a hollow, three-winged, tapered body, the base portion of which is disposed centrally, adjacent the bottom of the reflector element 200 and coaxially with the axis of the lens element 100, reflector 200 and circulation means, designated generally 500. In FIGS. 1 and 2a, 2b and 2c, collector stand 400 comprises a simple formed rod stand which attaches around a protruding portion of the circulation means 500 to support and orient the unit with respect to a horizontal supporting surface.

Referring now to FIGS. 3-9 alternate support means are illustrated. FIGS. 3, 4 and 9 show the adaptability of the preferred embodiment to partition mounting, that is, the mounting of one or more collector units 10 through apertures formed in partition supports 440. Preferably, as shown in FIG. 4, the lens element 100 is seen to overlap the periphery of collector 200 such that the edge of the lens element may cooperate with an annular, partition locking bracket 442 to clamp the unit in place. As seen in FIG. 9 a plurality of partitions may be disposed at 60 degree angles to one another to create a solar acceptance angle alpha which totals 180 degrees. It is therefore contemplated that numerous partitions such as the partition illustrated in FIG. 3 for vertically spacing the collectors may be combined in a manner as illustrated in FIG. 9 to create a tower having nine or more collector units mounted thereon, extending vertically to a desired height wherein the energy requirements of most installations are easily accommodated. The capacity of the present units to be mounted into large towers or on standards and to have central vertical fluid conduits is important in view of the ever increasing competition for favorable solar exposures, as for example, in concentrated population areas.

Referring now to FIGS. 4, 5, 6, 7, and 8, pole support 420 is illustrated which comprises a formed rod bracket 428 which extends between a pole coupling 424 encircling the pole 422 on which the collector is to be mounted, and a collector bushing 426 which is sized to encircle a protruding portion of the circulation means, as described more fully hereinafter. The formed rod is welded in grooves provided in the pole coupling and collector bushing for a secure and accurate assembly. As shown in FIG. 6 there is a set screw 425 in the collector bushing 426 which may be used to secure and orient the collector bracket. As with the partition mounted units shown in FIG. 9, the pole mounted units should be mounted at an angle of separation phi which is preferably 60 degrees.

Figure 13:
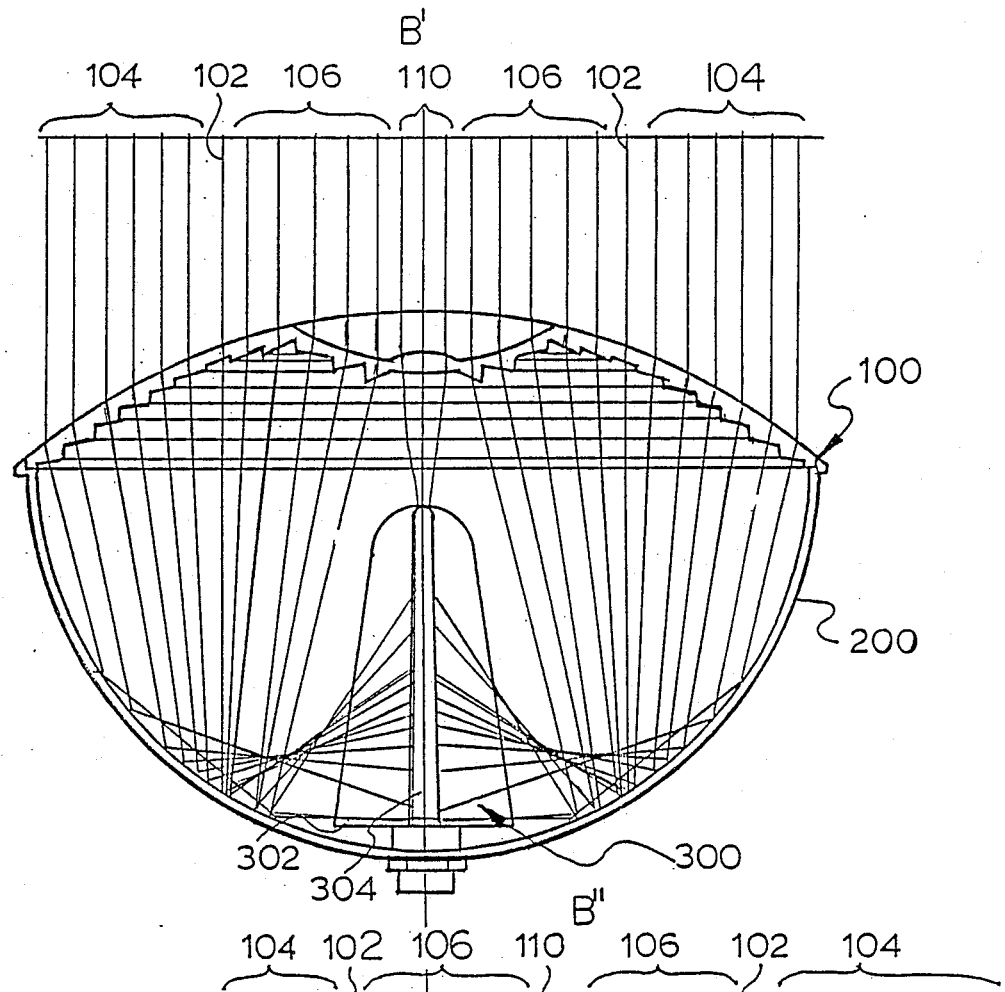
FIG. 13 is similar to FIG. 11 and has the one piece lens element of FIG. 12. It illustrates the paths traversed by solar rays in solar beam B' having an incidence angle of 0°.
Figure 14:
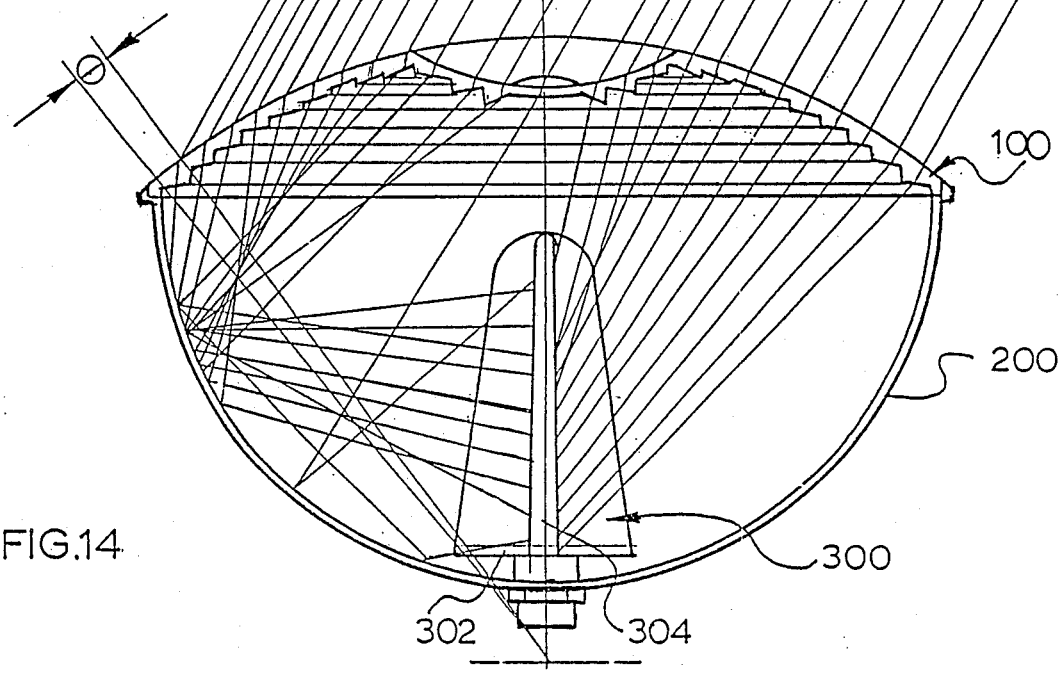
FIG. 14 is similar to FIG. 13 but shows the collection pattern of solar rays in beam B'' striking the device from a solar incidence angle of 30°.

FIGS. 10 through 16, illustrate the structure and function of one embodiment of the lens. The lens preferably has a substantially smooth outer surface which includes three portions: a first peripheral, substantially convex surface portion 112, an intermediate concave surface portion 114 and a central (double) convex lens portion 110. The inner surface of this embodiment includes a plurality of stepped annular ridges or rings which comprise concentric surfaces that refract light in a manner like that of a Fresnel lens. As seen from FIG. 14, the width of each annular ridge extends through an arc theta which is measured from the axis of the convex peripheral lens surface 112 referred to above. In this embodiment, $\theta$ equals between 2 and 5 degrees, and is preferably 3 degrees. The spheroidal section which comprises this lens surface 112 should preferably subtend a solid angle of 69-83 degrees, preferably 76 degrees, as illustrated in FIG. 14. The annular ridge portions are distributed over a portion of the lens inner surface which subtends a solid angle in the range of 61-75 degrees and surround the double convex central portion 110 referred to above. While the lens has been described as comprising a plurality of annular ridges, one of ordinary skill in the art will also understand such a lens may comprise a plurality of nesting-rings, the cross section of which may be flat, concave, or convex as required.

In order to accommodate a solar acceptance angle of a full 60 degrees, that is, plus or minus 30 degrees from the central axis of the collector, the lens element of FIGS. 10-16 has been designed to refract light impinging upon various portions of the lens surface in different manners. Each of the ridges or rings formed having one surface which is substantially parallel to the axis of the collector unit. These parallel or coaxial surfaces do not significantly contribute to the function of the lens. However, those surfaces of the ridges or rings which are transverse to the axis of the collector cooperate with the outer surface of the lens to refract the light transmitted therethrough.

Figure 11:
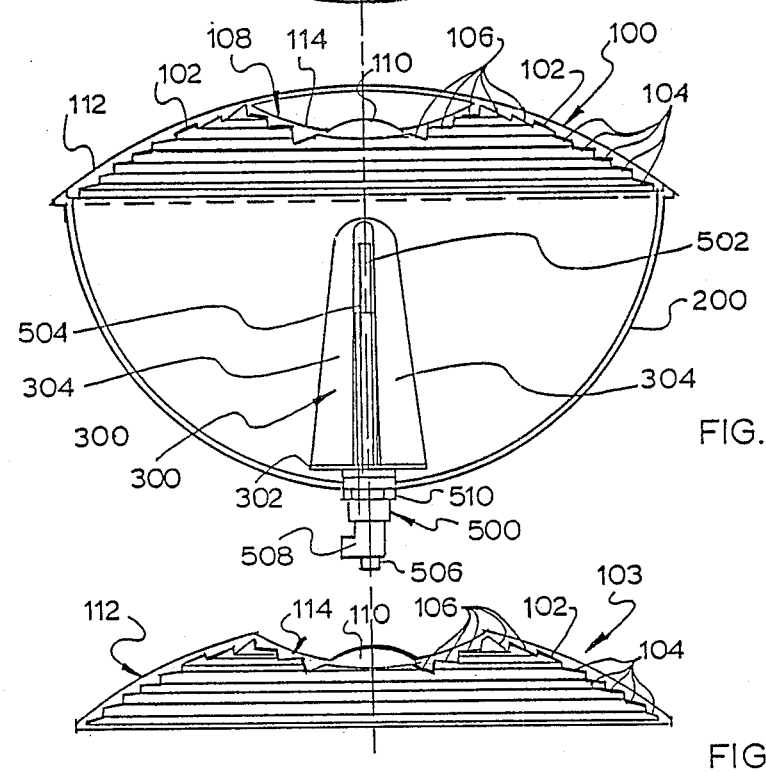
FIG. 11 is a transverse cross-section of the collector of FIG. 10 taken on section lines 11—11 of FIG. 10, said collector incorporating a two piece lens element.
Figure 12:
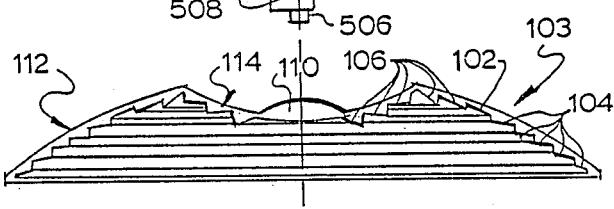
FIG. 12 is an alternate embodiment single piece lens element which may be substituted for the two piece element shown in FIG. 11.

As illustrated in FIG. 11, the annular ridge or ring portions may be divided into three different types. First, concentrating ridges or rings 104 are disposed around the periphery of the inner surface of lens element 100. Of the 69-83 degrees of arc in the lens surface which comprise ridge or ring portions, these concentrating ridges or rings 104 preferably subtend about 31-37 degrees. Accordingly, a minimum of three concentrating ridges or rings to a maximum of about eight concentrating ridges or rings should be provided, with the preferred number of ridges or rings being six, each having a $\theta$ value of 3 degrees. With extremely large lenses and/or when lenses are formed from extremely high strength materials, it may be desirable to increase the number of ridges or rings utilized to a maximum of 12-15, or even more.

Concentrating ridge or ring portions 104 cooperate with corresponding parts of the outer convex surface portions 112 to form a series of concentric double convex lenses of stepped magnifications. As seen particularly in FIG. 13, the degree of refraction of light rays 104' decreases proportionally from ridge to ridge or ring to ring towards the center of the lens element. As seen in particular at the right hand side of FIG. 14 the degree of refraction produced by the outermost concentrating ring 104 is selected such that, light B" which impinges upon the collector at a solar incidence angle of 30 degrees will be refracted in the proper direction to directly strike the base of absorber 300. Each of the other rays refracted by that lens half will also strike the absorber directly.

The second type of annular ridge or ring portions is seen in FIGS. 10-14, a non-refracting channel 102 centered between concentrating ridges or rings 104 and diverging ridges 106. Channel 102 is an annular portion of the lens wherein the exterior and interior surfaces are substantially parallel such that the direction of light rays, as for example 102' and 102" in FIGS. 13 and 14, are unchanged as they are transmitted through the lens. In this embodiment, this non-refracting channel occupies between 0 and 10 degrees of the total lens arc.

The third type of annular member is illustrated by diverging ridges or rings 106 formed near the central portion of the lens. They act in a manner opposite to that of concentrating ridges 104 in that they cause incident light to diverge, as illustrated by rays 106' and 106" in FIGS. 13 and 14. As with the converging ridge portions 104, the diverging ridge portions preferably comprise from 31-37 degrees of the lens arc such that there are preferably at least three and up to eight annular diverging ridge portions 106, and most preferably five of such portions. However, unlike the concentrating ridge portions 104, each of which coacts with the outer surface of the lens element to function as a double convex lens, diverging ridge portions 106, subtending 15-18 degrees of the lens arc, act in cooperation with the outer surface of the lens element 100, to form a series of concentric, concave-convex lenses. The remainder of the diverging ridge portions 106, these being more centrally located in the lens, function in combination with the concave outer surface portion of the lens 114 to form a series of concentric double concave lenses. As seen from FIG. 13, the degree of divergent refraction of light increases proportionally from nonrefracting channel 102 towards that diverging ridge portion which is immediately adjacent the double convex central portion 110 at the center of the lens.

FIGS. 13, 14, 15 and 16 illustrate the function of the lens design and its ability to capture light striking the collector with an angle of incidence plus or minus 30 degrees from the central axis of the collector. In FIG. 13, light beam B' is parallel to the central axis of the collector. Only the light rays 110', which impinge upon the double convex portion of the lens element, strike absorber 300 directly. The other rays bounce off the reflector surface to strike the absorber at no more than about a 55 degree angle, said angle being measured from the normal of the absorber surface. In this arrangement, only those rays passing through the outermost peripheral concentrating ridge bounce twice off the inner surface of the reflector 200, thereby minimizing reflective loss.

In FIG. 14, the angle of incidence of solar beam B" is 30 degrees, measured from the central axis of the collector. In this instance, all of the rays transmitted through the ridge portions on the "near side" of the lens (the side nearest the sun) strike the absorber directly. However, while the rays which pass through the double convex central portion and through the ridge portions on the "far side" of the lens strike the absorber at an angle almost perpendicular to wing 304 after. In most instances, these bounce only once off the interior surface of the reflector 200.

FIGS. 13 and 14 also illustrate the concentration of solar energy on the absorber. For example, a five inch wide band of solar energy entering the lens face is concentrated to a three inch width on the absorber.

Figure 15:
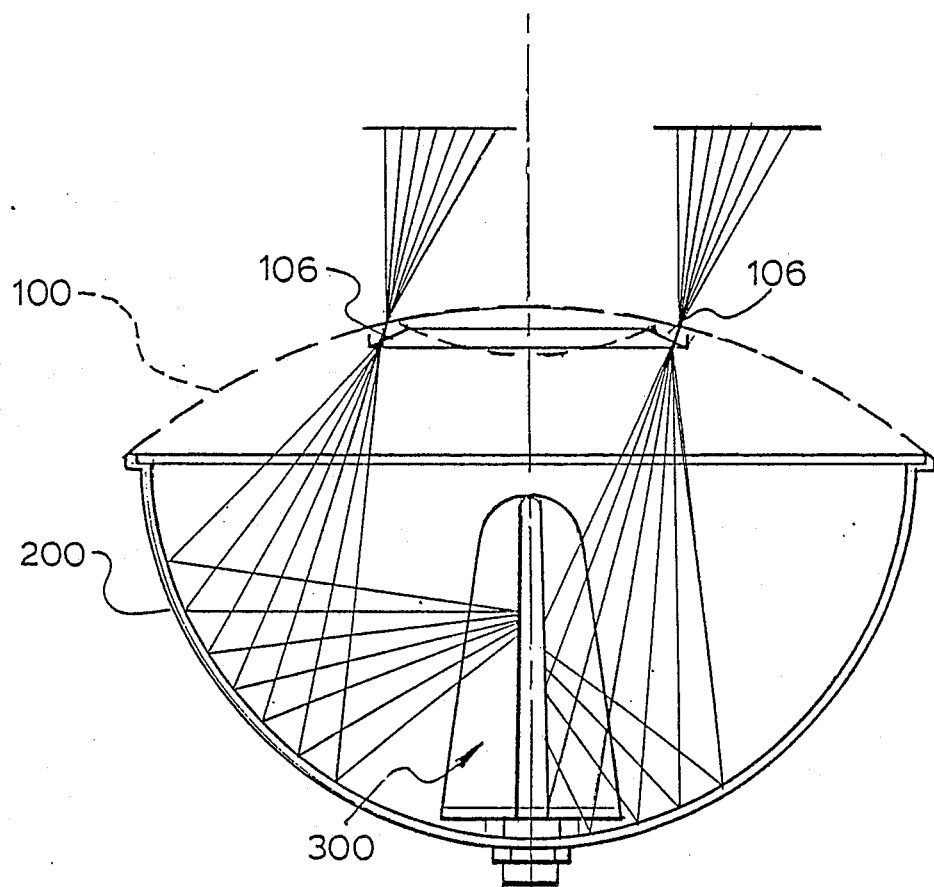
FIGS. 15 and 16 are similar to FIGS. 13 and 14 but, for purposes of simplicity, show only a single refracting ring of the lens element its pattern of energy collection at solar acceptance angles of 0° and 30°.

Referring now to FIG. 15, the collection pattern for a single diverging concavo-convex ridge portion 106 is shown for solar acceptance angle varying from 0 to 30 degrees. This figure simulates the movement of the sun across the face of the collector and illustrates the fact that nearly the entire interior surface of the reflecting element 200 can be utilized.

FIG. 15 additionally illustrates the total reflection of solar energy entering an optic ring 106, as well as the variations in travel patterns in the far and near sides of the collector. The near side energy is being spread over a large area of the absorber and overlaps similar energy being directed by an adjacent optic ring 102 (as detailed in FIG. 16), while on the far side, energy continues to impinge on the absorber as the sun moves through a wide range of impingement angles.

In this embodiment, the reflector element 200, is a vacuum metallized or metal plated injection molded plastic hemisphere having a radius equal to about two-thirds the lens diameter. The outer peripheral convex surface 112 of the lens may also be spherical, having a radius which is 1.35 to 1.85 times the radius of the reflector.

Absorber 300 extends along the central axis of the collector away from the point of intersection of the central axis of the collector with the reflector. The length of the absorber along the central axis is between 0.6 and 1.0 of the radius of the reflector, the distance being 0.8 of the reflector radius in this embodiment. As discussed more fully hereinafter, the absorber of this embodiment should be not less than four-fifths of the reflector radius to intercept all solar energy rays direct or reflected, incident thereon.

Figure 16:
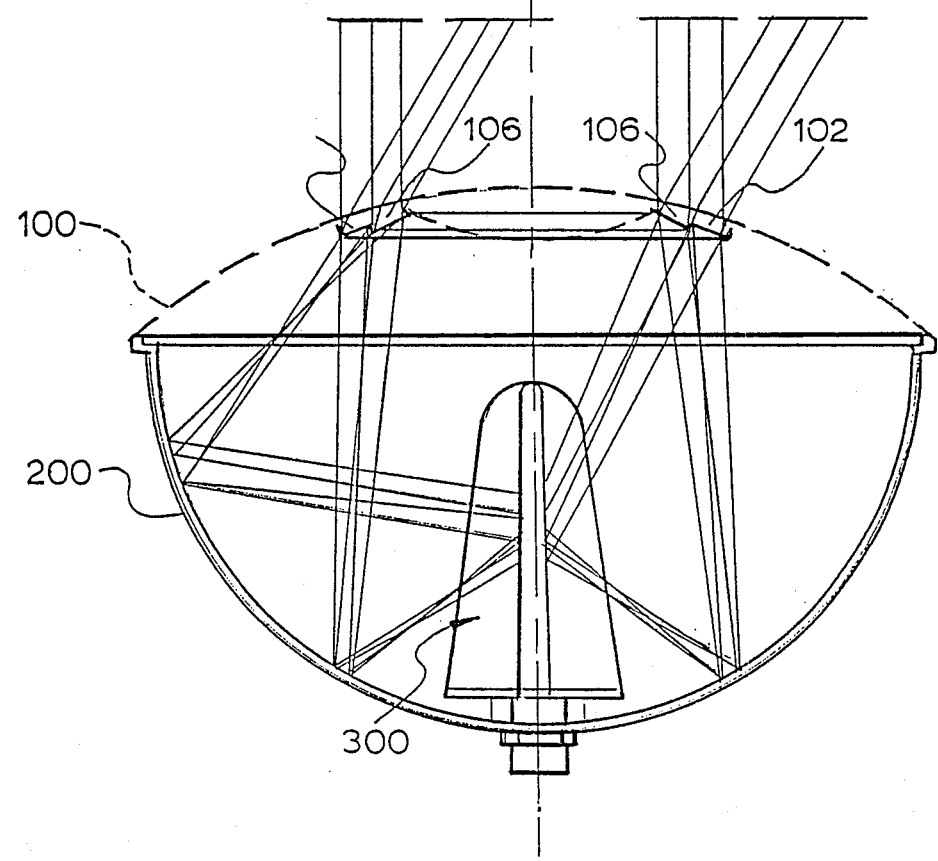

Referring now to FIG. 16, non-refracting channel 102 is shown in combination with its adjacent divergent ridge portion 106, transmitting light rays having solar incidence angles of 0 degrees and 30 degrees, respectively. This figure also illustrates the coaction or cooperation of adjacent optic rings in concentrating solar energy by focus and by overlapping on the absorber surfaces.

From consideration of the traces of the incident rays 106' and 106" of FIGS. 13 and 14 and of the incident rays passing through prismatic element 106 on the left side of FIGS. 15 and 16 and from a comparison of these traces with the traces of the resultant refracted rays, it will be seen that prismatic element 106 and the other elements which receive rays 106' and 106" constitute a plurality of prismatic elements distributed about the reflector axis in the lens member for performing the following functions. First, they receive incident radiation on one side of the reflector axis from a source located on the other side of the axis (the axis being viewed perpendicular to a plane including the axis and passing through the source). Secondly, they maintain, during variation of the angle of incidence between the incident radiation and the axis as viewed in said plane, refraction of the incident radiation and emission of the resultant refracted radiation through emitting surfaces which are inclined for continuing to direct radiation, during such variation, away from the source, above the absorber and toward the reflector with an upward component of refraction as compared to the inclination of the incident radiation and to distribute the resultant reflected radiation across a portion of the absorber which faces away from the source.

Such an arrangement can be of assistance in providing one or more of the following advantages. In a bowl-type reflector, this arrangement can reduce the angle of incidence of refracted rays on the reflector and/or reposition the points of impingement of rays from zones where there is a high probability of reflection of the ray back through the lens to zones where such probability is considerably reduced thus, re-reflection and loss of rays can be controlled and the collector can operate efficiently throughout a substantial range of angles of incidence. Also, more thorough distribution of the radiation over absorber surfaces facing toward and away from the source can be achieved.

FIGS. 17, 18 and 19 illustrate the structure of the absorber means, circulation means, and their interrelationship with the reflector element. In embodiment, the absorber simply comprises a thin walled chamber formed from a continuous sheet of material such as copper, which has a high coefficient of heat conductivity. The chamber of absorber 300 is formed by stamping and drawing (or otherwise forming) a plurality of wings 304 into the configuration shown in the drawings, which wings 304 fit and seal into a base 302 which is cast with a continuous slot to receive the lower terminal edges of the wings and to hold and seal them in place.

Referring now to FIG. 27, the base designated generally 302 is seen to comprise the aforementioned continuous slot 312, absorber collar 306 and absorber barrel 308 having barrel threads 310 formed on the tip thereof. As seen in FIG. 28, a central coaxial aperture 309 for providing fluid communication to the interior of the absorber is provided by base 302 and the surface area to volume ratio of the absorber is maximized. The winged configuration of the absorber minimizes the amount of highly conductive material needed per unit area of collecting surface. The base, on the other hand, which thicker material need not be highly conductive. In this embodiment it is molded of plastic or cast of metal, metal being generally preferred since plastic may present some expansion and contraction problems in the assembly.

As seen particularly in FIG. 18, the wings 304 each comprise two generally triangular, converging side portions which are joined at their side and top intersections by rounded portions. During the operation of the absorber, a heat absorbing fluid is circulated through the absorber interior.

FIG. 19 shows a circulation means intended for normal use. It comprises T-fitting 516 having input coupling portion 508 and output coupling portion 506. Fluid enters through the input coupling portion 508 in the direction of the arrow indicated in FIG. 19. The T-fitting 516 is fitted to two concentric pipes, including peripheral input pipe 504 and central output pipe 502. The entering fluid travels from input coupling portion 508 through the space defined between peripheral input pipe 504 and the exterior surface of the central output pipe 502 so that this relatively cooler input fluid jackets the relatively warmer output fluid at least as that output fluid passes by the vicinity of the reflector flange 202. This jacketing of the input fluid around the output pipe 502 additionally acts to preheat the input fluid.

By terminating the input pipe 504 relatively nearer the base 302 of the absorber than the orifice of output pipe 502, the fluid is naturally circulated through the interior of the absorber to contact the inner surfaces of wings 304. The generally pyramidal configuration of the absorber interior coupled with the proximity of the output pipe's orifice near the tip of the absorber naturally tends to encourage the heated fluid to re-enter the output pipe for subsequent circulation through the system.

In the event of a leak in the pipe leading to the absorber, the level of fluid normally remaining in the device would remain as high as the lowest part of the orifice of output pipe 502. (See FIG. 19). Even if peripheral input pipe 504 were allowed to drain, however, the level of fluid within the absorber would drop only to the lowest point of the orifice of input pipe 504. In either case, a significant reservoir of fluid would be established which could boil away to thereby prevent overheating and thus melt-damage to the unit. By varying the relative positions of the input pipe and output pipe orifices within the absorber, the flow pattern and reservoir characteristics of each unit may be varied depending upon the intended installation.

As may be seen from FIGS. 19-28, the absorber and collection means are easily fabricated from standard materials and may be readily assembled by an ordinary mechanic. Depending upon the support means selected, either the reflector or the circulation means should be capable of supporting the remainder of the unit. Accordingly, strong mechanical and fluid tight connections are created both at the periphery of the reflector at its junction with the lens element and around the central reflector aperture. In the present embodiment, the aperture in the reflector element 200 is encircled by an integrally formed reflector flange 202 which engages a complemental absorber collar 306 (306A and 306B) on the one side, and a complemental portion of the sealing nut 510 on its other side.

Assembling the absorber and circulation means on the reflector collar is quickly and simply accomplished: first, the pre-assembled absorber comprised of the absorber wings 304 and absorber base 302 are slid through the aperture in the reflector element 200 until the absorber collar 306 seats on the reflector flange 202, as shown in FIG. 19. Next, the peripheral input pipe 504 is inserted into absorber barrel 308 with a compression gasket 512 disposed between the end of the absorber barrel and pipe collar 514 (shown more clearly in FIGS. 20 and 21) which is integrally formed around the exterior of input pipe 504. Sealing nut 510, also shown in FIGS. 22 and 23, is then screwed onto the barrel threads 310. As best seen in FIG. 22, the upper surface of the threads 510c form a bevel. This aids in fitting nut 510 over the lower end of pipe 504, and as the nut 510 is threaded onto barrel threads 310 (see FIG. 27) and tightened, transverse sealing nut surface 510a and collar portion 510d (see FIGS. 19 and 22) mate with reflector flange 202. At the same time, the annular compression surface 510b forces the pipe collar 514 upwardly against compression ring 512 so that the nut 510, absorber base 302 and input pipe 504 are all fluidically sealed with respect to each other. T-fitting 516 (with output tube 502 already in place) is then mounted onto the protruding portion of input pipe 504 to complete assembly of the unit.

FIGS. 24–26 provide details of the T-fitting designated generally 516. Output coupling portion 506 is provided with annular surface 506A for seating the output pipe 502 of FIG. 19. Similarly, input pipe 508 has an annular seating surface 508A for seating peripheral input pipe 504 of FIG. 19.

As shown in FIGS. 27–29 absorber wing 304 is secured in a wing groove 312 formed in support portions 314 of plate 301. This plate is part of absorber base 302 and may be thickened in the vicinity of the grooves as shown in FIG. 29. Absorber base 302 also comprises the central, generally tubular barrel 308. It is surrounded by absorber collar 306 shown in greater detail in FIG. 19, wherein generally horizontal annular collar portion 306a and cylindrical collar portion 306b engage and seal reflector flange 202. Absorber barrel 308 extends generally downwardly away from the absorber base to terminate in absorber threads 310, and its central bore 309 (FIG. 28) is sized to receive the circulation means as described aforesaid.

Figure 30:
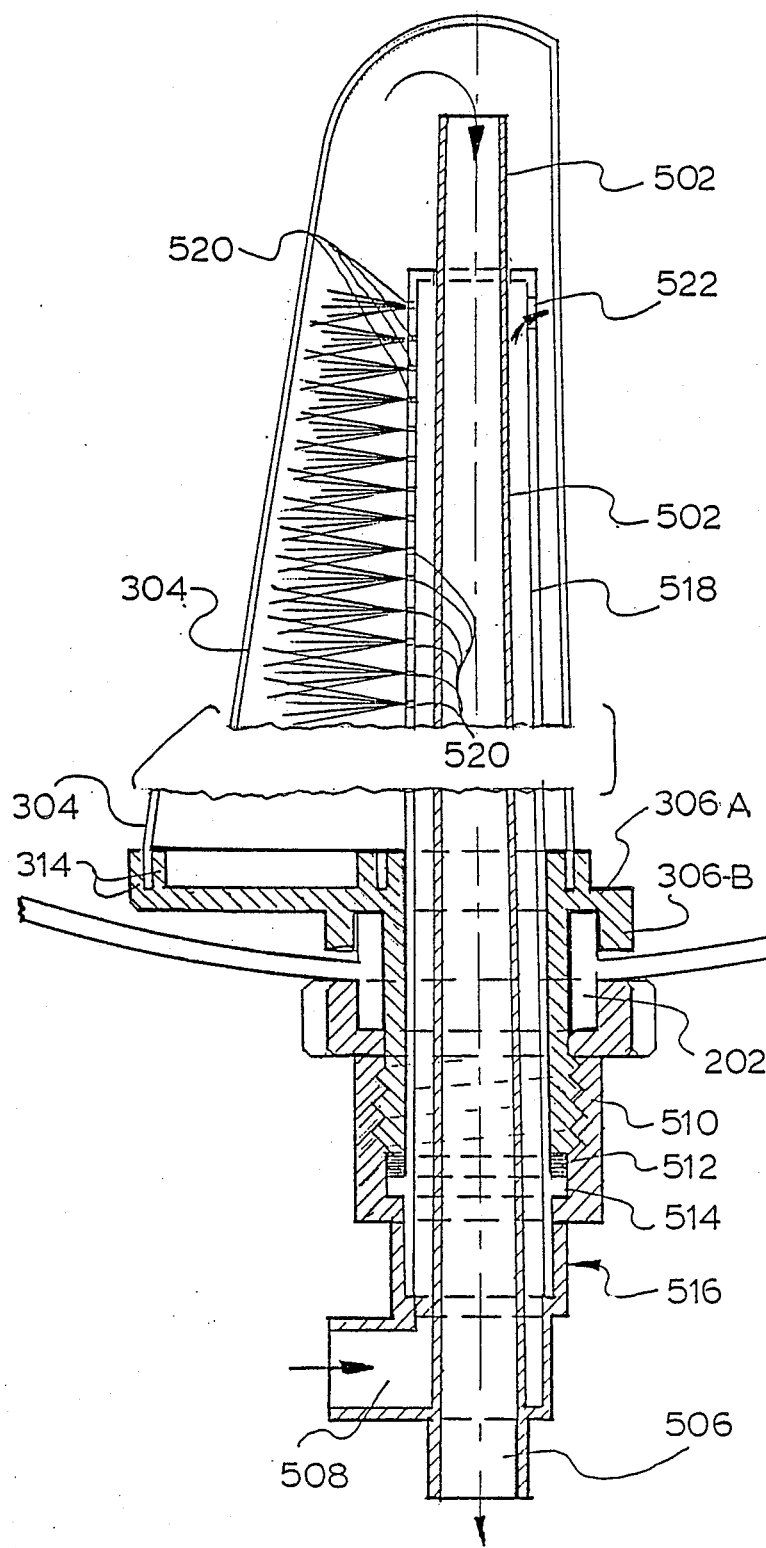
FIG. 30 is a greatly enlarged, foreshortened view similar to FIG. 19 showing an alternate form of means in combination with an absorber mounted on a portion of a reflecting element.
Figure 31:
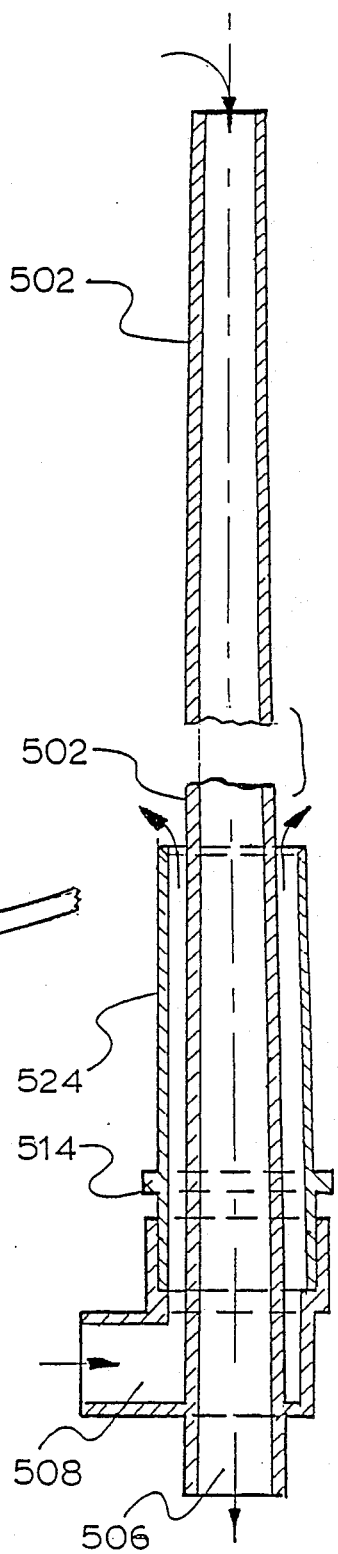
FIG. 31 is a greatly enlarged, foreshortened view of another alternative embodiment of the circulation means.

FIGS. 30 and 31 illustrate alternatives to the circulation means shown in FIGS. 17–29. In FIG. 30, peripheral input pipe 504 has been replaced by a peripheral input spray pipe 518 having a plurality of small spray orifices 520 defined in an exterior surface thereof in an orientation intended to spray a number of minute streams of droplets generally along a plane bisecting each of the wings 304. A relief aperture 522 defined in spray pipe 518 allows for circulation from the spray pipe to that portion of the absorber proximate to the intersection of adjacent wings. Accordingly, a pattern of fluid input into the absorber is established which promotes the vaporization of the fluid to a gas within each of the wings, which is then readily collected by central output pipe 502.

The alternative shown in FIG. 31 is useful for installations where inadvertent overheating is not a problem. It includes a shortened feed pipe 524 which can be substituted for the spray pipe 518 in the FIG. 30 embodiment. When so installed, it terminates flush with the interior surface of the absorber base such that cooling fluid is circulated through the absorber from the lowermost portion thereof up into the orifice of central output pipe 502 which is, as before, located adjacent to and slightly below from the upper interior surface of the tip of the absorber.

The absorbers illustrated in FIGS. 1–31 have, at their bases, spanned only a relatively small portion of the arc defined by the reflector element surface. However, the absorber configuration and size relative to the reflector may be altered to increase the percentage of incident rays actually collected. FIG. 32 an alternative absorber which spans a greater portion of the arc of the interior reflector surface than in the embodiments previously shown. The angle of declination $\theta$ of the upper edges of the wings of absorber 602 ranges between 5 and 40 degrees, and may for example be 25 degrees for a high collection efficiency unit as shown in FIG. 32. As seen in FIG. 33, this absorber 602 comprises three wings 604 mounted symmetrically about an absorber base 606 configured and proportioned to receive and seal the wings to the base. In FIG. 34, adjacent wings 604A, 604B and 604C of the trilateral absorber are separated from one another by a preferred angle of separation $\theta$ of 120 degrees. In FIG. 35, the four symmetrically disposed wings of quadrilateral absorber 610 have an angle of separation $\theta$ of 90 degrees. FIG. 36 discloses a radially symmetric bilateral absorber 612.

The purpose of using wing-shaped absorbers as illustrated in FIGS. 32–37 is to increase the collection efficiency of the unit as the sun's incidence angle on the collector varies throughout the 60 degrees collection period. These extended wing absorbers may be designed to limit the volume of fluid present in the absorber core for maximum solar energy/fluid input ratios. The extended wings serve to intercept most of the energy entering the collector and conduct this energy to the fluid for rapid heating. As seen in FIG. 34, if the collector unit is oriented to face in a southerly direction, solar flux entering from an easterly incidence angle A will be collected directly by absorber wings 604a and 604c with additional collection of reflected energy on both sides of wing 604b. This collection pattern, covering 70% of the absorber winged surfaces, will remain relatively unchanged until the solar flux has traversed through incidence angle B and beyond incidence angle C which exceeds the 30 degree maximum energy input angle of this embodiment.

A variety of energy collection requirements may be met by utilizing an absorber with more or fewer winged projections, or by orienting the winged projections in particular position(s). As an example, if the downwardly oriented vertical wing shown in FIG. 34 is rotated to upwardly oriented position in the absorber assembly, the energy collection pattern for incidence angle B would cover 90% of the absorber area, with a corresponding increase in the energy captured by the collector unit.

With an increase in the number of winged projections, as illustrated by the quadrilateral absorber in FIG. 35, there would be an increased fluid volume for absorption of energy and a corresponding reduction in solar collection ratio, which may be useful in meeting limited temperature collection requirements.

One novel approach to the problem of providing complete collection during the course of the day is illustrated in FIGS. 36 and 37, where the bilateral fan absorber 612 may be oriented so that its faces are substantially perpendicular to the incidence angle of the sun during the course of the day. This is accomplished either by reciprocating the entire collector unit as, for example, by mounting the unit on powered rollers, or alternatively, by providing a bearing which allows either the absorber, or the absorber-collection unit to rotate with respect to the reflector and lens element of the device. This rotation, as illustrated in FIGS. 37A through 37E, encompasses 60 degrees during which the energy collection pattern covering both the front and rear surfaces of the bilateral winged absorber remains a constant 100%. This, combined with the reduced fluid volume, tends to maximize solar collection ratio. FIG. 37A shows the bilateral fan collector rotated to face a southeasterly direction such that the upper face of the absorber 612 is approximately perpendicular to the sun's rays in mid-morning. As the sun moves from east to west during the day, the absorber 612 is rotated through the south-easterly, southerly and south-westerly facing positions shown successively in views 37B, 37C, 37D and 37E until its angle of rotation is at the maximum, with the absorber facing in the south-westerly direction. In this manner, virtually 100% of the incident light on the lens elements is collected by the absorber, while at the same time minimizing the amount of material required to construct the absorber.

FIGS. 38–78 disclose particularly preferred embodiments of the invention. In these embodiments, the collector components, including the reflector means, absorber and lens member, include varying numbers of similar (including identical) sub-components. For example, these embodiments relate in part to collectors in which the reflector means is a reflector bowl defined at least in part by a plurality of identical side wall segments. To reduce crowding in those figures which show in the same collector a number of similar sub-components, such as these side wall segments, as well as absorber wings, lens prismatic elements and the like, reference numerals have been applied to only one or a few representative examples of the similar sub-components in the respective figures.

In FIGS. 38–78, the plural side wall segments are arranged substantially symmetrically about the central axis of the collector, forming generally polygonal figures with straight or gently curved sides as viewed in plan view or horizontal cross-sections. Narrowing in width as they draw progressively nearer the bottom of the bowl, these side wall segments, as viewed in vertical cross-section, extend downwardly from an upper region of the bowl while curving inwardly towards the axis.

Figure 38:
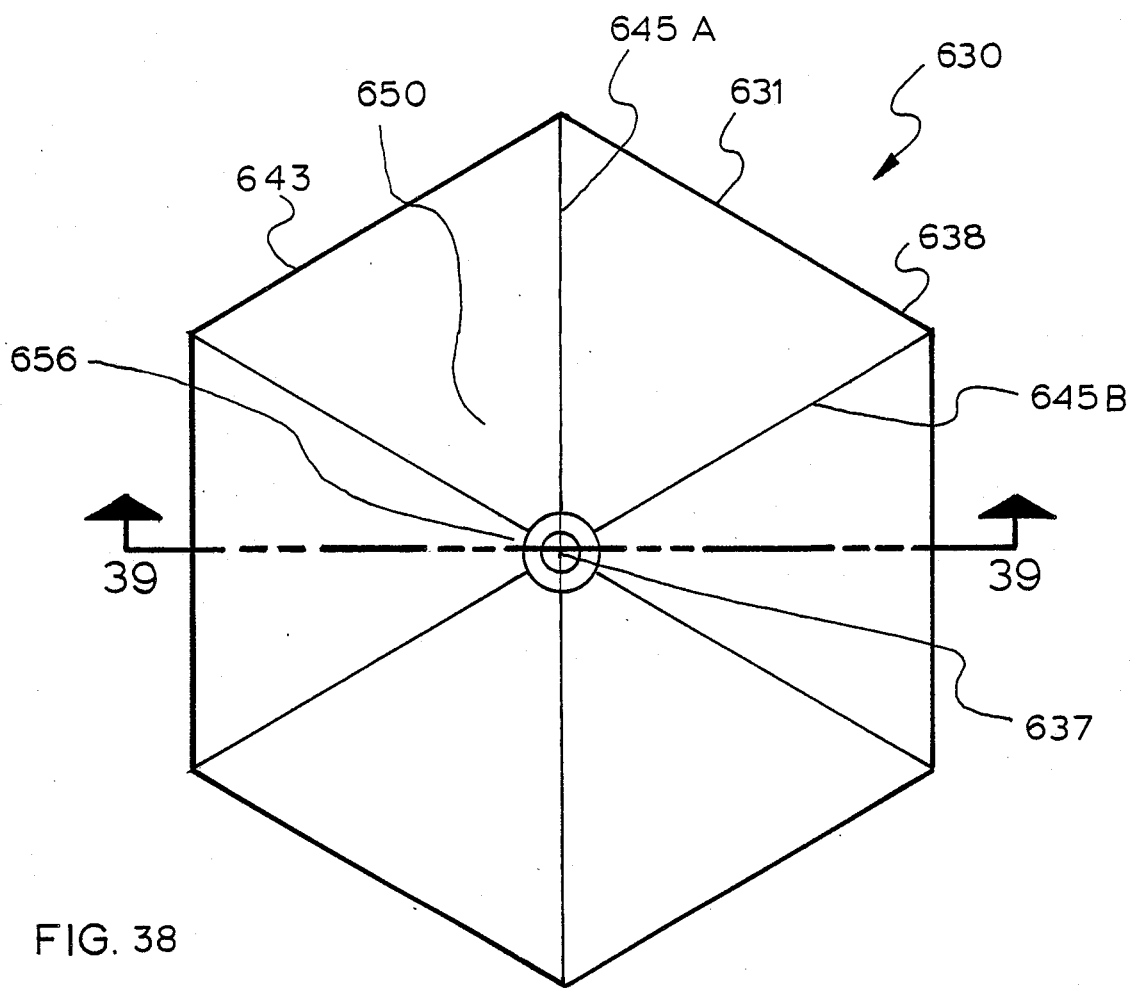
FIG. 38 is a plan view of a hexagonal reflector showing six facets and a flanged mounting hole on the reflector central axis.
Figure 39:
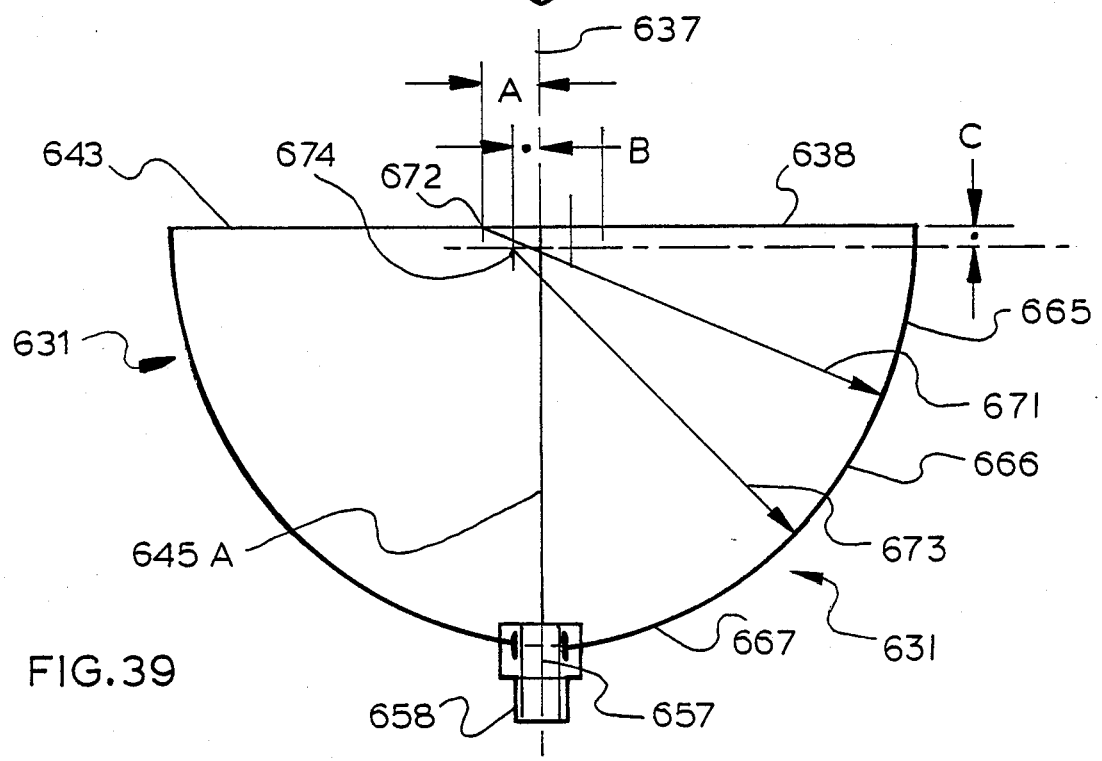
FIG. 39 is a vertical sectional view taken on section line 39—39 of FIG. 38, illustrating the developed curvature of the reflector.

FIGS. 38 and 39, together, illustrate one example of such a reflector bowl having a hexagonal outline in plan view. As shown in FIG. 38, the hexagonal reflector bowl 630 includes six wall segments 631 connected with one another at six intersections such as 645A and 645B. Arranged symmetrically about reflector central axis 637, the wall segments each have upper edges, e.g. 638 and 643, which define the mouth of the bowl, while the wall segment lower portions 650 define the bowl bottom 656. An advantage of the hexagonal shape is that it facilitates arrangement of several collectors in a very closely spaced array.

FIG. 39 is a cross-section of the reflector bowl of FIG. 38, taken on section line 39—39. A lens member and a radiant energy absorber with related fluid handling equipment, not shown in this figure but shown in detail in FIGS. 75–78, may be anchored respectively to the mouth and to the bottom of the reflector bowl, the absorber being secured by a fitting 658 to a ring flange in aperture 657 which facilitates alignment of the absorber with axis 637. The lens member and absorber have been omitted from FIGS. 38 and 39 to focus attention upon the shape and orientation of the wall segments.

At the sides of FIG. 39 may be seen the vertical cross-sectional outlines of two of the six wall segments 631, while the tilted inner reflective surfaces of these wall segments may be seen within. Each of the six (6) wall segments has the same vertical cross-sectional configuration in this embodiment. This figure shows an example of how each of the inwardly curving side wall segments, within a working portion of the reflector bowl, can transition from an upper side wall portion which is substantially upright, to a more nearly horizontal orientation as the segment draws nearer to the bowl bottom and the central axis 637. For example this transition may include side wall upper, transitional, and lower portions. The resultant transition preferably includes one or more arcuate intervals of the side wall segments which have been generated from a corresponding generating locus or loci, the latter being located on the opposite side of the axis from the position(s) of the aforementioned interval or intervals.

In the particularly preferred embodiment shown in FIG. 39, the transition includes upper and lower arcuate intervals having upper and lower generating loci respectively. Thus, there is an upper locus 672, which preferably has the same elevation as the bowl mouth defined by edges 638, 643, and which is offset laterally from the axis 637 by a distance A. Radius line 671, associated with locus 672, defines an upper arcuate interval comprising side wall upper portion 665 and approximately the upper half of the transitional side wall portion 666. Locus 672 is situated above substantially all or at least a major portion of the side wall upper portion which it defines. Another generating locus 674, situated at a distance C below the bowl mouth, is offset laterally from axis 637 by a distance B. Radius line 673, drawn from generating locus 674, defines the lower arcuate interval comprising the trace of side wall lower portion 667 and approximately the lower half of transitional side wall portion 666. Locus 674 is above the side wall portions which it defines.

From the foregoing description and from the figure, it will be seen that the upper locus 672 is further horizontally from axis 637 than is lower locus 674. Also, the distance between the upper arcuate interval of the wall segment 665 and its generating locus 672 is greater than the distance between the lower wall segment arcuate interval 667 and its generating locus 674. Thus, preferably, the radius of each arcuate wall interval substantially exceeds half the width of the bowl at its mouth, with the upper arcuate. interval having a substantially greater radius than the lower arcuate interval. This is of assistance in directing reflected rays into the lower portions of the reflector, thus decreasing their tendency to escape by reflection back into space.

It is preferred that the reflector bowl of FIGS. 38–39 have a ratio of axial depth to width at its mouth in the range of about 0.5:1 to about 0.7:1. The dimensional relationships currently considered best include a bowl width at its mouth of 50 units, a bowl depth (bottom internal surface to mouth, measured along the axis 637) of 27.5 units, wall radii of 29 and 26.5 units respectively in the upper and lower arcuate intervals and distances for A, B and C of 4, 2 and 1 unit(s) respectively.

Figure 40:
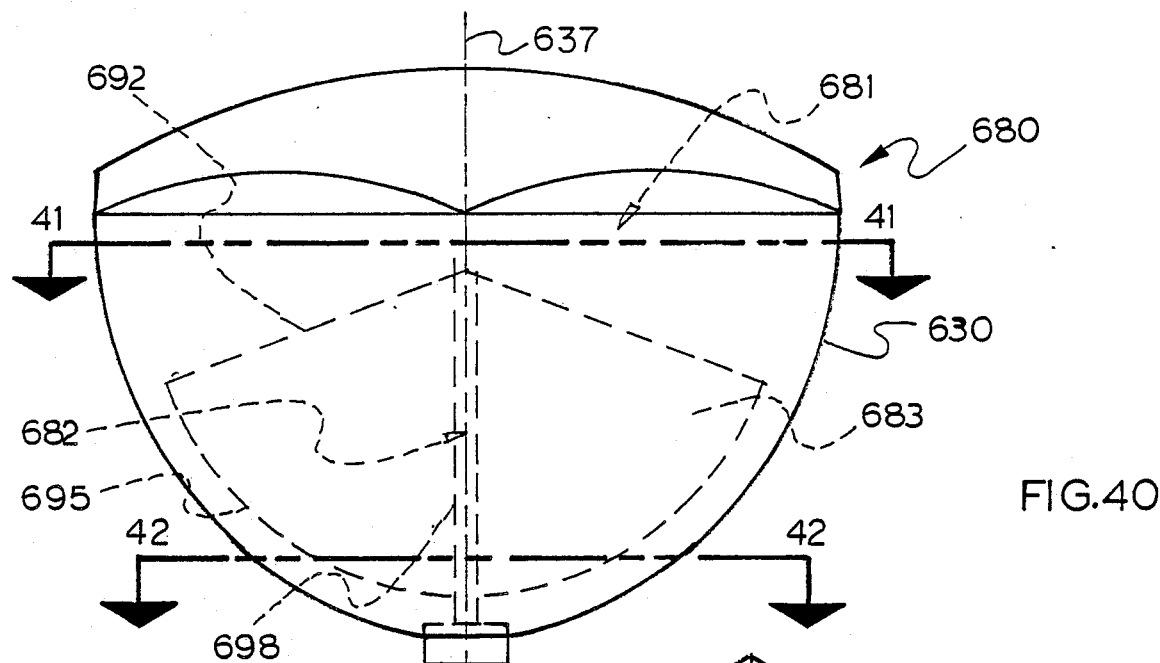
FIG. 40 is a side elevation of a collector including a schematic representation of a lens extending across the mouth of the reflector and an absorber shown in phantom line within the resultant cavity.
Figure 41:
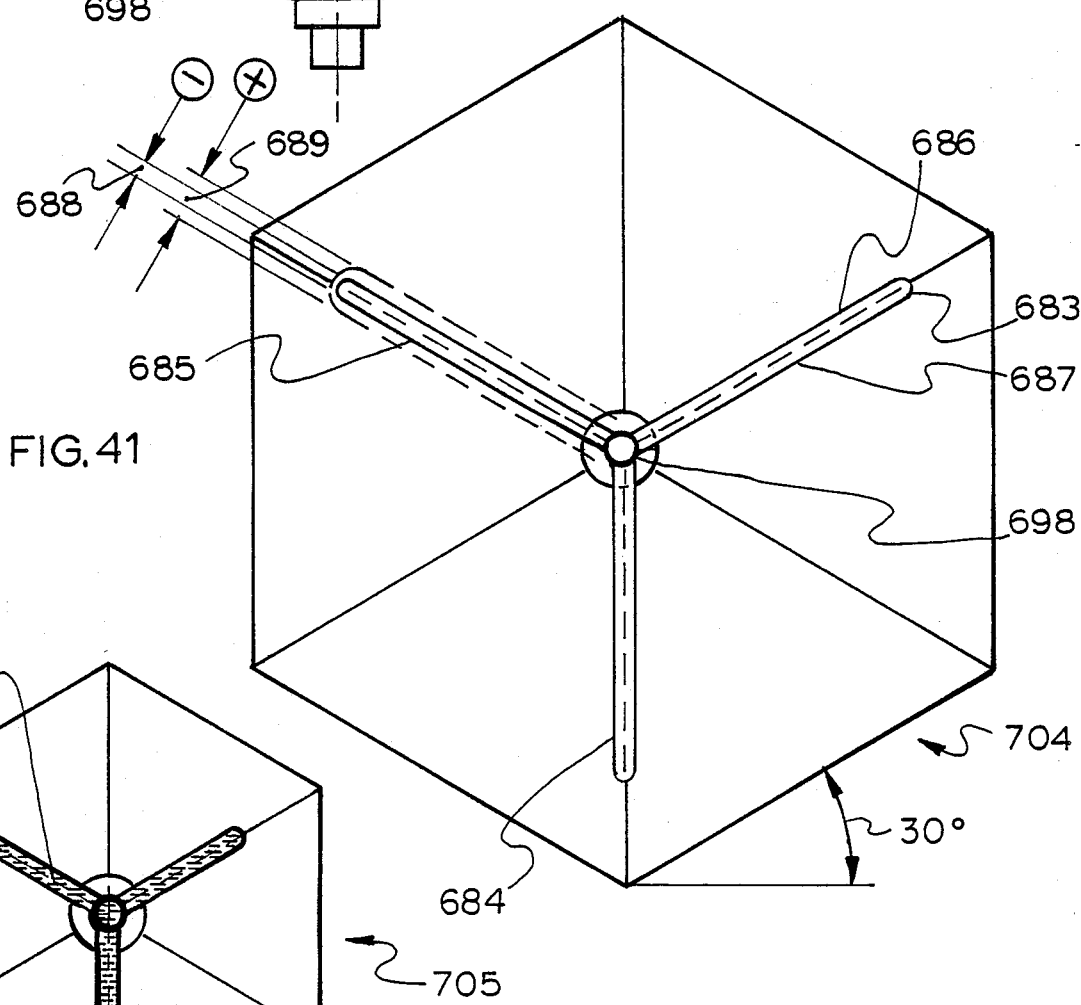
FIGS. 41 and 42 are sectional views of the collector shown in FIG. 40, taken respectively along section lines 41—41 and 42—42, showing horizontal sections at varying elevations through the wall segments of a polygonal reflector bowl and a section through a lower portion of the three winged absorber.
Figure 42:
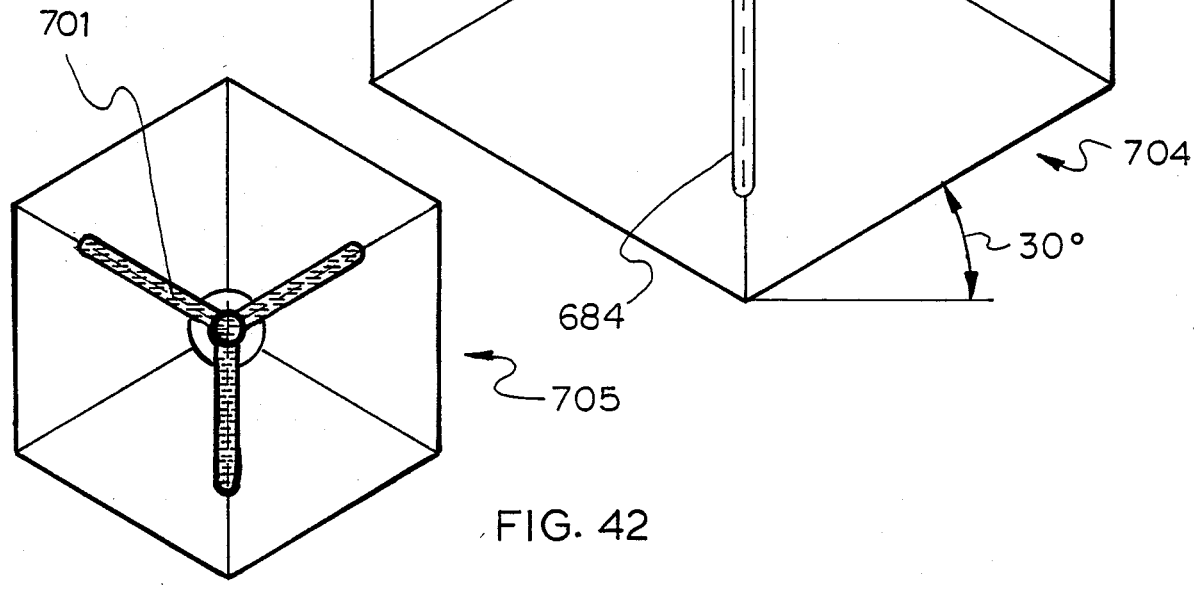

As illustrated in FIGS. 40–42, a convex lens member 680 and hexagonal reflector bowl 630, similar to that shown in FIGS. 38–39, may be secured to one another to provide an enclosed cavity 681 between them, the reflector bowl and lens member each being arranged in a substantially symmetrical manner about axis 637. An absorber 682 is mounted within this cavity, and (as best shown in FIGS. 41 and 42) includes a plurality (e. g. three) of wing members 683 extending away from axis 637 and toward the inner surfaces of reflector bowl 630 at angular intervals of about 120° from one another, extending towards alternative corners in the hexagonal bowl outline. These wing members have energy absorbing walls 686,687 of substantial surface area which define opposite sides of the respective wing members and which connect with one another along wing intersections 698.

Oriented substantially upright, these wing members define confined fluid heating passages 701 (FIG. 42)

between their respective walls. The lateral spacing of the pairs of wing walls may be increased or decreased, as illustrated by wing wall spacing intervals 688 and 689 associated with absorber wing 685 in FIG. 41, to enlarge or reduce the cross-sectional area of the fluid heating passages 701.

The absorber is preferably formed of blackened copper metal by creating a series of folds in a circular blank. Each fold extends outwardly from the center of the blank towards its margin, there being a series of folds separated by angular intervals of 60° (in the unfolded blank), and these are alternately upwardly and downwardly facing folds. The upwardly facing folds form the upper edges 692 of the wing members, while downwardly facing folds form the wing intersections 698. The peripheral edges of the blank, after it has been folded, become the wing lower edges 695 and may be joined together by any suitable means to render them fluid tight. A wide variety of alternative materials and forming techniques may be utilized without departing from the spirit of the invention.

As discussed above, when the reflector bowl forms a generally polygonal figure, that figure, as viewed in plan view or horizontal cross section, may have straight or gently curved sides, straight sides having been illustrated in FIGS. 38–42. One form of curved sides is illustrated in FIGS. 43–45.

Figure 43:
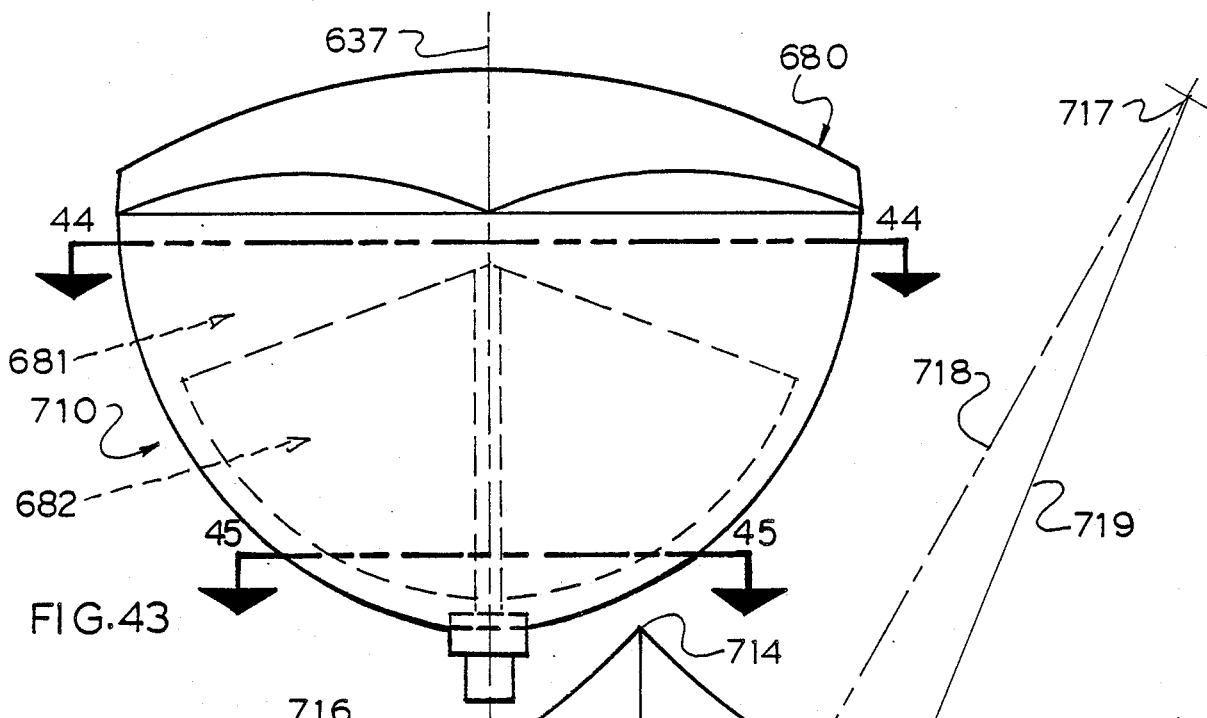
FIGS. 43-45 are similar to FIGS. 40-42, except that the wall segments, as viewed in sectional views 44 and 45, taken respectively along section lines 44—44 and 45—45 of FIG. 43, are convex, i.e. curved inwardly.
Figure 44:
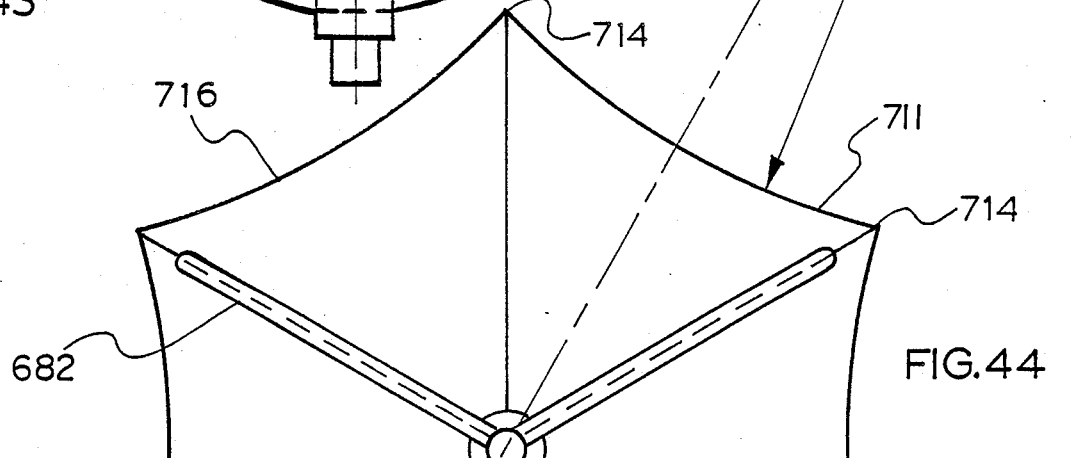
Figure 45:
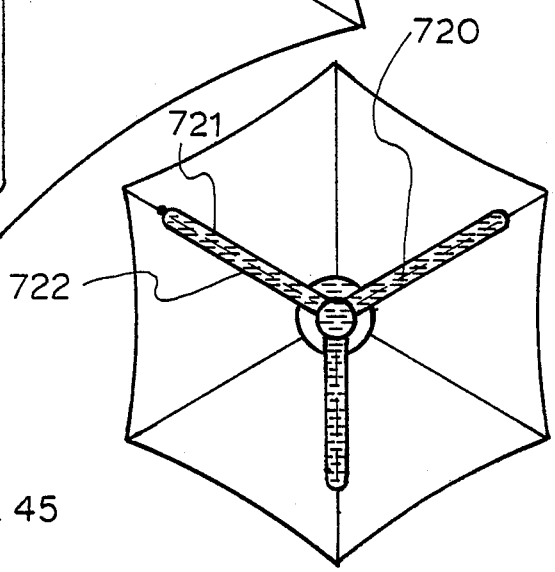

As in the prior embodiments, FIGS. 43–45 include a concave reflector bowl 710 and convex lens member 680 secured to one another and arranged in a substantially symmetrical manner about an axis 637 to provide an enclosed cavity 681 between them. An absorber 682 similar to that described in connection with FIGS. 40–42 is located in the cavity, and it includes energy absorbing walls 721,722 defining fluid heating passages 720 (FIG. 45). However, in this embodiment, the reflector 710 is a hexagonal bowl having wall segments which are curved inwardly as viewed in plan view and in horizontal cross-sections, and the marginal edges of lens 680 match the outline of the concave walls at the bowl mouth.

The six convex wall segments, e.g. 711 and 716, with the exception of their curvature in horizontal cross-sections, are similar to the wall segments described in the prior embodiments. In this illustrative embodiment the radii (e.g. 719) of the convex curves of these wall segments remain constant throughout the interval between the bottoms and tops of the wall segments and their generating loci (e.g. 717) are located in reference planes (e.g. 718) which include central axis 637 and the vertical bisector of each wall segment. A radius of about 50 units is satisfactory, assuming that the bowl has the width to depth ratio discussed in connection with FIGS. 38–39, and that the intersections 714 of the adjoining wall segments have generating loci and radii as shown and discussed in connection with FIGS. 38–39.

There is no upper limit on the number of sides which may be present in the polygonal reflectors, since the general principles of the invention are applicable to reflectors having circular shapes in plan view and horizontal cross section. Thus, for example, one may employ a collector whose shape, as viewed in plan view or horizontal cross-section, resembles a dodecagon which may have straight or convex wall segments.

Figure 46:
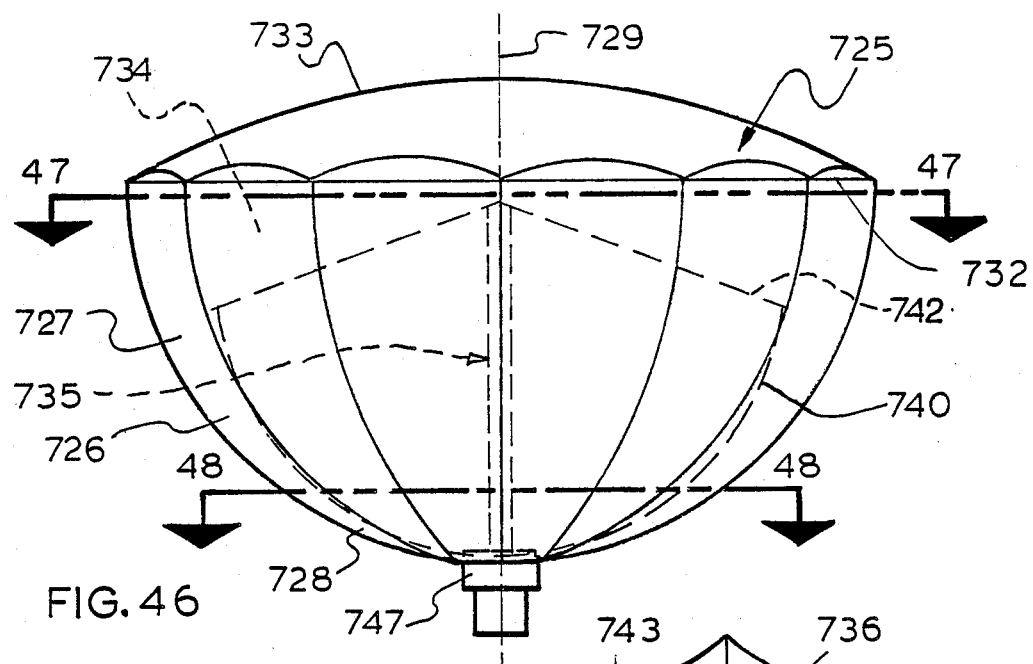
FIGS. 46-48 are similar to FIGS. 40-42, except that the wall segments, as viewed in sectional views 47 and 48, taken respectively along section lines 47—47 and 48—48 of FIG. 46, are convex, i.e. curved inwardly.
Figure 47:
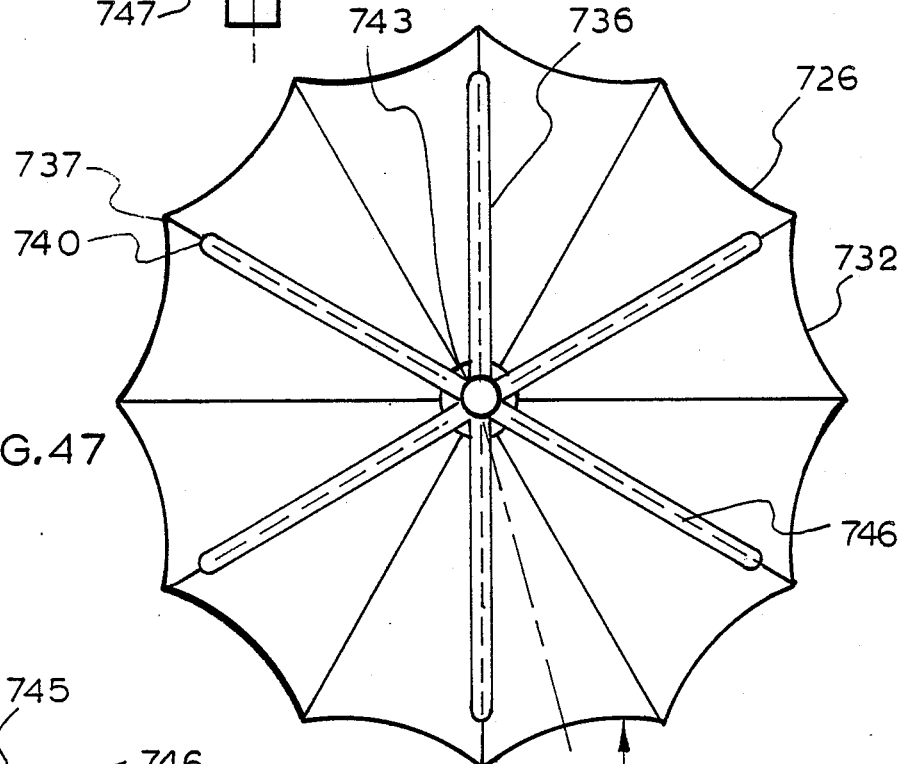
Figure 48:
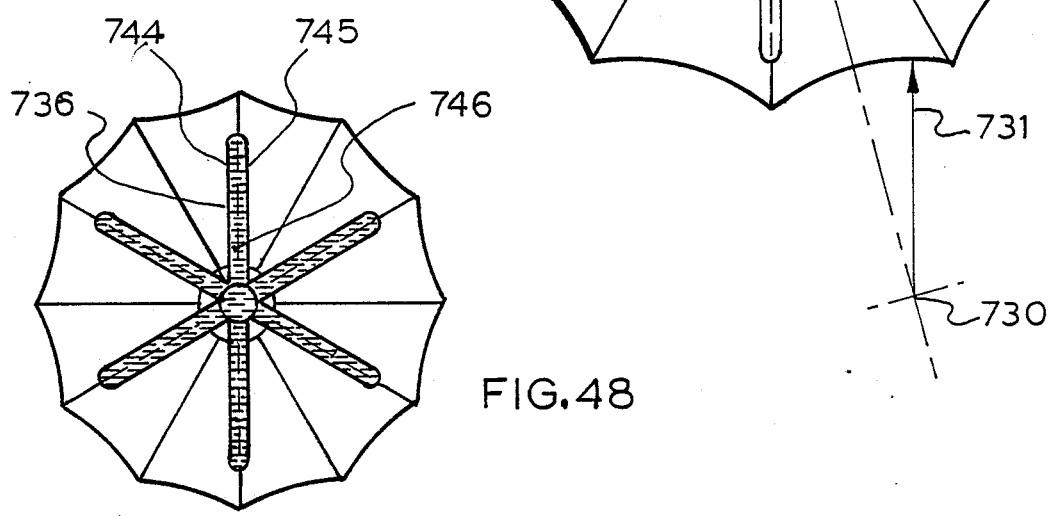

As shown in FIGS. 46–48, a reflector 725 in the form of a dodecagonal bowl has convex wall segments 726 with upper and lower wall portions 727 and 728 arranged symmetrically around central axis 729. Generating locus 730 and radius line 731 (FIG. 47), oriented in the manner previously described with respect to generating locus 717 and radius line 718 of FIG. 44, establish the trace of the convex curve of a wall segment with a radius of 15 units, assuming the remaining dimensions of the reflector bowl are as described above in connection with FIGS. 38–39. This pattern of generating loci and radii is repeated in the remaining wall segments 726.

As in prior embodiments, the wall upper edges 732 form the mouth of the reflector bowl, to which is secured lens member 733 to define a cavity 734 within. In the present embodiment, the six-winged absorber 735 includes wings 736 having wing upper edges 742 and intersections 743. The outer edges 740 of these six wings extend toward alternate intersections 737 between convex wall segments 726 (FIGS. 47–48). Each wing has a pair of wing walls, such as walls 744, 745 in FIG. 48, which define fluid compartments 746 between them extending from the top to the bottom of each wing. As in the prior embodiments, there is a fitting 747 at the base of reflector 725 for attachment of the above-mentioned absorber, in which is mounted the fluid handling components to be described below.

FIGS. 49–56 illustrate one form of lens meeting the requirements of the invention. This exemplary lens may be used for example with the reflector-absorber combination disclosed in FIGS. 40–42 and is so depicted herein. However, it should be understood that this lens can be used with a variety of reflector-absorber combinations. For example, by reshaping the marginal edges of the lens to conform to the outline of the reflector bowl mouth, this lens may be used with the reflectors disclosed in FIGS. 43–48.

Figure 49:
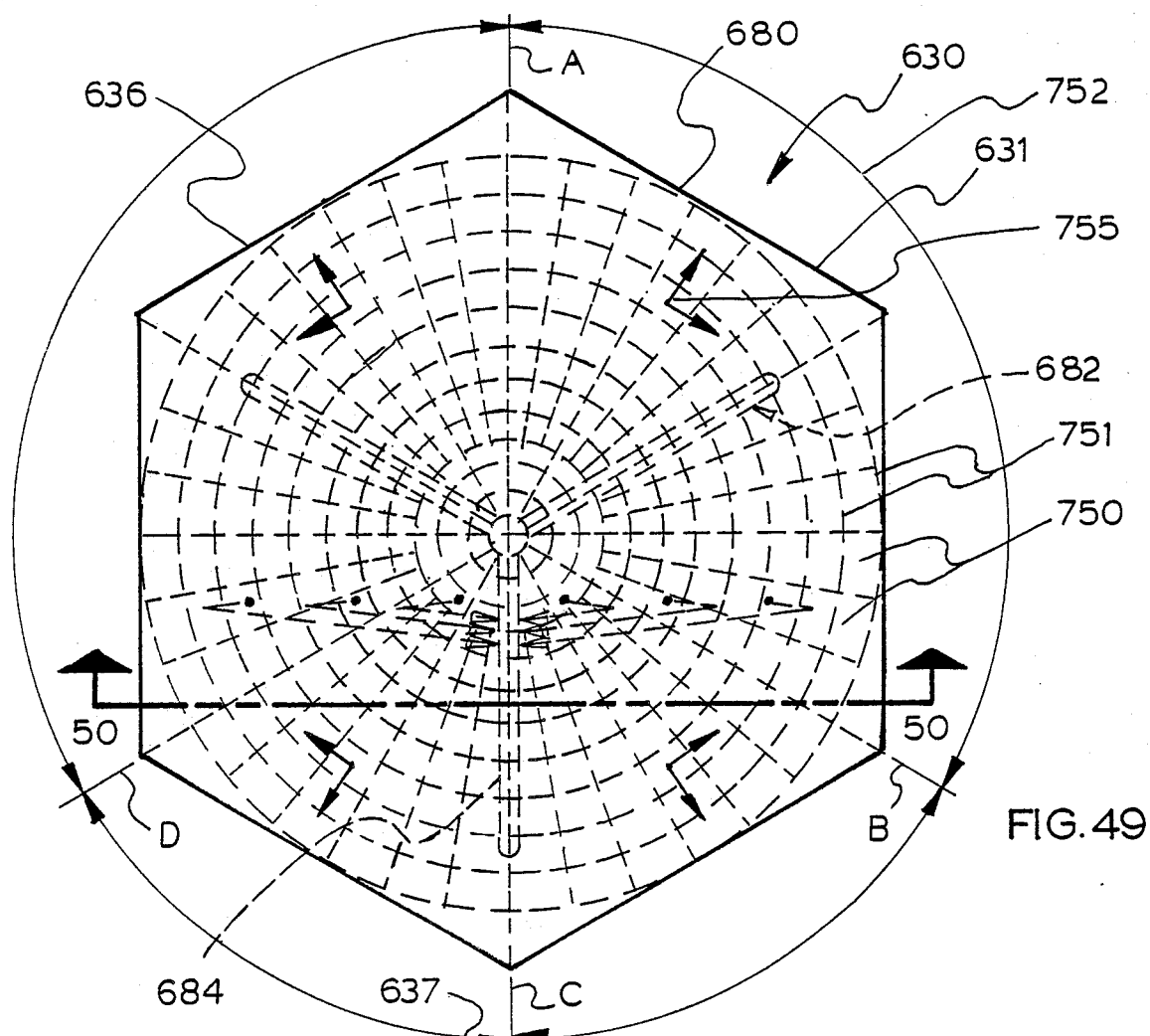
FIG. 49 is a plan view of the collector of FIG. 40 showing the hexagonal lens face with its prismatic elements and, in phantom outline, an absorber assembly within the collector.
Figure 50:
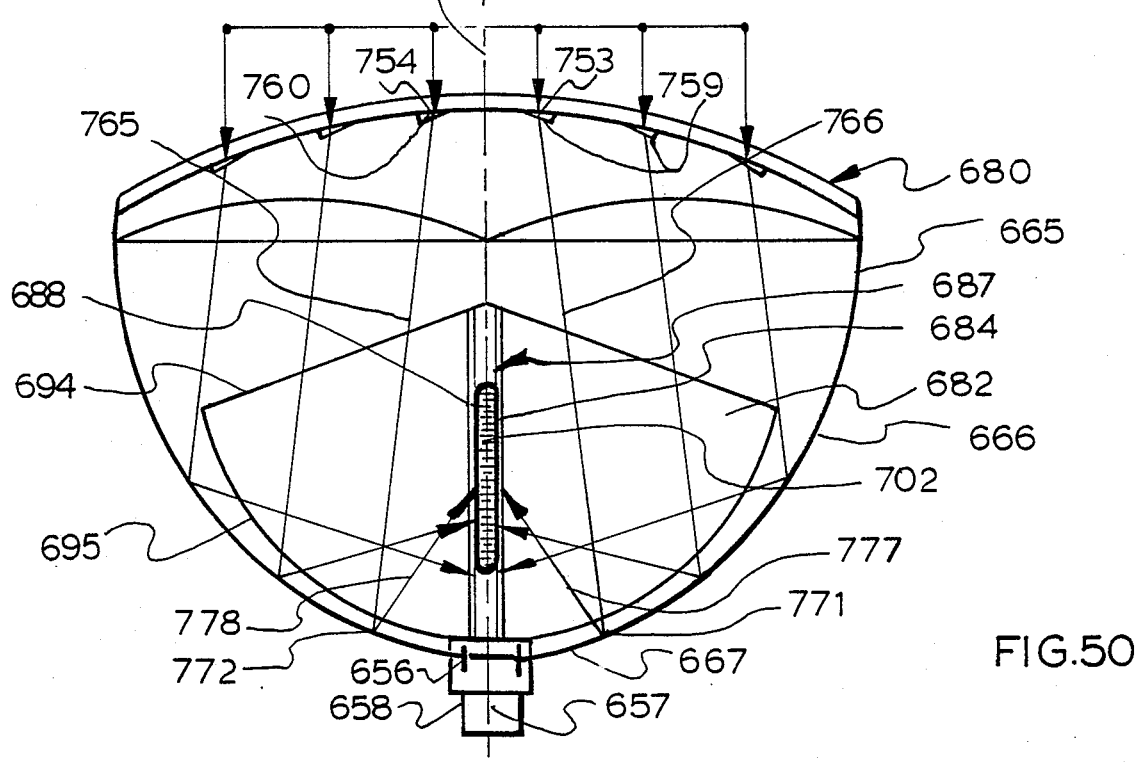
FIG. 50 is a vertical sectional view of the collector of FIG. 47 taken on section line 50—50 of FIG. 49. Arrows in FIGS. 49 and 50 illustrate radiant energy input parallel to the collector axis and irradiation of both sides of an absorber wing.

Referring now to FIGS. 49 and 50, the hexagonal or six-walled reflector bowl of collector 630 includes wall segments 631, 636 symmetrically arranged around the central axis 637 and having side wall upper, transitional and lower portions 665, 666 and 667, as in the FIGS. 40–42 embodiment. The bowl bottom 656 includes aperture 657 in which is secured fitting 658 for supporting absorber 682 with its wings 684 and wing walls 687, 688, the latter terminating in wing upper edges 694 and lower edges 695 to define fluid compartments 702 within the wing walls.

Lens member 680 is generally spherical, and its outer edge includes a planar under surface and has a hexagonal outline in order that it will match and can be sealingly secured to the planar, hexagonal, upper edge of the reflector to define a sealed cavity 681 within. Also, lens member 680 includes prismatic elements 750 which may project from the inner and/or outer surfaces of the lens member. As shown in FIG. 49 the prismatic elements 750 are arrayed or distributed about the central axis of the lens in concentric rings 751 throughout the working portion of the lens, which in this example represents the largest circle which can be drawn within the hexagonal outline of the lens. In the figure, the dashed radial lines and dashed circular lines represent boundaries separating individual prismatic elements 750. Preferably, the prismatic elements project only from the inner surface of the lens member, and its outer surface is a smooth, spherical surface to minimize opportunities for lodgment of foreign matter and to facilitate cleaning.

The upper surface of each prismatic element is that portion of the lens upper surface within the radial and circular lines defining the boundaries of that element. The lower or emitting surface of each prismatic element is an inclined surface in the lower face of the lens member within the same circular and radial boundary lines. The upper and lower or emitting surfaces of each prismatic element diverge from one another with increasing distance from axis 637. For the sake of simplicity a few but not all of the prismatic elements are shown in the underside of lens member 680 in FIG. 50, along with their inclined emitting surfaces 759 and 760. The divergence of the upper and lower surfaces of the prismatic elements is apparent in the figure. The upper surfaces of the prismatic elements incline outwardly and downwardly at progressively increasing angles of declination as the distances between axis 637 and the respective elements increase. The elements near the periphery of the lens are more inclined at their upper surfaces than the prismatic elements nearer the center of the lens. Thus, in this embodiment, in order to maintain divergence between the upper and lower surfaces of those elements which are both near and far from the central axis, the inclinations of the lower or emitting surfaces of the elements also progressively increase with increasing distance from the central axis. In elements progressively nearer the periphery of the lens the steepness of the inclination of the downwardly and outwardly inclined lower or light emitting surfaces of the elements progressively increases.

The aforementioned outward and downward inclination of the light emitting surfaces may be uni-directional, i.e., the surfaces are perpendicular to reference planes which pass through the respective surfaces and which include the central axis of the device. However, multi-directional inclination is also contemplated and is both particularly useful and preferred when working with reflectors having polygonal walls. In the present embodiment, the prismatic elements have bi-directional inclination, e.g. the emitting surfaces are tilted so as to provide a combination of both "radial inclination", meaning inclination which is visible in radial reference planes which include the central axis of the lens and pass through the respective elements, as well as "tangential inclination", meaning inclination visible in tangential reference planes which are perpendicular to the radial reference planes and passthrough the elements parallel to the axis. The tangential inclination may extend downwardly in clockwise and/or counter-clockwise directions around the axis of the lens.

Preferably, the lens of the present embodiment, as viewed in plan view, is divided into a plurality of sectors including some groups of elements having clockwise inclination and other groups of elements having counter-clockwise inclination. As shown in FIG. 49, lens 680 may for example include a first sector AB which lies between radial reference lines A and B emanating from the central axis of the lens and further identified by the arc 752. Within this first sector, the lens emitting surfaces are inclined radially in the downward and outward directions, as well as tangentially in clockwise and downward directions. The emitting surfaces of the lens which are so inclined constitute a first group of inclined surfaces in the first sector which are inclined for refracting rays in a direction including a clockwise vector about the lens axis. A vector couple 755 with arrowheads pointing in radial and clockwise tangential directions symbolizes the radially outward and tangentially clockwise declination of the prismatic element surfaces throughout the first sector. Similar vector couples in other sectors to be described below indicate the directions of declination of the emitting surfaces in those sectors.

A second sector of the lens may for example be sector AD, positioned between radial reference lines A and D, in which there is a second group of inclined surfaces which include both downward and outward radial inclination, as well as downward and counter-clockwise tangential inclination. Thus, the second group of inclined surfaces in the second sector of the lens face are inclined for refracting rays in a direction including a counter-clockwise vector about the lens axis. Note the vector couple in this sector having its tangential arrow pointing in the counter-clockwise direction.

Optionally, the above-described vector couples of sectors AB and AD may apply respectively to the entire right and left halves of the lens, located to the right and left of line AC, so that the lens has only two sectors. However, preferably, the lens is divided into additional sectors. Thus, according to this particularly preferred embodiment the lens includes a third sector BC between references lines B and C in which the bi-directional inclination of the prismatic element emitting surfaces is downward in both the radially outward and tangentially counter-clockwise directions. Here again, a vector couple is provided within this sector to symbolize such declination. As symbolized by an additional vector couple in a fourth sector CD bounded by reference lines C and D, the declination of the emitting surfaces is radially outward and tangentially clockwise. This arrangement appears best from the standpoint of maximizing capture of radiation on a winged absorber of the type shown.

Figure 51:
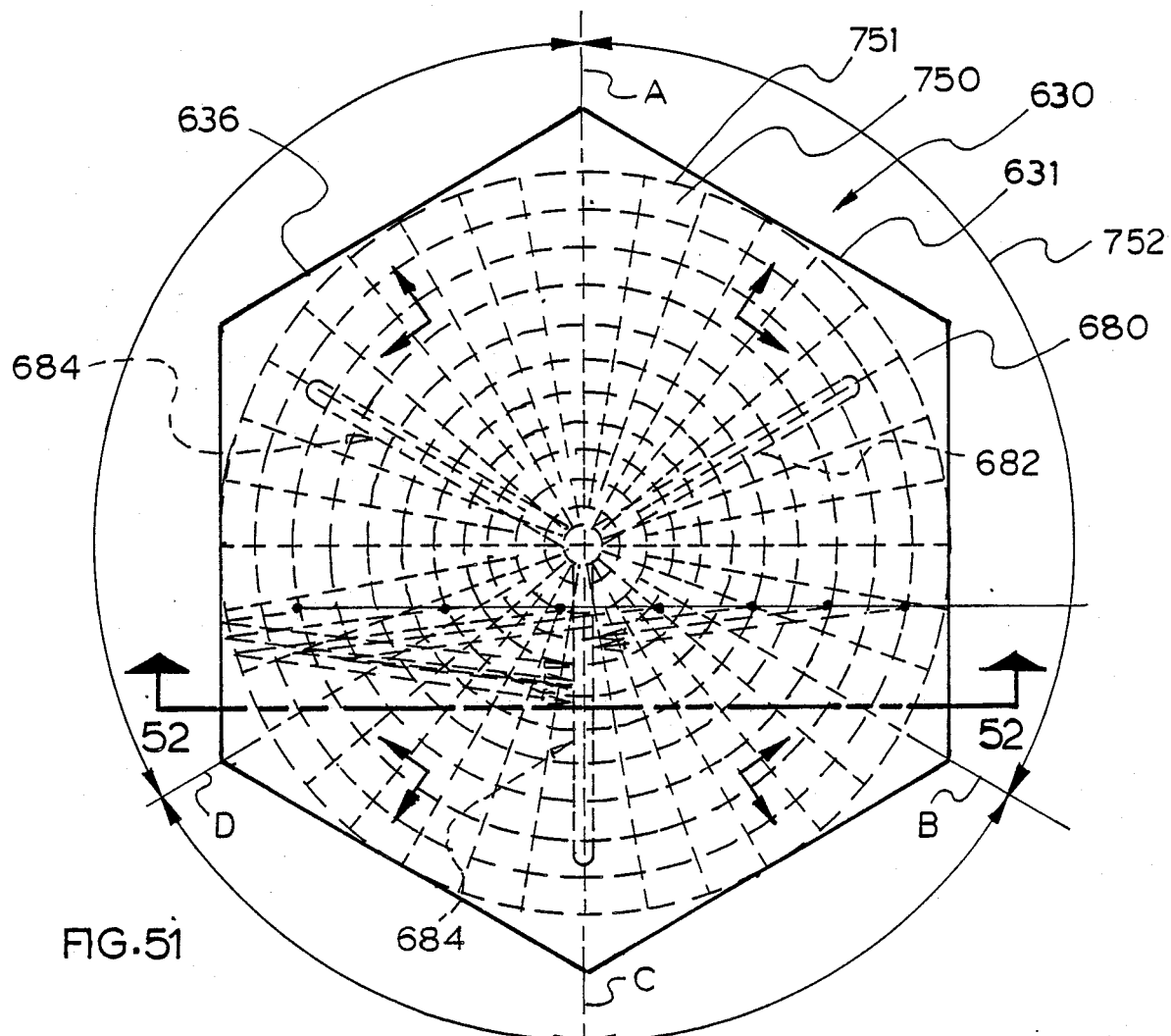
FIGS. 51 and 52 are similar to FIGS. 49 and 50, except that the radiant energy input is at a 45° angle of incidence relative to the collector axis as shown in FIG. 52. Arrows in both Figures illustrate horizontal and vertical control of the radiant energy input by the lens optic system and irradiation of both sides of an absorber wing.
Figure 52:
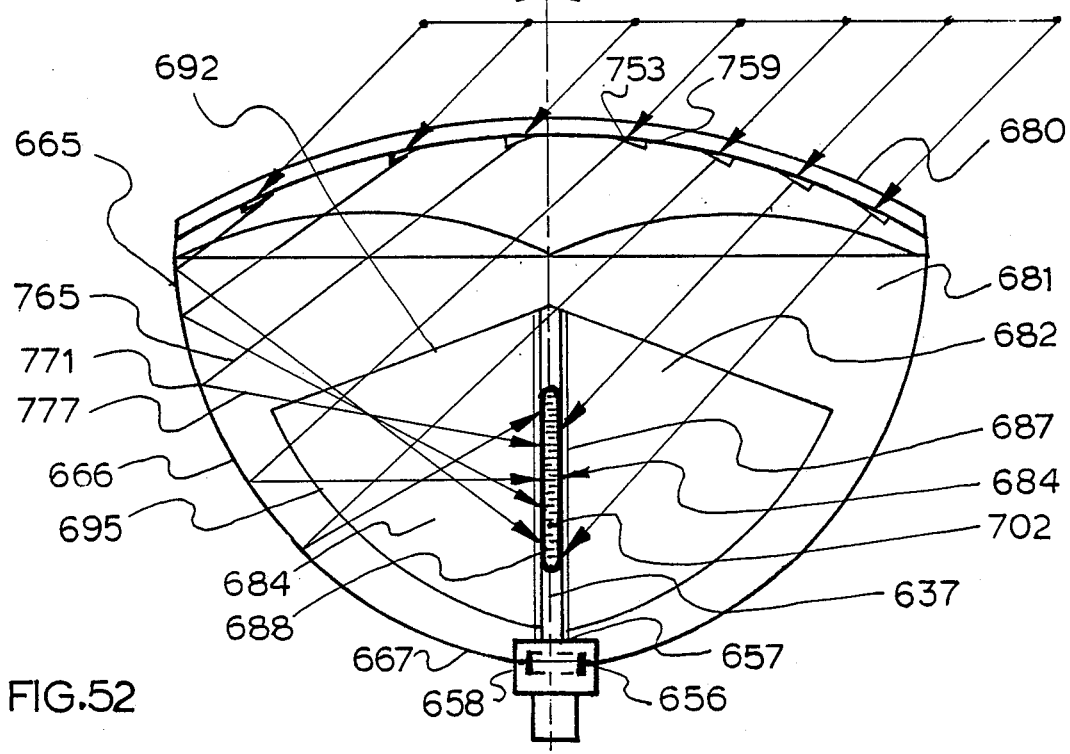
Figure 53:
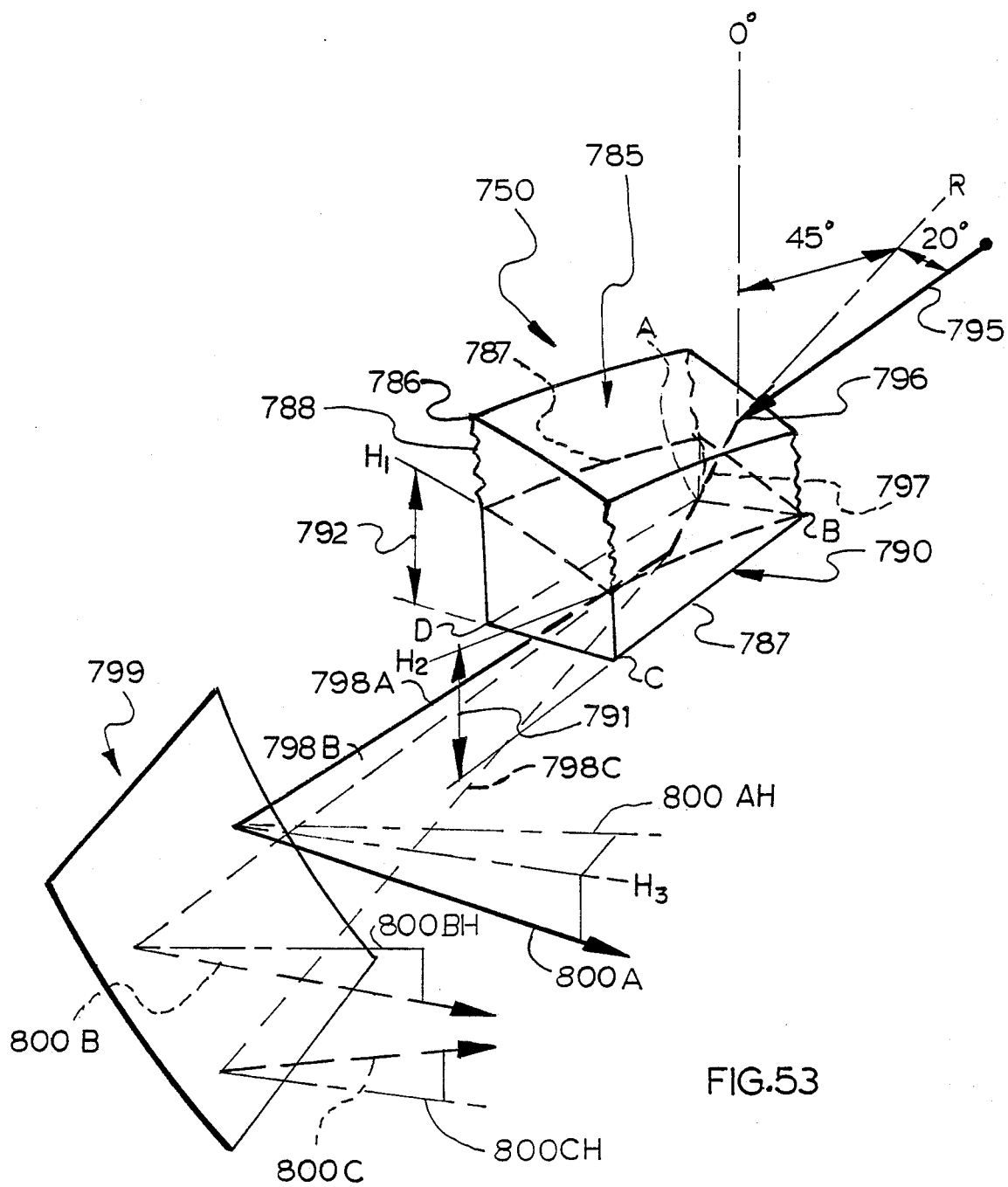
FIG. 53 is a schematic diagram, in perspective, of a prismatic element of the lens depicted in FIGS. 51 and 52, including variations upon bi-directionally inclined emitting surfaces and resultant effects on a single radiant energy ray.

As a group, FIGS. 49–53 illustrate the manner in which the above-described prismatic elements control the distribution of radiant energy to the absorber. FIGS. 49 and 50 illustrate the distribution of rays which enter the lens parallel to axis 637. FIGS. 51 and 52 illustrate how rays incident at a 45° angle to the axis are distributed by the same apparatus. FIG. 53 illustrates how the bi-directionally inclined surfaces of the prismatic elements effect both horizontal and vertical control over the light emitted from the prismatic elements to the reflector surface.

Turning now to FIGS. 49–50, two of six incident rays parallel to axis 637 penetrate lens member 680 and depart it through emission points 753 and 754 (FIG. 50). These two rays, upon emission from emitting surfaces 759 and 760 become refracted rays 766 and 765, respectively. These two rays, along with the other four rays shown and a multitude of other rays not shown, are refracted by the respective prismatic elements through which they pass, so that they are directed to points on the reflector surface which are at higher elevations than the locations at which they would otherwise strike the reflector in the absence of the prismatic elements. Refracted rays striking the reflector surface are illustrated by rays 766 and 765 at reflection points 771 and 772, respectively. The resultant reflected rays, including rays 777 and 778, strike opposite walls 687, 688 of one of three wings 684 of absorber 682. While the space available in these drawings makes it possible to illustrate the paths of only a few of the multitude of rays which enter the lens, the multitude of rays entering different portions of the lens are distributed over the surfaces of the several absorber wings. There the incident radiant energy may be absorbed by any suitable means and captured to perform useful work, such as by energizing photo-voltaic cells distributed in or on the absorber wing surfaces and/or by heating a heat exchange fluid within chambers 702 in the absorber wings.

When fabricated with a winged absorber, as shown in the present embodiment, the present invention can provide an efficient and hospitable operating environment for photovoltaic cells. Such cells may for example be fabricated upon preformed absorber wings. In the alternative, pre-fabricated sheets of such cells, e.g., amorphous silicon photovoltaic cells, may be applied to the external surfaces of preformed synthetic resinous wings, e.g., by ultrasonic welding. A metal insert may be molded into the resinous absorber to collect current from the cells. While an energy conversion means disposed upon the absorber may operate with or without accompanying transfer of heat to or from heat exchange fluid in the absorber, one of the significant potential advantages of installing photovoltaic cells or other energy conversion means on the absorber wings is that the circulation of heat exchange fluid within the chambers of the absorber wings can protect such means from overheating. Also, hot water and electrical energy may be generated simultaneously by the same device.

A significant feature of this preferred embodiment is that the prismatic elements, reflector and absorber wings are shaped and positioned to concentrate incident rays while spreading them in an unfocused fashion over a substantial portion of the surface area of the absorber. This is illustrated in part in FIG. 50, in which it may be seen that the three incident rays to the left of axis 637 are refracted and reflected so as to strike the absorber at a number of elevations representing a vertical range of height, and that other rays entering in the same plane on the same side of the axis will impinge upon the same or different absorber wing surfaces both within and without this range. Other rays entering the lens in other planes can be similarly spread vertically. The same can be true of the three rays entering the lens to the right of axis 637.

The type of spreading just described is produced by the radially outward and downward inclination of the bi-directionally inclined emitting surfaces of the prismatic elements. The tangential inclination of these elements produces a horizontal distributing action which is depicted in FIG. 49. That figure illustrates in part the paths of the same six incident rays depicted in FIG. 50. The lens entry and emission points of these six rays are illustrated in FIG. 49 by a series of six dots spread horizontally across the view below the center of absorber 682. Two of these dots, appearing immediately to the right and left of the vertical center line of FIG. 49, respectively represent incident rays and emission points 753 and 754 of FIG. 50. Connected with the six dots are dashed lines which represent the traces and points of impingement of the resultant refracted rays on the reflector. Reflection is indicated by termination of each of these lines at a point from which commences a new line moving in substantially the opposite direction at an acute angle to the refracted ray. In each case, the new line just mentioned represents the path of a reflected ray generated by reflection of a refracted ray upon the reflector, and the point of impingement of the reflected ray on the absorber wing is represented by an arrowhead.

The right half of FIG. 49 contains two dots at the far right representing incident rays and their emission points in sector AB, in which the prismatic elements impart clock-wise vectors to the refracted rays. As indicated above, the ray traces and their reflection points are indicated by dashed lines. The dashed line adjacent each dot is a refracted ray, emitted by a prismatic element, and the termination of that line is the point where that ray impinges upon the reflector, and is also the point where the corresponding reflected ray begins. Because the prismatic elements in sector AB impart clock-wise vectors to the refracted rays, while the elements in sector BC behave oppositely, the rays incident in section AB can be refracted in a different direction, as compared to incident ray 753 in sector BC. Consequently, the rays incident in AB can reflect from a different wall sector and impinge upon a different absorber wing than the rays incident in BC. However, for the sake of simplicity, all three of the incident rays in the right half of FIG. 49 are shown as though they were refracted in the same direction and reflected from the same wall segment to the same absorber wing.

It will be seen that the three incident rays depicted in the left half of FIG. 49 are caused to strike the left wall of absorber wing 684 at three different points which are spaced horizontally, and that other rays entering the same portion of the lens in the same plane as these three rays will be distributed horizontally over the same absorber wall both within and without the interval including the three impingement points just described. There will also be a horizontal distribution of incident rays entering the lens in other planes throughout its surface and striking not only the left wall of absorber wing 684, but also other walls of the several absorber wings. This horizontal distribution is referred to as horizontal control of the incident radiant energy, while the vertical spreading described above in connection with FIG. 50 is referred to vertical control of the incident radiation.

FIGS. 51 and 52 illustrate what happens in the collector of FIGS. 49–50 when the incident radiation enters the lens at a substantial angle (in this case 45°) relative to axis 637. The particular collector depicted in FIGS. 51 and 52 is identical to that shown in FIGS. 49 and 50, but the positions of the prismatic elements shown in FIG. 52 differ to some extent from those shown in FIG. 50. Those prismatic elements shown in FIGS. 50 and 52 represent but a few selected examples of the many prismatic elements which may be seen in FIG. 49. The reason for selecting a somewhat different group of prismatic elements for illustration in FIG. 52 is to depict the rays which best illustrate the ability of the apparatus to deal with highly angled incident radiation. However, the FIGS. 51–52 device and its principle of operation are just the same as have been described in connection with FIGS. 49–50, and the reference numerals utilized in FIGS. 51–52 refer to parts which are the same as or similar to parts having the same numbers in FIGS. 49–50. The ability of this collector to make efficient use of radiant energy received throughout a wide range of angles relative to its axis represents one of its major contributions to the art.

FIGS. 51 and 52 illustrate the horizontal and vertical control of skewed radiant energy exemplified by seven incident rays, the incident rays and their lens emission points being shown by arrowheads (e.g. 753 in FIG. 52). Two incident rays entering at the extreme right hand portion of the lens in FIGS. 51 and 52 are refracted and emitted along paths which cause them to proceed directly to the right hand wall 687 of absorber wing 684. The remaining five rays are directed to the left wall 688 of the same absorber wing. Of these five remaining rays, two of them enter lens 680, are refracted by prismatic elements to the right of axis 637 and depart through their emitting surfaces, e.g. emitting surface 759. The two resultant refracted rays are directed from the emitting surfaces into cavity 681 through a vertical spacing provided between the underside of lens 680 and the top of absorber 682. While passing through this vertical spacing, the two rays just mentioned are directed to the opposite (left) side of axis 637 toward the left side of reflector 630.

The three remaining rays in the initial group of 7 enter the prismatic elements and are refracted on the left side of axis 637 and are passed through the cavity, also being directed towards the left side of reflector 630. It should be noted that these three refracted rays, and the two other refracted rays which entered the cavity to the right of axis 637 are all refracted in such a manner as to strike the reflector surface outward and upward of the position at which they would strike the reflector in the absence of the lens and its prismatic elements. Note also that these five rays, after reflection (e.g. at point 771) become a group of reflected rays whose points of impingement on left wall 688 of absorber wing 684 are distributed vertically over a substantial vertical interval or distance. As in the prior embodiment, other rays entering lens 680 in the same plane will impinge upon wall 688 both within and without the above-described vertical interval. Note that rays refracted by prismatic elements to the far right of lens 630 are distributed over a substantial vertical interval or distance on the opposite absorber wing wall 687. In similar fashion, other rays entering the lens in other planes will be similarly spread throughout a substantial vertical distance or interval on absorber wing wall 688 and several other walls of this and other absorber wings in the collector, thus achieving vertical control of the incident radiation as above-described.

The same rays which have been viewed in a vertical presentation in FIG. 52 are viewed in a horizontal presentation in FIG. 51, which illustrates their horizontal displacement and horizontal control. In FIG. 51 the incident rays, indicated by dots, exit the lens via their emission points and become refracted rays indicated by dashed lines which terminate at the points of reflection on the reflector. At these points commence new lines which represent the reflected rays and terminate in arrow heads at the respective absorber wing surfaces. Consistent with FIG. 52, the two rays entering the lens at the far right hand side are caused to pass directly to the right hand wall of absorber wing 684. The remaining five rays, as explained in connection with FIG. 52, are caused to reflect from the left side of the reflector and back to the left hand wall of wing 684. The rays striking both the right and left walls of the absorber wing are distributed horizontally, effecting what is referred to as horizontal control. To simplify FIG. 51, the traces of the refracted rays have all been shown more or less parallel to one another; whereas in actual practice they will not necessarily be parallel. For example, the horizontal bending of the three rays incident in sector AB could be greater than is shown, while the bending of the ray in sector BC could be less than shown.

Note also that as the angle of incident radiation changes, as illustrated by a comparison of FIGS. 50 and 52 or of FIGS. 49 and 51, the portion of the absorber wing walls irradiated by the reflected rays also tends to shift to some degree. Thus, in designing a unit in accordance with the invention, the prismatic elements, reflector surfaces and absorber wings are shaped, sized and positioned so that the absorber wings will be in position to receive the incident and reflected radiation as these shifts occur.

FIGS. 49 and 50, on the one hand, and FIGS. 51 and 52, on the other, represent three-dimensional occurrences (simultaneous horizontal and vertical control of light) in two-dimensional plan and cross-sectional views. However, FIG. 53 represents an attempt to illustrate this three dimensional phenomenon in a schematic, perspective view. More specifically, the figure is intended to illustrate how the rays pass to and from the reflector in the absence of the prismatic elements described above, and how such rays are affected by elements having inclination only in a single direction and by bi-directionally inclined emitting surfaces.

In FIG. 53 there is a single prismatic element 750 which has been broken out of the surface of lens 630 of FIGS. 49-52, the remainder of the lens not being shown. Element 750 has an upper surface 785 defined by upper boundary line 786 extending around all four sides of element 750 and having beneath it a similar four-sided dashed lower boundary line 787. Neither of these boundary lines is actually a feature of the lens 630, and they have been placed in the view merely to delineate that portion of the horizontal expanse of the lens in which element 750 is located. The lens material in the vertical expanse between boundary lines 786 and 787 is not required for optical purposes, but represents an integral, spherically shaped shell portion of lens 630 which extends throughout the entire lens surface, and the thickness of this shell is for the purpose of imparting mechanical rigidity and strength to the lens as a whole. Vertical parting lines 788 signify the four corners of that fragmentary portion of the lens shell which is part of element 750.

For simplicity, FIG. 53 has been drawn in a manner which ignores the fact that two sides of the element, viewed from above, are located upon convergent radial lines emanating from axis 637, while the two remaining sides coincide with short arcs of concentric circles centered upon the same axis. Also ignored is the fact that the shell of lens 630 is a spherical rather than planar member. However, these discrepancies do not impair the disclosure of the principles which FIG. 53 is intended to illustrate.

From an optical point of view, the most significant portion of prismatic element 750 lies beneath the shell, i.e. beneath lower boundary line 787, and is a refracting formation (e.g., prism) having a bi-directionally inclined lower surface 790, which is its emitting surface. Emitting surface 790 has four corners A, B, C, D. Corner B is at the same vertical elevation as lower boundary line 787, while the remaining corners A, C and D, owing to the bi-directional inclination of emitting surface 790, are at varying distances below four-sided lower boundary line 787. Double headed arrows 791 and 792 each extend between a pair of reference lines. Each pair symbolizes the inclination of emitting surface 790 in one of its two directions of inclination, and the letters $H_1$ and $H_2$ appearing adjacent each of the two upper reference lines is intended to symbolize the assumption, which has been made for purposes of this illustration, that the upper reference line, as well as the upper and lower boundary lines 786, 787 and the upper surface 785 of the element, are horizontal. In actual practice, the foregoing lines and surface will seldom be horizontal, but that fact does not impair the usefulness of the illustration for teaching the relationship between the inclination of emitting surface 790 and the paths followed by incident and emitted rays.

The path of a sample incident ray 795, entering the element upper surface 785 at entry point 796 is defined by two intersecting planes passing through point 796. The first plane is perpendicular to element surface 785 and parallel to that side of emitting surface 790 which is connected by corners B and C. This plane passes through ray entry point 796 and includes reference lines 0° and R which both pass through the same point and are at an angle of 45° to one another. The second plane includes reference line R and is perpendicular to the first plane. Incident ray 795 is included within the second plane and intersects with the first plane at an angle of 20°. Thus, incident ray 795 approaches surface 785 at a vertical angle of 45° while being skewed at an angle of 20° horizontally relative to the sides of the prismatic element. The path of this ray, subsequent to its penetration of surface 785 at point 796 is traced by a dashed line identified as 797. Upon reaching bi-directionally inclined surface 790, the ray is emitted as a refracted ray 798A which impinges on the surface of reflector 799, which has a curved surface and is tilted to represent a portion of a bowl-like reflector. Impingement on reflector 799 converts refracted ray 798A to a reflected ray 800A. To facilitate three dimensional visualization of the path of this ray, a reference line 800AH, which is itself horizontal and is included in a horizontal reference plane which also includes reference line $H_3$ is included in the sketch. Note that reflected ray 800A is descending as it moves away from reflector 799.

For purposes of comparison, FIG. 53 also shows the paths of the hypothetical emitted rays 798B and 798C which would result, respectively, from adjusting emitting surface 790 first to a uni-directional mode of inclination and then eliminating its inclination altogether. Thus, for example, emitted ray 798B has been drawn based on the hypothetical assumption that the inclination of surface 790 has been altered so that corners A and B have been respectively raised and lowered equal distances so that they are at the same elevation as one another, the same being done to corners C and D so that they are at the same elevation as one another, whereby surface 790 is tilted only in a single direction which is parallel to the line BC as depicted in the drawing. Under these circumstances, a ray refracted by surface 790 would, instead of proceeding as indicated by 798A, follow a different path represented by 798B, striking reflector 799 at the same elevation as ray 798A but at a laterally or horizontally displaced position. The resultant reflected ray is 800B. To assist in visualizing the path of ray 800B, it is provided with a reference line 800BH, a horizontal line appearing in the same vertical plane as reflected ray 800B. Ray 800B, like 800A, descends as it proceeds from reflector 799.

Let us assume a further reorientation of emitting surface 790 in which it is no longer inclined in either direction. Thus, corners A, B, C and D are each positioned the same distance below lower boundary line 787. In these circumstances, the resultant refracted ray 798C will impinge upon reflector 799 in the same vertical plane as ray 798B, but at a lower elevation. Because of its impingement at this lower elevation, at which the inwardly curving wall of reflector 799 is at a lower angle of elevation relative to the horizontal, the resultant reflected ray 800C ascends as it moves away from the point of reflection. Thus, reflected ray 800C is above its horizontal reference line 800CH in the common vertical plane which includes both of them.

Comparison of the impingement points of refracted rays 798A, B and C, as well as their resultant reflected rays 800A, 800B, and 800C demonstrates that prismatic element emitting surfaces having uni- and bi-directional inclination are useful for elevating the impingement points and decreasing the angular elevation (relative to the horizontal) of rays reflected in bowl-like reflectors. This is beneficial since it can be shown, in general, that the greater the angular elevation of reflected rays, the greater the probability of their escaping the collector without impinging upon the absorber. Likewise, comparison of the impingement points of reflected rays 798A and 798B and the paths of reflected rays 800A and 800B shows that bi-directional inclination, as compared to uni-directional inclination, makes it possible to horizontally shift the impingement points and alter the horizontal vectors of rays emitted in bowl-like reflectors.

This capability can be applied to good advantage for the purpose of directing rays to reflector impingement points at which the horizontal vector of their angle of incidence (measured relative to a reference line normal to the reflector at the impingement point) is lessened. This is beneficial because, in general, the smaller this angle of incidence, the smaller the angle of reflection (relative to the same reference line) and the smaller the probability that a reflected ray can skip about the interior in a multiple reflection mode, eventually leading to escape from the reflector bowl without impingement on the absorber.

From the foregoing, it will be seen that prismatic elements with uni- and/or bi-directional inclination can be used to control the vertical) and/or horizontal vectors of emitted rays, and will consequently be of assistance in altering the horizontal and vertical directional vectors of reflected rays. This makes it possible, by distributing a large number of such elements throughout the lens element, and by judicious selection of the shape, size, inclination and orientation of the elements, to maximize the proportion of collected radiation which is actually delivered to the absorber rather than being reflected one or more times by the reflector and then escaping by reverse passage through the lens without encountering the absorber. Moreover, the uni- and bi-directional inclination assists in making it possible for incident radiation to be distributed over a number of absorber wings and over both sides of at least some of the wings as the incident radiation moves through a substantial range of angles relative to the collector axis. As indicated previously, in accomplishing these purposes of the invention, it is considered beneficial to employ about 100 or more prismatic elements in the lens, but the use of about 500 or more is preferred, about 1000 or more being still more preferable and about 2000 or more being most preferred.

Figure 54:
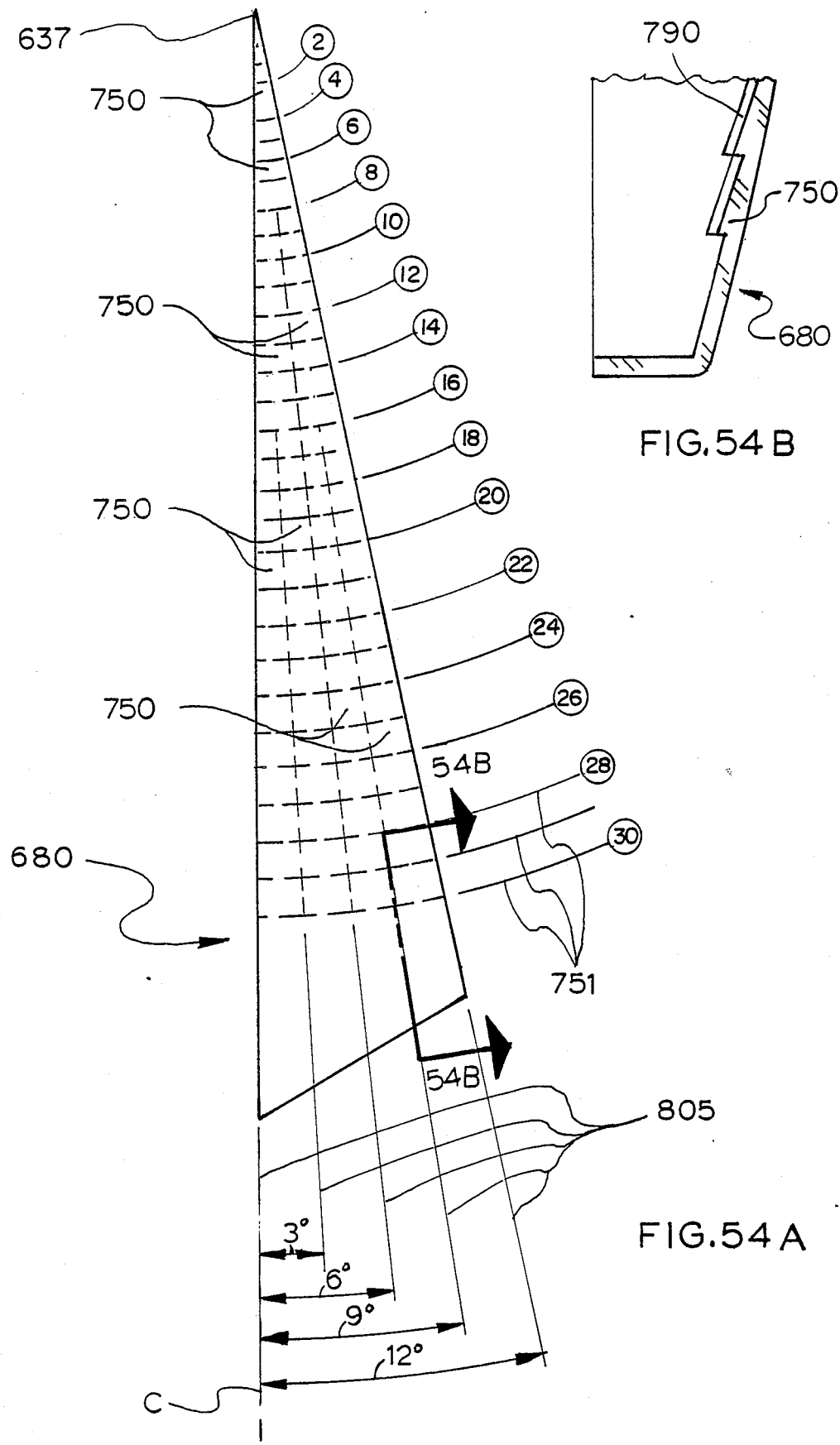
FIG. 54A is an enlarged fragment of the face of the hexagonal lens shown in FIGS. 49 and 51, comprising a 12° wide segment thereof.
FIG. 54B is a sectional view of a fragment of the lens fragment shown in FIG. 54A, taken along section line 54B—54B in FIG. 54A.

FIG. 54A provides a preferred example of how the prismatic elements 750 may be arranged to provide the above-described capabilities. FIG. 54 represents an enlarged portion of the lens element 680 depicted in FIGS. 49 and 51, being a portion of the third sector BC which is defined by lines B and C of those FIGURES. As explained in connection with FIG. 49, the prismatic element emitting surfaces in this sector are bi-directionally inclined so that they incline downwardly in both the radially outward and tangetially counter-clockwise directions. Bi-directionally inclined emitting surfaces 790 may be seen for example in FIG. 54B, taken on section line 54B—54B of FIG. 54A.

As shown in FIG. 54, the lines of demarcation between the prismatic elements 750 are defined by circular lines 751 and radial lines 805. For convenience in discussion and for correlation with Table I below, which contains prismatic element parameters, the rings of elements, starting from the lens center or axis 637, have been numbered 1–30, and the even numbers in this series have been applied to those circular lines 751 defining the outer edges of the elements in the numbered rings. Thus, the numeral 2 appears at the outer edge of the elements in the second ring from the center of the lens, the numeral 4 appears at the outer edge of the elements in the fourth ring from the center and so on through the 30 th ring of elements. As shown in FIG. 54, the elements in rings 1–8 subtend arcs of 12°. In rings 9–16, where the radial lines are spaced apart more widely, the elements are 6° wide. In the remaining rings of elements, numbers 17–30, the angular intervals occupied by the elements are 3°.

Table I below provides prismatic element radial dimensions, i.e., the distance of the element inner edges from the central axis in inches ("), as well as their radial and tangential inclinations in degrees (°), which are presently considered to represent the best mode for practicing the invention when the prismatic elements are arranged in rings as shown in FIGS. 49–52 and 54. However, it should be understood that these values are not intended as limitations upon the invention and may be modified without departing from the invention.

TABLE I

| Ring No. | Radial Dimension | Radial Inclination | Tangential Inclination |
| --- | --- | --- | --- |
| 1 | .750" | 11° 30' | 11° 30' |
| 2 | 1.050" | 12° 00' | 12° 00' |
| 3 | 1.350" | 12° 00' | 12° 00' |
| 4 | 1.650" | 12° 30' | 12° 30' |
| 5 | 2.000" | 12° 30' | 12° 30' |
| 6 | 2.350" | 13° 00' | 13° 00' |
| 7 | 2.700" | 13° 00' | 13° 00' |
| 8 | 3.050" | 13° 30' | 13° 30' |
| 9 | 3.450" | 13° 30' | 13° 30' |
| 10 | 3.850" | 14° 00' | 14° 00' |
| 11 | 4.250" | 14° 00' | 14° 00' |
| 12 | 4.650" | 14° 30' | 14° 30' |
| 13 | 5.100" | 14° 30' | 14° 30' |
| 14 | 5.550" | 15° 00' | 15° 00' |
| 15 | 6.000" | 15° 00' | 15° 00' |
| 16 | 6.450" | 15° 30' | 15° 30' |
| 17 | 6.950" | 15° 30' | 15° 30' |
| 18 | 7.450" | 16° 00' | 16° 00' |
| 19 | 7.950" | 16° 00' | 16° 00' |
| 20 | 8.450" | 16° 30' | 16° 30' |
| 21 | 9.000" | 16° 30' | 16° 30' |
| 22 | 9.550" | 17° 00' | 17° 00' |
| 23 | 10.100" | 17° 00' | 17° 00' |
| 24 | 10.650" | 17° 30' | 17° 30' |
| 25 | 11.250" | 17° 30' | 17° 30' |
| 26 | 11.850" | 18° 00' | 18° 00' |
| 27 | 12.500" | 18° 00' | 18° 00' |
| 28 | 13.050" | 18° 30' | 18° 30' |
| 29 | 13.650" | 18° 30' | 18° 30' |
| 30 | 14.250" | 19° 00' | 19° 00' |

The foregoing preferred dimensions and relationships have been chosen in relation to the following additional dimensions:

| | |
| --- | --- |
| Radius of Lens Outer Surface (spherical) | 57" |
| Radius of Lens Inner Surface (spherical) | 57.7" |
| Lens Thickness | |
| At Center (Shell Thickness) | 0.200" |
| At Periphery (Shell Thickness) | 0.130" |
| Lens Width (flat face to flat face) | 30" |
| Reflector Width (flat side to flat side) | 30" |
| Reflector Bowl Upper Radius | 17.250" |
| Reflector Bowl Lower Radius | 15.843" |
| Locus Displacement | |
| Upper Locus Lateral Displacement | 2.4" |
| Lower Locus | |
| Vertical Displacement | .750" |
| Lateral Displacement | 1.200" |
| Absorber Height (on reflector axis) | 17.5" |
| Angle of Declination, Absorber Upper Edges | 20 degrees |
| Spacing Between Absorber Lower Edges and Reflector Surface | 1.5" |

For purposes of the present embodiment, the parameters applicable to the elements in a given circle in Table I will apply to all of the elements in that same circle all the way around the lens in all four sectors. Thus, the only differences between the elements in a given circle will be the direction (clockwise or counter-clockwise) of their tangential inclination. Within all 30 circles in a given sector, the elements will all incline radially in the same direction, while in the tangential direction all will be clockwise or counter-clockwise. Therefore, in this preferred embodiment all of the elements in the first sector AB (defined by reference lines A and B in FIGS. 49 and 51) and in the fourth sector CD (defined by reference lines C and D in the same figures) will be inclined tangentially in a clockwise direction. Declination of the element emitting surfaces in the radial and tangential directions will vary in amount from one circle to another in accordance with Table I. The same applies for the elements in the second sector AD (defined by reference lines A and D) and the third sector BC (defined by reference lines B and C), except that the direction of tangential inclination is counter-clockwise. The first and second sectors each subtend arcs of 120° centered over two of the absorber wings, while the remaining sectors subtend arcs of 60° on either side of the remaining absorber wing.

Assuming that the absorber is used in a locale which is well above or well below the earth's equator, it is considered best to mount the collector in such a position that its axis and the absorber wing located beneath the dividing line of the two smaller sectors shown in FIGS. 49 and 51 both coincide with a plane extending through the centers of the earth and the sun at solar noon, with the portion of the lens containing the two smaller sectors (i.e., BC and CD) nearest the earth and with the axis of the collector having an angle of elevation halfway between the high and low elevations of the sun during the day. Because of its wide acceptance angle, the collector can accommodate seasonal changes in solar elevation.

A lens of the type described above can, for example, refract incident energy at an angle of about 5 degrees when the angle of incidence relative to the absorber axis is about 0 degrees. As the angle of incidence reaches about 45 degrees, the angle of refraction can be about 60 degrees. Thus, a collector axis elevation which is approximately the same as the latitude of the location at which the collector is installed will generally result in satisfactory operation.

While the lens element may be fabricated in sections, it is preferred to form it in one piece. Any satisfactory forming technique may be used, but injection molding is preferred and compression molding may also be used. For best results, the injection mold gate will be located at the center of the lens. In producing the preferred form of lens described herein, the mold, whatever type may be used, will preferably include one smooth concave spherical surface corresponding to the outer surface of the lens. The other surface of the mold will be multi-faceted, corresponding to the faces of the prismatic elements, but may have smooth areas where no prismatic elements are present. That portion of the mold which forms the radiation emitting surfaces of the prismatic elements needs to be formed with a substantial degree of precision. In general, to prevent localized sinking at the outer surface over the prismatic elements, such elements should have volumes about equal to or preferably less than the volumes of the adjoining portions of the lens shell. An economical technique for constructing the corresponding mold surface will be an important factor in successfully commercializing a collector with this type of lens. It has been found that the requisite mold surface can be economically formed from tooling comprising a plurality of nested concentric rings, as illustrated in FIGS. 55 and 56.

Figure 55:
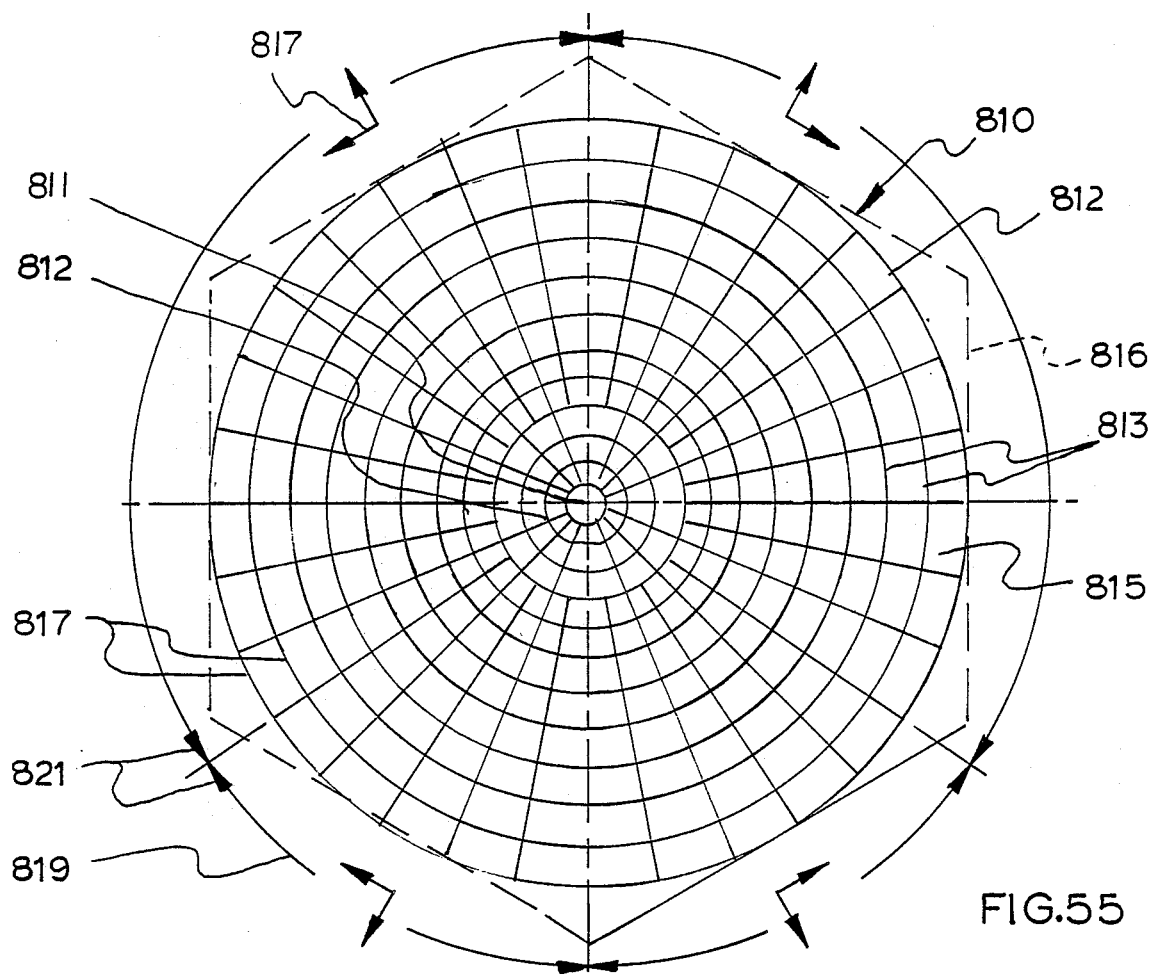
FIG. 55 is a plan view of nested-ring tooling for making the lens of FIGS. 51 and 52.

FIG. 55 is a view from the top of lens tooling 810 having a central axis 811 about which are concentrically arranged a core piece 812 and a plurality of nesting concentric rings 813 of progressively larger inner and outer diameter. Each ring corresponds in inner and outer radius with the inner and outer radial dimensions of one of the rings of prismatic elements which is to be formed in the desired lens. The outer diameter of the core piece 812 is in axially slidable but very close fitting engagement with the inner diameter of the innermost ring 813 which is immediately adjacent to it. The inner diameter of each of the remaining rings is in axially slidable but extremely close fitting engagement with the outside diameter of the next smaller ring. The outer diameter of outermost ring 815 fits within the lens outline 816 and corresponds with the outside diameter of the outside ring of elements to be formed in the desired lens.

The radial lines in FIG. 55 delineate the side boundaries of facets which are formed in each ring and which coincide precisely in size, shape and inclination to corresponding element emitting surfaces to be formed in the lens. In conformity with FIGS. 49 and 51, the lens surface is to be divided into four sectors. Vector couples 817 associated with arcs 819 surrounding outline 816 and terminating in arrow-heads 821 illustrate the extent of the several sectors into which the lens is to be divided and indicate the sense or direction of the bi-directional inclination of the emitting surfaces to be formed in the respective sectors. It will be noted that the radial line extending in FIG. 55 from the center of the tooling vertically downwards to the lowest point of lens outline 816 represents a line of division between two sectors having opposite tangential inclination vectors.

Figure 56:
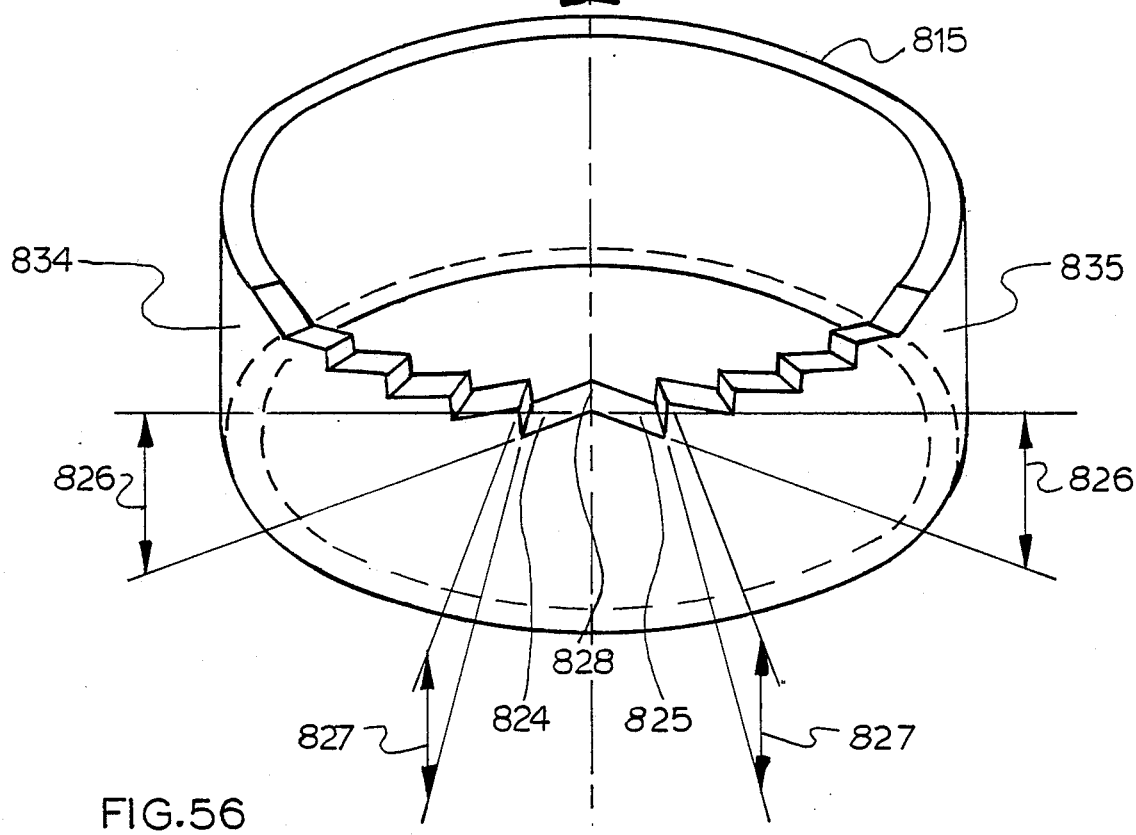
FIG. 56 is a perspective view of the removed ring of FIG. 55 (only a portion of the facets thereof being shown). The ring facets illustrate the bi-directional inclination of the prismatic elements with opposite inclination in different sectors corresponding with the vector indications in FIG. 55.

FIG. 56 is an enlarged perspective view of the outer ring 815 of FIG. 55. In this view, only a portion of the facets formed in the ring have been shown, it being understood that there will be facets all the way around the upper annular surface of the ring. Ridge 828 occurs at the intersections of two tooling facets 824 and 825 located on opposite sides of the line of division between the two lens sectors mentioned at the end of the preceding paragraph. Facets 824 and 825 decline radially outward, as indicated by reference lines joined by arrows 827, and decline in opposite tangential directions as indicated by reference lines joined by double headed arrows 826. Facet 824 is one of several identically shaped and sized facets appearing in a clockwise circumferential sequence to the left of ridge 828, and they are intended for forming a corresponding group of emitting surfaces in the outer ring of prismatic elements in a corresponding sector of the lens surface.

Note that the facet 834, the last facet shown to the left of ridge 828 has reverse inclination in the tangential direction when compared to the adjacent facet to its right, and constitutes the first prismatic element in a group of identically inclined facets in the outer ring of the next adjacent sector of the lens. Similarly, facet 835 is one of a series of identically inclined facets extending in a counter-clockwise direction from facet 835, which have the same radial inclination but opposite tangential inclination as compared to facet 834. Thus, all the way around ring 815, the facets have identical declination in the radially outward direction and similar declination in the tangential direction, except that the tangential declination changes from clockwise to counter-clockwise or vice versa upon entering a group of facets corresponding to another sector of the lens. In corresponding fashion, facets are formed in the upper annular surfaces of the remaining nested rings 813, including some which decline tangentially in the clockwise direction and others decline tangentially downward in the counter-clockwise direction in the several sectors. The numbers and sizes of elements and sectors in the lens may be readily established as desired by adjusting the ring thickness (in the radial direction) and the number, size and direction of inclination of the facets formed in the rings.

The prismatic element emitting surfaces are preferably planar, but may also be slightly convex, concave or irregular, if desired, and the facets in the upper surfaces of the nested ring tooling will be of complementary shape. Since the elevation of the underside of the lens is higher towards its center, as compared to the elevation of its peripheral edges, the nested rings 813 grow progressively higher and their facets are positioned at progressively higher elevations as their diameters decrease. In preferred embodiments having a sufficiently large number of rings of prismatic elements, as illustrated for example in Table I, adjacent pairs of rings of emitting surfaces and corresponding tooling facets have the same elevational and declination parameters for simplified fabrication of the tooling. In a particularly preferred embodiment, the surface of the nested tooling and the corresponding surface of the resultant lens will, notwithstanding the jagged protrusions of the bi-directionally inclined facets and resulting prismatic elements, have a generally spherical shape.

FIGS. 57-74 describe a group of alternative useful embodiments in which the reflector bowl side wall segments form octagonal figures having eight corners and in which the absorber comprises four wing members at angular intervals of about 90° from one another with the wing members extending towards alternate corners in the octagonal figures.

Figure 57:
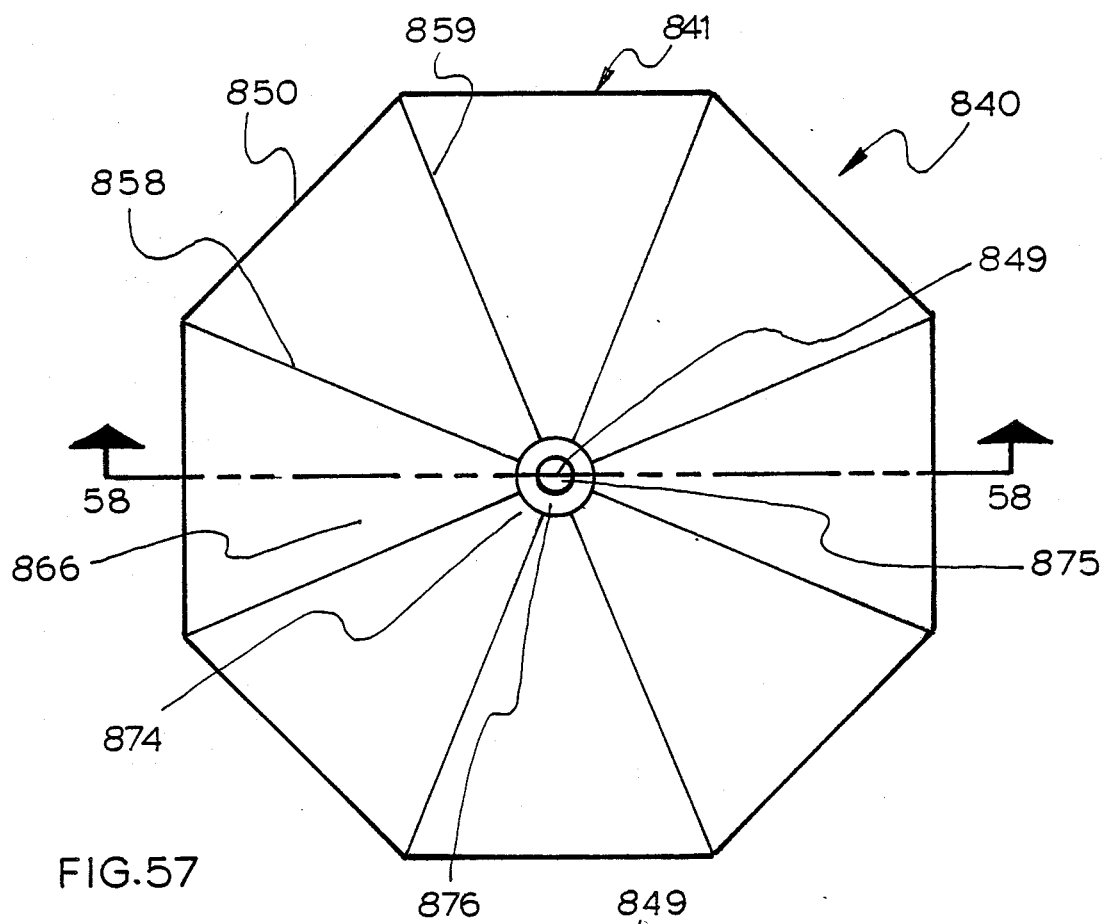
FIG. 57 is a plan view of a octagonal reflector showing eight facets and a flanged mounting hole on the reflector central axis.
Figure 58:
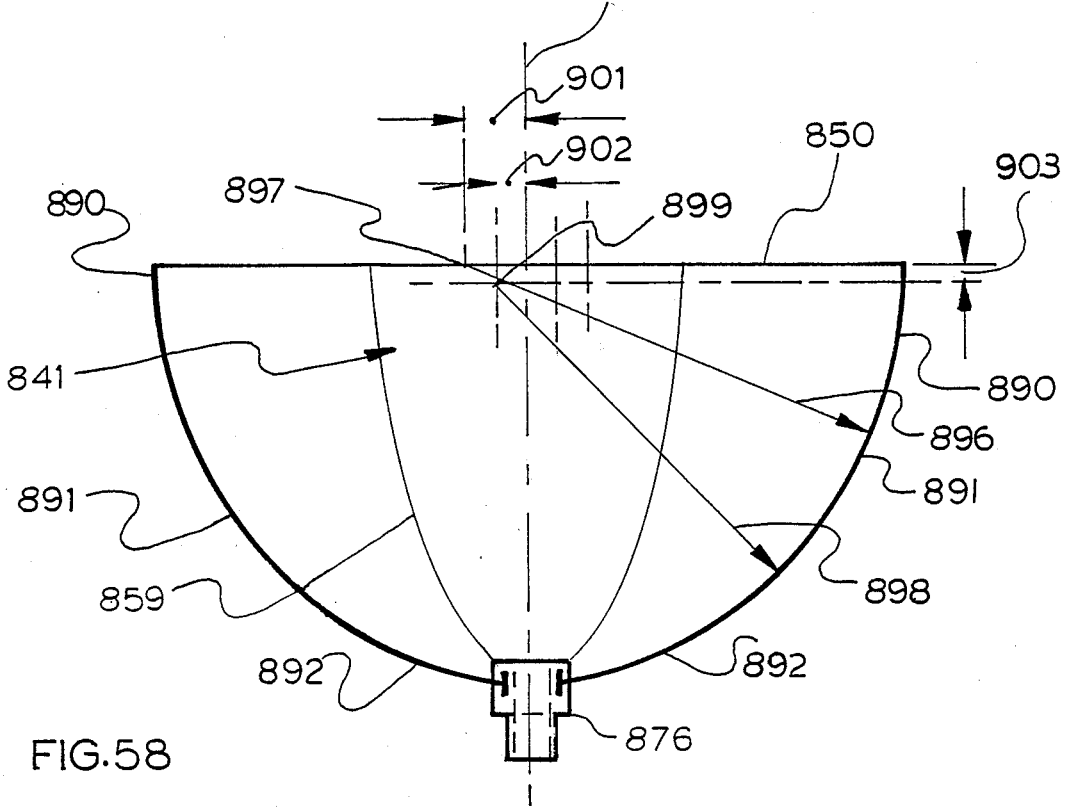
FIG. 58 is a vertical sectional view taken on section line 58—58 of FIG. 57, illustrating the developed curvature of the reflector.

For example, an octagonal bowl reflector 840, viewed in plan view in FIG. 57 and vertical cross section in FIG. 58, includes wall segments 841 symmetrically grouped about central axis 849 and having upper edges 850 and intersections 858, 859. An aperture in the bowl bottom 874 includes a fitting 876 for mounting an absorber as in the prior embodiments.

FIG. 58 shows that the walls of the octagonal reflector bowls may and preferably do include upper 890, transitional 891, and lower 892 side wall portions. Transitional wall portion 891 is located between radial lines 896 and 898, and within wall portion 891 the arcs of different radii represented by radial lines 896 and 898 are joined smoothly at a point where both arcs are tangential or substantially tangent to the same tangent line.

Still more preferably these wall portions 890, 891, and 892 are arranged to include a transition having upper and lower arcuate intervals with upper and lower generating loci respectively. Thus upper generating locus 897 for radius line 896 which defines the curvature of upper side wall portion 890 and about the upper half of transitional wall portion 891 is preferably at the same elevation as the wall upper edges 850 and is offset from axis 849 by a distance 901. Lower generating locus 899 is the center for radius line 898 which defines the curvature for about the lower half of transitional side wall portion 891 and all or substantially all of lower side wall portion 892. Lower locus 899 is offset vertically downward from upper generating locus 897 by a distance 903 and is offset horizontally from axis 849 by a distance 902 which is less than the horizontal offset 901 of upper locus 897. Thus, in this embodiment, the upper locus is further horizontally from the axis than the lower locus, and the distance or radius between the upper arcuate interval of the side wall and its generating locus 897 is greater than the radius or distance between the lower arcuate interval of the side wall and its generating locus 899.

Preferred proportions for the reflector bowl disclosed in FIGS. 57 and 58 include an overall width from side to side of 50 units, a depth of 27.5 units, an upper side wall radius of 29 units generated by an upper locus offset 4 units from the bowl axis, and a lower wall radius of 26.5 generated by a lower locus displaced 2 units horizontally from the axis and 1.25 units below the upper edge of the bowl.

In FIGS. 59–61, a lens and an absorber have been added to the reflector shown in FIGS. 57 and 58. Sealingly engaged with the mouth of the reflector bowl 840, the lens member 906 encloses a cavity 907 within which is absorber 908 having wings 909. As in the prior embodiments, the absorber wings have wing walls, such as 913,914 as well as wing upper edges 921, lower edges 925 and intersections 927. As shown by a comparison of its upper cross-section, FIG. 60, and lower cross-section, FIG. 61, this embodiment of the reflector bowl progressively diminishes in width at successively lower elevations, and this width reduction is accompanied by a progressive shortening of the radial extension of the absorber wings 909 at successively lower elevations. Within wing walls 913, 914 is a chamber 933 for heat transfer fluid.

Figures 62, 63, 64:
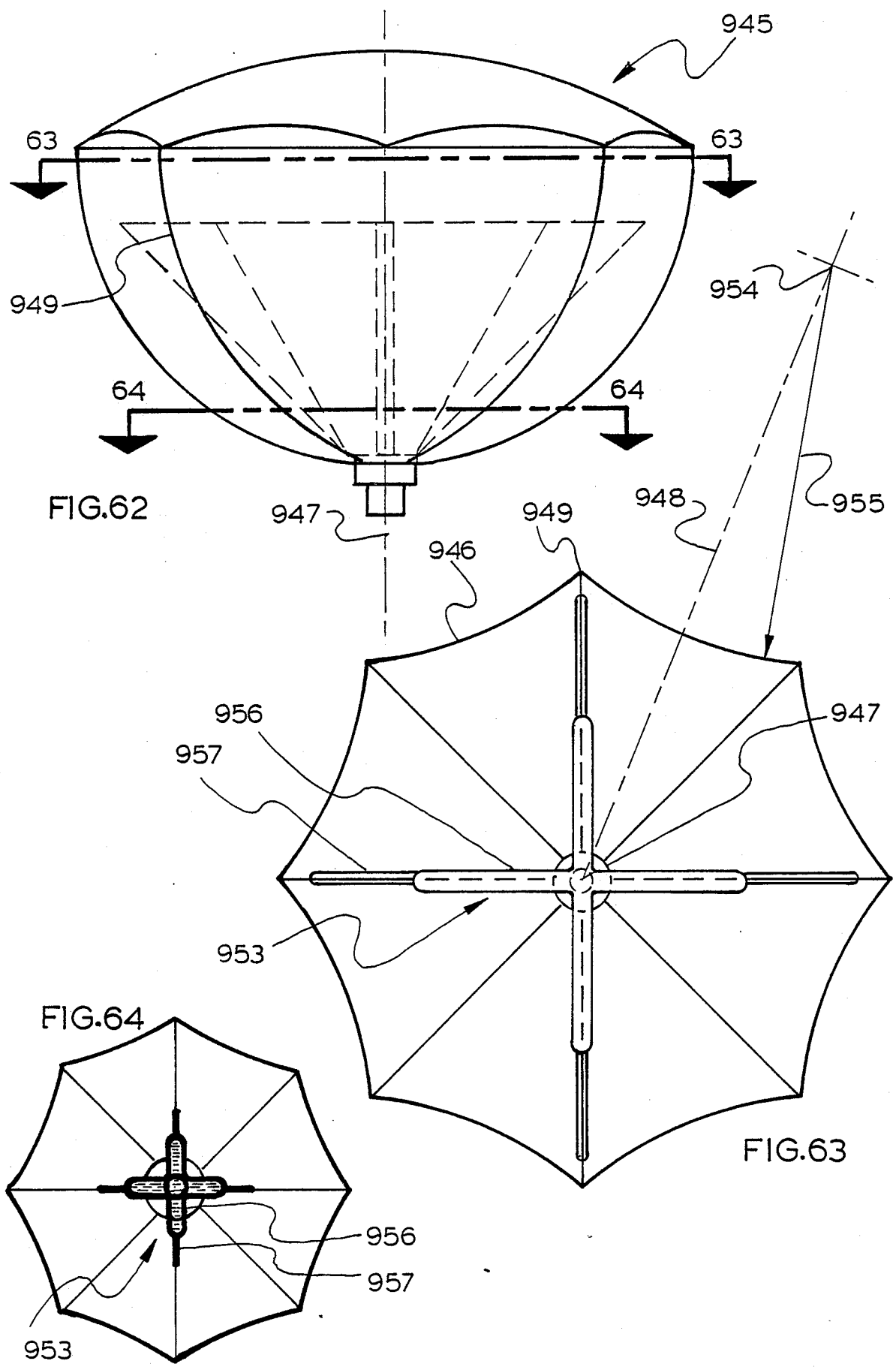
FIGS. 62-64 are similar to FIGS. 59-61, except that the wall segments, as viewed in sectional views 63 and 64, taken respectively along section lines 63—63 and 64—64 of FIG. 62, are convex, i.e. curved inwardly. However in this embodiment the heat exchange fluid passages within the absorber wings extend only partway from the axis to the tips of the wings.

FIGS. 62–64 disclose a collector similar to that shown in FIGS. 59–61, except that it includes curved wall segments and a modified form of absorber wing. In this instance the octagonal bowl reflector of collector 945 includes convex wall segments 946. The wall segments have an inward curvature which appears when the reflector is viewed in plan view (not shown) and in horizontal cross-section, as shown in FIGS. 63 and 64. Here, as in prior embodiments, the convex wall segments are arranged symmetrically, along with a lens member, around an axis 947. The marginal edges of the lens match the outline of the concave walls at the bowl mouth.

The eight convex wall segments of FIGS. 62–64 are similar to the six wall segments of FIGS. 44 and 45. In this example, radius 955 and center 954 are exemplary of a series of radii and centers which define the curvature of each wall segment 946. The centers 954 for the respective radii are each located in one of four vertical planes (e.g. plane 948) which include the central axis 947 and constitute the bi-sectors of the eight wall segments 946. The centers 954 are positioned in their respective planes 948 in such a manner that the intersections 949 of adjacent wall segments will have the same radii as were attributed to the walls of the reflector bowl in the description of FIGS. 57 and 58.

As in prior embodiments, collector 945 includes an absorber having wings 953. These wings fill the vertical cross-section (FIG. 62) of the reflector bowl to a greater extent than those shown in FIG. 59, and this is desirable. In general, the more fully the absorber wings fill this cross-section, the more effective they are in preventing multiple reflections of light on the interior surfaces of the reflector. Analysis of the lens-reflector-absorber combinations of the present invention shows—at least in the case of the preferred embodiments—that those configurations which tend to permit increasing quantities of multiple reflections tend to be most likely to lose radiation by reflection back through the lens to the exterior of the collector. However, as shown by FIGS. 63 and 64, the entire expanses of the absorber wings need not be hollow. Thus, the absorber wings 953 of this embodiment include hollow portions 956 enclosing fluid chambers as in the prior embodiments, as well as non-hollow portions 957 constituting outward marginal portions of the absorber wings which point towards and approach quite near the reflector wall intersections 949.

FIGS. 65 through 67 illustrate the fact that the absorbers of the present invention may have concave reflector walls. Thus, FIG. 65 discloses a collector 963 having a lens 971 mated with an octagonal bowl reflector provided with concave, curved wall segments 964 arranged symmetrically about central axis 967 and having intersections 965. Wall segments 964, in common with prior embodiments, may have upper and lower arcuate intervals (not shown) having upper and lower generating loci (not shown) which may be arranged in a manner similar to that discussed in connection with FIGS. 62–64.

The concavity of each wall segment 964 is defined by a series of radii 969 centered on centers 968 located in one of four reference planes 975, each of which includes the collector central axis 967 and constitutes the bi-sector of two wall segments 964. The centers 968 are arranged in their respective reference planes 975 so that the intersections 976 between wall segments 964 and their respective reference planes 975 exhibit the same radii in vertical cross-section as the wall segments of FIG. 58. The upper edges 970 of wall segments 964 define the mouth of this octagonal reflector bowl. Sealing or snap-fit engagement between the bowl mouth and lens member 971 form a cavity 972 which, as in prior embodiments, contains an absorber 973.

This embodiment, as shown particularly in FIGS. 66 and 67, discloses an additional alternative form of absorber configuration and positioning. Here, the outer tips 979 of absorber wings 974 point towards the outermost portions of concave wall segments 964. As shown particularly in FIG. 65, portions of wings 974 may actually extend into the concavity of the wall segments. FIGS. 66 and 67 illustrate narrowing of the wings and of the fluid chambers 982 within them, as walls 980 and 981 approach their intersections at their edges. As shown in FIG. 67, the preferred angle of convergence of walls 980 and 981 is about 4°.

Figure 68:
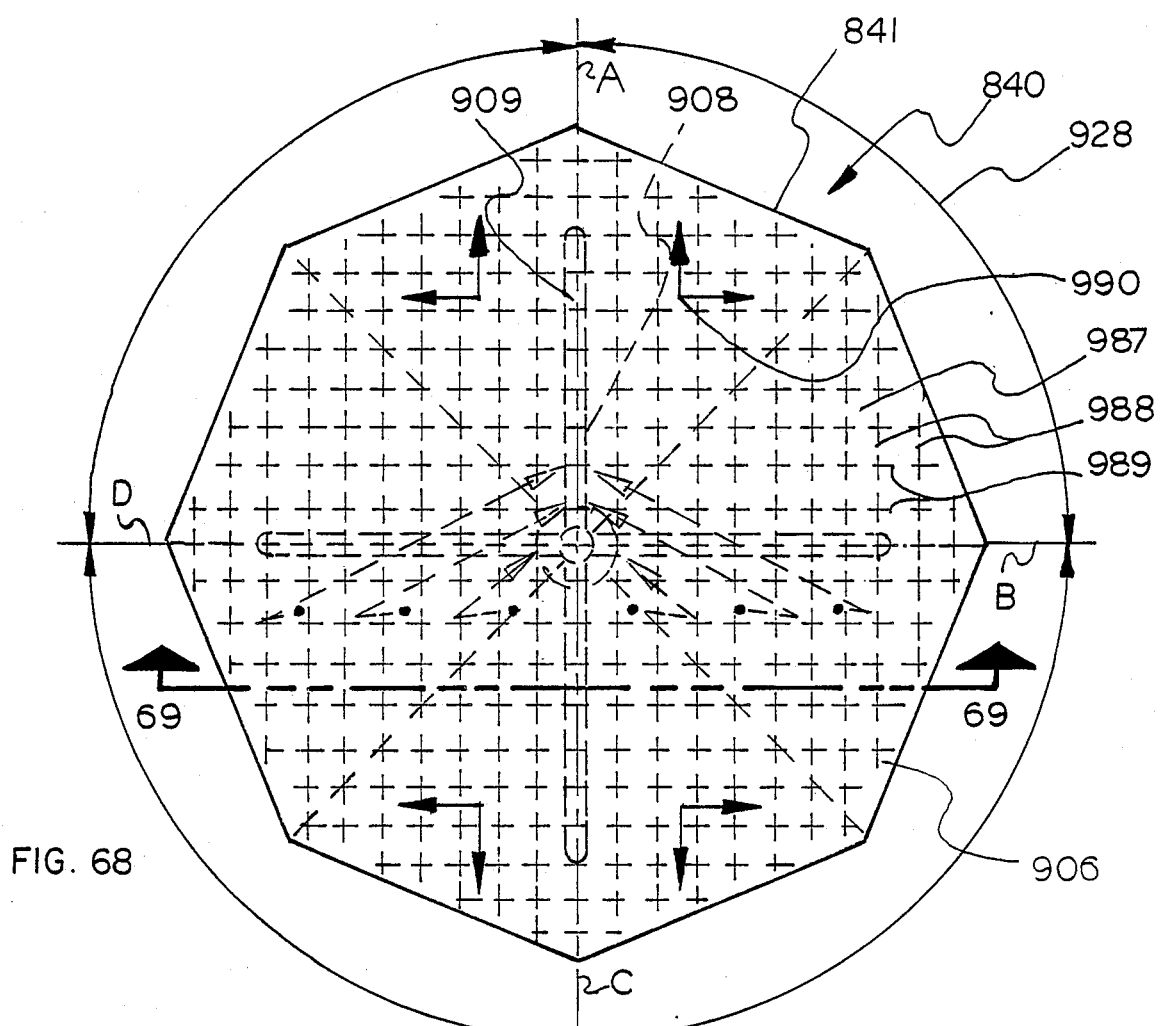
FIG. 68 is a plan view of the collector of FIG. 57 showing the octagonal lens face with its prismatic elements and, in phantom outline, an absorber assembly within the collector.
Figure 69:
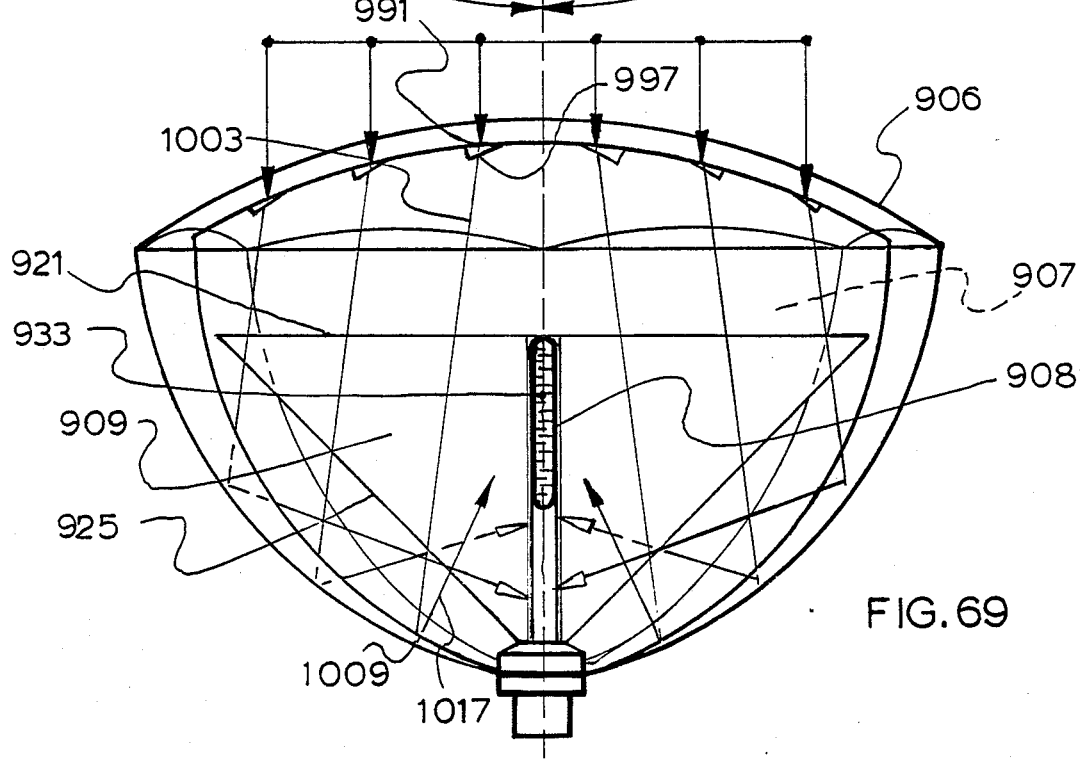
FIG. 69 is a vertical sectional view of the collector of FIG. 68 taken on section line 69—69 of FIG. 68. Arrows in FIGS. 68 and 69 illustrate radiant energy input parallel to the collector axis and simultaneous irradiation of several absorber wings.

As FIGS. 49-52 illustrated a form of lens considered particularly useful in connection with the reflectors described in FIGS. 38-48, FIGS. 68-71 illustrate a type of lens considered particularly useful in connection with the reflector bowl alternatives disclosed in FIGS. 57-67. In FIGS. 68 and 69 the collector includes an octagonal bowl reflector 840 similar to that shown in FIG. 58 and having eight wall segments arranged in symmetrical octagonal fashion about a central axis to define a cavity 907 containing absorber 908 with wings 909. The absorbers include wing walls with upper edges 921 and fluid compartments 933. Lens member 906 is mated to reflector 840 and includes a plurality of prismatic elements or segments 987 which are of substantially rectangular outline. Thus these segments may be true squares and/or rectangles having right angles at their corners and/or other shapes, such as parallelograms, for example, which approximate rectangular shape.

According to this particularly preferred embodiment, the edges of the elements extend along intersecting first and second sets of parallel lines which sets may be perpendicular or at other angles to one another. For example, in FIGS. 68-71 the prismatic elements are distributed substantially throughout the lens face and are arranged in arrays including elements whose edges extend along a first set of parallel lines 988 a second set of parallel lines 989 and along a second set of parallel lines 989 that are perpendicular to lines 988. In a somewhat similar but distinguishable fashion, as compared to the prismatic elements of FIGS. 49-52, the prismatic elements in FIGS. 68-71 are divided into plural groups of planar inclined surfaces in plural sectors of the lens face which are respectively inclined for refracting rays in directions which include opposite vectors.

The aforementioned sectors are at least two in number and, in this preferred embodiment, there are four sectors located, respectively, between reference lines A and B, reference lines B and C, reference lines C and D, and reference lines D and A, referred to hereinafter as sectors AB, BC, CD and DA. The extent of these sectors is further indicated by arc lines, such as arc line 928. From this it will be seen that the four sectors represent four quadrants of the lens, viewed in plan view, and that the dividing lines between the respective sectors overly the four wings 909 of absorber 908, whose outer tips point towards alternate intersections between wall segments 841. Vector couples 990 in each segment indicate the directions of bi-directional declination of the emitting surfaces of the prismatic elements within the respective sectors.

In this embodiment, the emitting surfaces of the prismatic elements are generally planar, bi-directionally inclined surfaces, six representative examples of which are shown in FIG. 69, and one of which is identified by reference numberal 997. FIGS. 68 and 69 trace the paths of rays of radiant energy which enter the lens at entry points such as 991, pass through the six representative prismatic elements, become emitted rays (e.g., ray 1003), strike the reflector at impingement points (e.g., point 1009), pass as reflected rays (e.g., ray 1017) to the absorber wings 909, and impinge therein over a substantial area. Thus, energy is provided to heat a fluid in fluid chamber 933 within the absorber.

Representative sideward components of refraction attributable to the bi-directional inclination of the emitting surfaces of prismatic elements 987 are shown in FIG. 68, while upward components of such refraction are shown, for the same rays, in FIG. 69. In the present embodiment, a sideward component of refraction is a redirecting of incident rays which tends to cause the ray impingement points to shift laterally on the reflector in a manner which can be seen when the viewer's line of sight is parallel to the reflector axis. In this embodiment, an upward component of refraction is a bending of incident rays which tends to cause the ray impingement points to shift upward, i.e., to a higher elevation, on the reflector. Such an upward shift occurs in a manner which can be seen when the viewer's line of sight is perpendicular to the reflector axis. Thus, FIGS. 68 and 69 together show how the bi-directionally inclined surfaces, oriented and positioned in the lens member, cause portions of the flux to refract with both upward and sideward components of refraction toward adjacent sidewalls of the reflector and to reflect from the reflector to the absorber wing surfaces.

Figure 70:
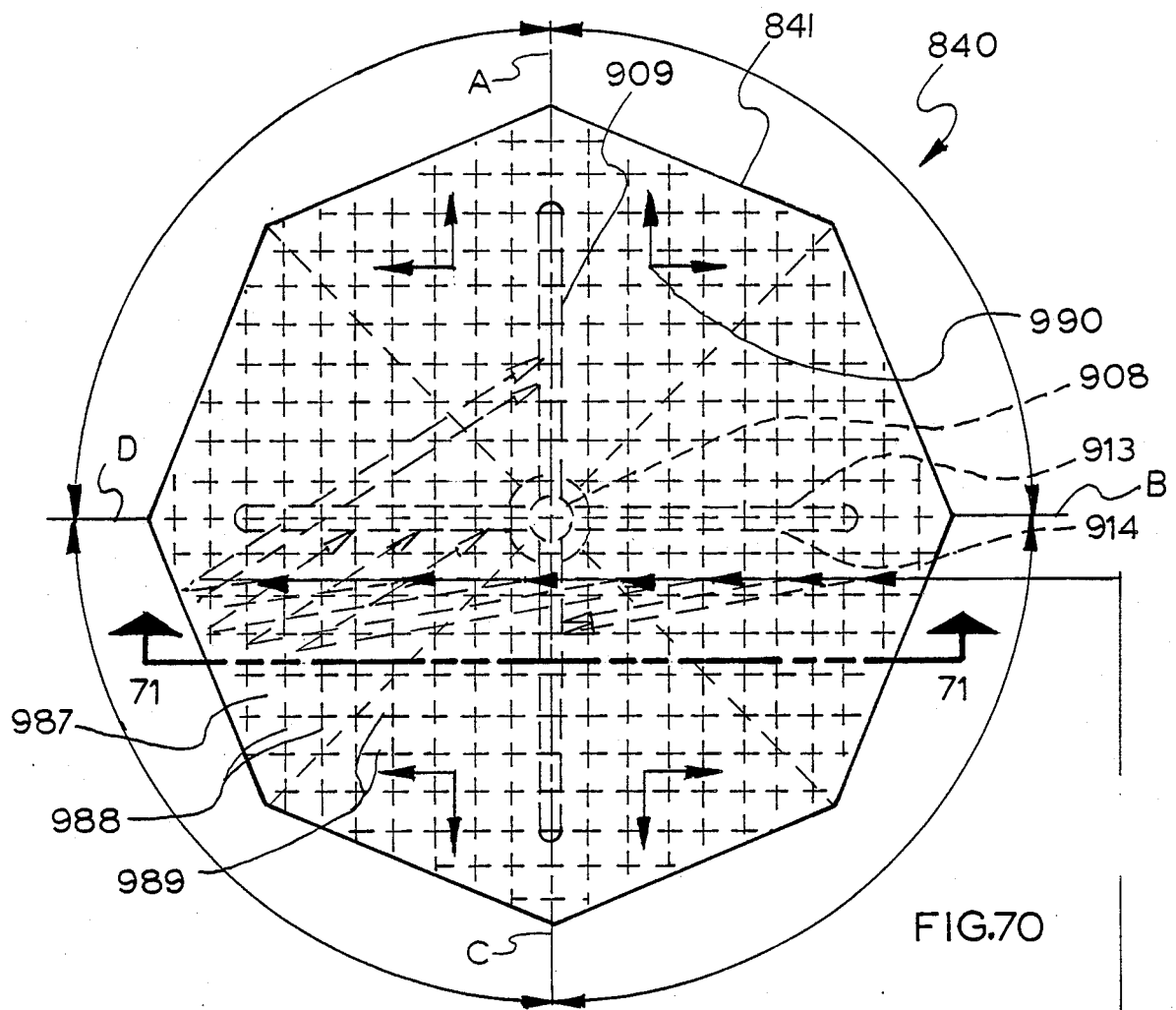
FIGS. 70 and 71 are similar to FIGS. 68 and 69, except that the radiant energy input is at a 45° angle of incidence relative to the collector axis as shown in FIG. 71. Arrows in both Figures illustrate horizontal and vertical control of the radiant energy input by the lens optic system and simultaneous irradiation of several absorber wings.
Figure 71:
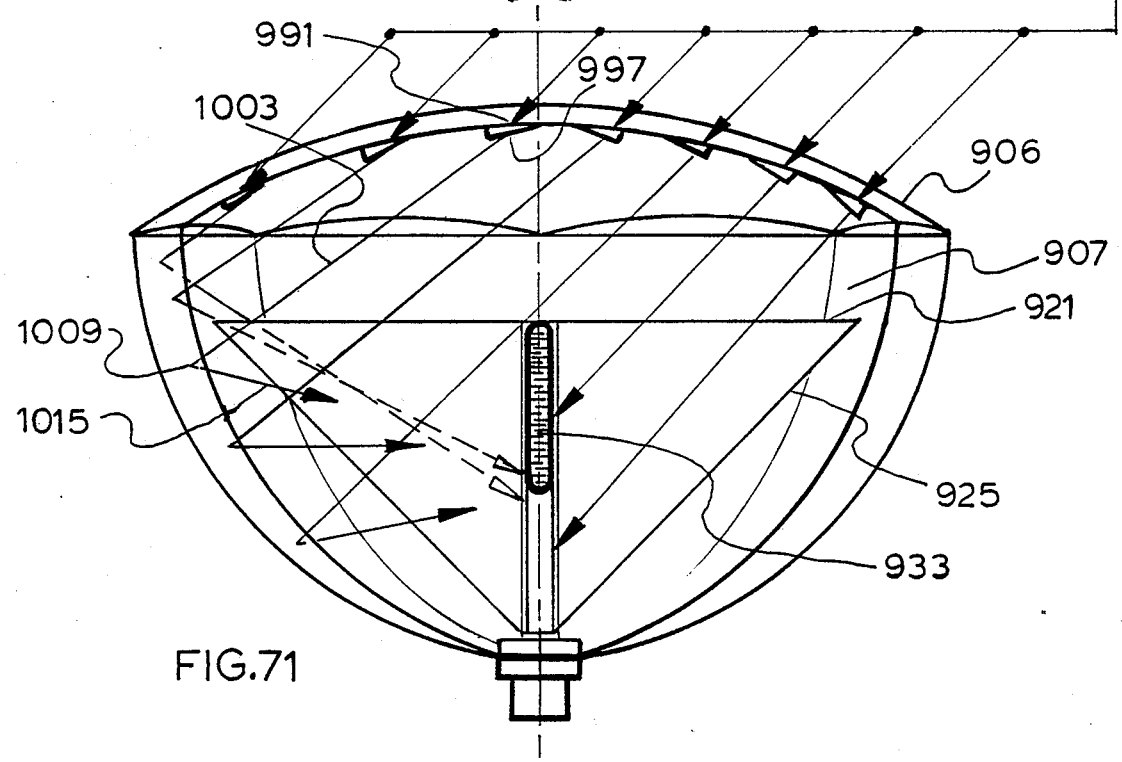

FIGS. 70 and 71 illustrate a collector identical to that shown in FIGS. 68 and 69, except that a somewhat different group of representative prismatic elements has been selected for depiction in order to better show the ability of the device to handle incident rays which enter the lens at a substantial angle to its axis. Thus, the collector of FIGS. 70 and 71 is identical to that of FIGS. 68 and 69 in respect to the size, shape and orientation of the reflector bowl, absorber and lens. In FIGS. 70 and 71, the radiation enters the lens at an angle of 45° to the lens axis. Note that the two rays at the far right in FIG. 71 pass through the lens, are refracted by prismatic elements 997 with both vertical (FIG. 71) and horizontal (FIG. 70) components of refraction and proceed directly to one of the absorber wings. The third and fourth rays, counting from the right, enter on the right side of the axis, cross the axis in cavity 907 and impinge upon the reflector wall to the left of the axis, from which point of impingement they are directed toward the other side of the same absorber wing struck by the first two rays. The fifth, sixth and seventh incident rays enter the lens to the left of the axis. They are refracted toward the left side of the reflector bowl with upward and horizontal vectors and are reflected from points of impingement 1009 as reflected rays which pass to the absorber. As is best shown in FIG. 70, the sixth and seventh rays pass under one of the absorber wings before impinging on another wing. As in the case of the FIGS. 49-52 embodiment, the embodiment shown in FIGS. 68-71 traces the paths of only a few of the myriad of individual rays which will enter the device, it being understood that the remaining prismatic elements will guide these additional rays to the reflector and from thence to the absorber in such a manner that a very high proportion of the incident flux is distributed in a concentrated but unfocused manner upon a substantial proportion of the absorber surface, including absorber wing walls facing toward and away from the radiant energy source.

Figure 72A:
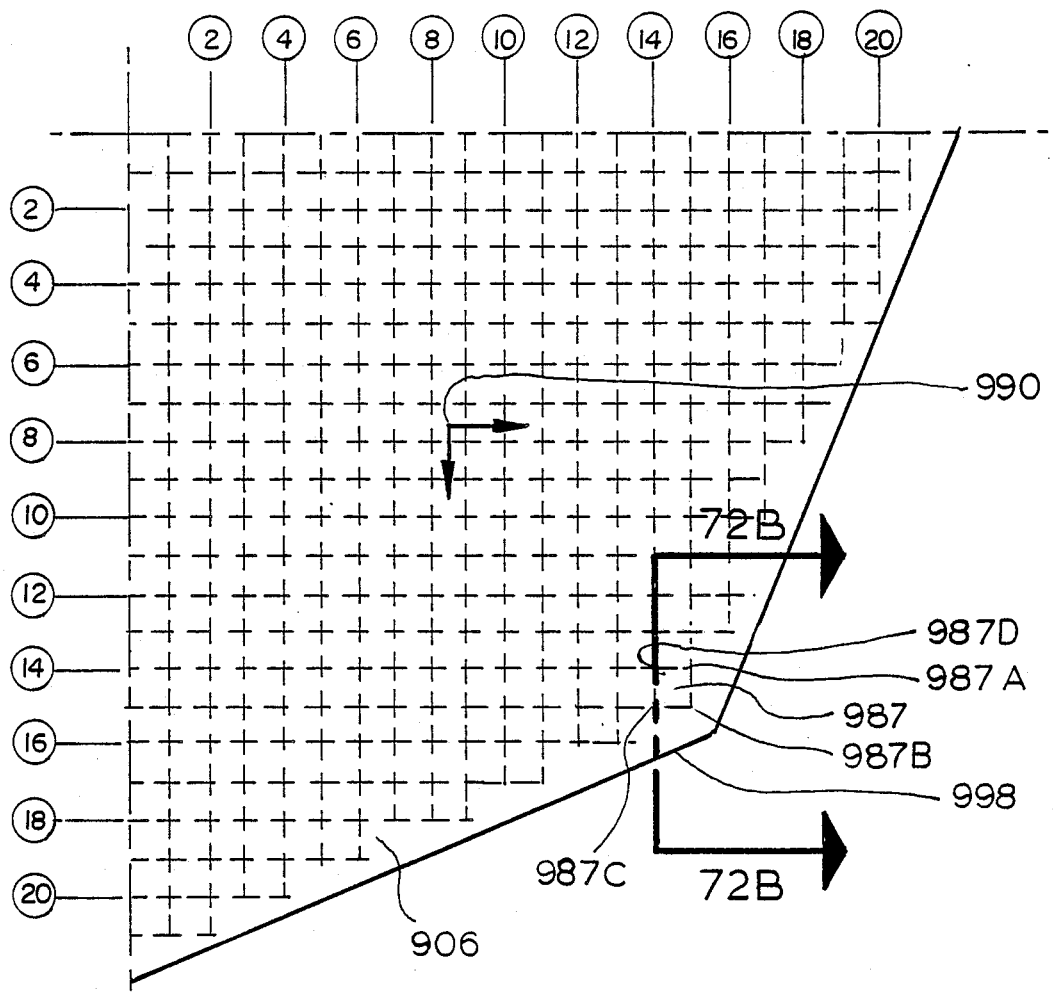
FIG. 72A is an enlarged fragment of the face of the octagon lens shown in FIGS. 68 and 70, showing the prismatic elements in greater detail.
Figure 72B:
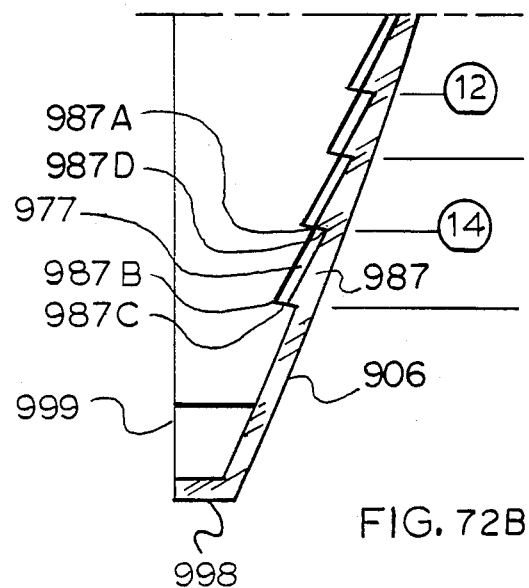
FIG. 72B is a sectional view of a fragment of the lens fragment shown in FIG. 72A, taken along section line 72B-72B in FIG. 72A.

FIGS. 72A and 72B disclose in greater detail the lens depicted in FIGS. 68-71. FIG. 72A shows what the lower right hand quadrant of the lens of FIGS. 68 and 70, defined by reference lines B and C, would look like when enlarged. In FIGS. 68 and 70, solely for the sake of clarity in these relatively small scale views, the prismatic elements are larger and fewer in number than those which would be used in the most preferred embodiments.

As shown in FIG. 72A, the lines of demarcation between the prismatic elements are defined by north-south lines and east-west lines similar to lines 988 and 989 of FIG. 70. For convenience in discussion and for correlation with Table II below, which details preferred lens parameters, the rows of elements, starting from the lens center or axis, have been numbered 1–20, and the even numbers in this series have been applied to those north-south and east-west lines defining the outer edges of the elements in the numbered rows. These row numbers, used in combination with sector identifiers, provide a convenient system for uniquely identifying all of the elements. Thus, the sample element 987 in FIG. 72A is uniquely identified by the combination of its sector identifier (BC), north-south row (15) and east-west row (15).

Sectional FIG. 72B, taken along section line 72B—72B in FIG. 72A, cuts through the lens along the line of demarcation between north-south rows 14 and 15, and thus shows sample element 987 and three of its northerly neighbors in north-south row 15. Each of the elements has NE (northeast), SE (southeast), SW (southwest) and NW (northwest) corners, such as illustrative corners 987A, 987B, 987C and 987D respectively. Element 987 has a north edge which connects the corners 987A and 987D, and which is the south edge of the adjoining element to the north. Corners 987B and 987C are connected by the south edge of element 987, while the east and west edges of the element respectively connect corner 987A with corner 987B and corner 987C with corner 987D. In the preferred embodiment shown in FIGS. 72A and 72B, the elements are generally square, as viewed in plain view, and their sides are each 0.5 inches long.

Bi-directional inclination of the light emitting surfaces in the lower or inner face of lens 906 is illustrated in FIG. 72B. In this sectional view, the fact that NE and SE corners 987A and 987B respectively appear at lower elevations than NW and SW corners 987D and 987C shows that the emitting surface 977 of element 987 is inclined downwardly from west to east. Similarly, the lower elevation of SW and SE corners 987C and 987B, as compared to NW and NE corners 987D and 987A respectively, shows that surface 977 is also inclined downwardly from north to south. Note that inclination in these directions is indicated by the vector couple 990 appearing in FIG. 72A at the intersection of N-S row 8 and E-W row 10, and is present in all of the elements in this sector.

The N-S and E-W declination of these emitting surfaces 977 is preferably smaller in the elements nearer the center or axis of the lens 906, and increases, preferably progressively, to larger angles of declination in the elements nearest the lens outer edge 998. The N-S and E-W angles of declination may conveniently be referenced to the plane which includes the horizontal lower edge 999 of the lens, shown in FIG. 72B.

Another lens characteristic which can and preferably does vary with increasing distance from the axis of the lens is the elevation of the prismatic element emitting surfaces with respect to the above-mentioned plane. For example, in FIG. 72B, note how the elevations of those emitting surfaces 977 which are progressively nearer lens outer edge 998 decrease relative to the plane which includes the lens lower edge 999.

Although it is preferred that the above-mentioned declinations and elevations generally increase and decrease respectively with increasing distance from the lens axis, this does not require that every prismatic element be characterized by declinations and an elevation which are unique among all of the elements in a given sector or lens. From the standpoint of simplifying and economizing on the design and fabrication of tooling for making the lens, it is advantageous to divide the elements in a sector or lens into groups in which the elements have common, i.e. substantially the same, declinations and/or elevations. Various arrangements can be used for selecting which elements will be combined into groups exhibiting common declinations and/or elevations. Such selections will preferably be made with the object of capturing as large a proportion of the incident flux as is economically and technically feasible, by maximizing the amount of rays which transit directly and indirectly from the lens to the absorber.

For example, according to the presently preferred arrangement, the lens elements are divided into groups whose N-S and E-W row numbers are in prescribed ranges. This mode of grouping elements can be applied starting at the central axis of the lens and continuing outward to include those elements most distant from the axis in each sector of lens 906. An example of such a group is the elements whose N-S and E-W row numbers are 1 or 2, and it includes (a) a first element in N-S row 1 and E-W row 1, (b) a second element in N-S row 1 and E-W row 2, (c) a third at N-S row 2 and E-W row 1 and (d) a fourth element at N-S 2, E-W 2. A further example is the group of elements whose N-S and E-W row numbers are 3 or 4. Further examples are groups which encompass row numbers 5 or 6 for the next group; row numbers 7 or 8 for the next following group; and so on. Analysis of the groups so formed will show that they are arranged in the shape of the letter "L", which is either forwardly facing or, in this case, facing backwards, and which is either upside down or, in this case, right side up.

Table II, below, provides values for N-S declination, E-W declination and elevation for the lowest points of the emitting surfaces in specified groups of elements in the lens of FIGS. 68–71, 72A and 72B. In this table, all elements having the indicated E-W and N-S row numbers and positioned along the E-W and N-S edges of the sectors have the indicated elevations, while the remaining elements having the same row numbers but not situated on the edges of the sectors are disposed at appropriate elevations so that the highest elevations of their emitting surfaces coincide with a spherical surface having the radius given below under "Radius of Lens Inner Surface". All elements whose E-W and N-S row numbers are in the same range (e.g., 1-2, 3-4, 5-6 and so on) have the same declination whether they are positioned at the edges or elsewhere in the sectors. The values in Table II, though considered to represent the best mode for practicing the invention with an octagonal lens, are exemplary in nature and can be altered without departing from the scope of the present invention.

TABLE II

| E-W and N-S Row Nos. | Elevation above lower edge of lens | North/South Inclination | East/West Inclination |
|---|---|---|---|
| 1 | 2.340" | 11° 30' | 11° 30' |
| 2 | 2.320" | 11° 30' | 11° 30' |
| 3 | 2.310" | 12° 00' | 12° 00' |
| 4 | 2.300" | 12° 00' | 12° 00' |
| 5 | 2.280" | 12° 30' | 12° 30' |
| 6 | 2.260" | 12° 30' | 12° 30' |
| 7 | 2.240" | 13° 00' | 13° 00' |
| 8 | 2.220" | 13° 00' | 13° 00' |
| 9 | 2.200" | 13° 30' | 13° 30' |
| 10 | 2.160" | 13° 30' | 13° 30' |
| 11 | 2.100" | 14° 00' | 14° 00' |
| 12 | 2.050" | 14° 00' | 14° 00' |
| 13 | 2.000" | 14° 30' | 14° 30' |
| 14 | 1.950" | 14° 30' | 14° 30' |
| 15 | 1.900" | 15° 00' | 15° 00' |
| 16 | 1.840" | 15° 00' | 15° 00' |
| 17 | 1.760" | 15° 30' | 15° 30' |
| 18 | 1.700" | 15° 30' | 15° 30' |
| 19 | 1.620" | 16° 00' | 16° 00' |
| 20 | 1.530" | 16° 00' | 16° 00' |
| 21 | 1.450" | 16° 30' | 16° 30' |
| 22 | 1.360" | 16° 30' | 16° 30' |
| 23 | 1.280" | 17° 00' | 17° 00' |
| 24 | 1.160" | 17° 00' | 17° 00' |
| 25 | 1.080" | 17° 30' | 17° 30' |
| 26 | .950" | 17° 30' | 17° 30' |
| 27 | .820" | 18° 00' | 18° 00' |
| 28 | .710" | 18° 00' | 18° 00' |

The foregoing dimension and angles are predicated on and correspond with the following additional dimensional relationships considered to apply to the best mode of practicing the embodiment of the collector illustrated in FIGS. 68-27B:

| | |
|---|---|
| Radius of Lens Outer Surface (spherical) | 57" |
| Radius of Lens Inner Surface (spherical) | 57.7" |
| Lens Thickness (upper surface to lowest) | |
| At Center (shell thickness) | 0.200" |
| At Periphery (shell thickness) | 0.130" |
| Lens Width (flat face to flat face) | 30" |
| Reflector Width (flat side to flat side) | 30" |
| Reflector Bowl Upper Radius | 17.250" |
| Reflector Bowl Lower Radius | 15.843" |
| Locus Displacement | |
| Upper Locus Lateral Displacement | 2.400" |
| Lower Locus | |
| Vertical Displacement | 0.750" |
| Lateral Displacement | 1.200" |
| Absorber Height | 17.5" |
| Angle of Declination, Absorber Upper Edges | 0° |
| Spacing Between Absorber Lower Edges and Reflector Surface | 1.5" |

The parameters applicable to the elements in a given sector apply to all similarly situated elements in the other sectors of lens 906. Thus, the only differences between the elements in a given sector as compared to similarly situated elements in a different sector will be the directions of their inclination. The direction of inclination in sectors AB, BC, CD and DA of this preferred embodiment are shown by the vector couples 990 in FIG. 68. The preferred mode for positioning this collector is the same as that set forth above for the collector of FIGS. 49-52, 54A and 54B.

A lens of the general type described herein provides many benefits. When constructed according to the above-described preferred embodiments and used with a polygonal reflector and multiple winged absorber, it can provide the important benefit of distributing energy to both faces of all or a plurality of absorber wings throughout a substantial range of angles of incidence. This, in turn, promotes rapid and uniform heating of the heat transfer fluid.

Figures 73, 74:
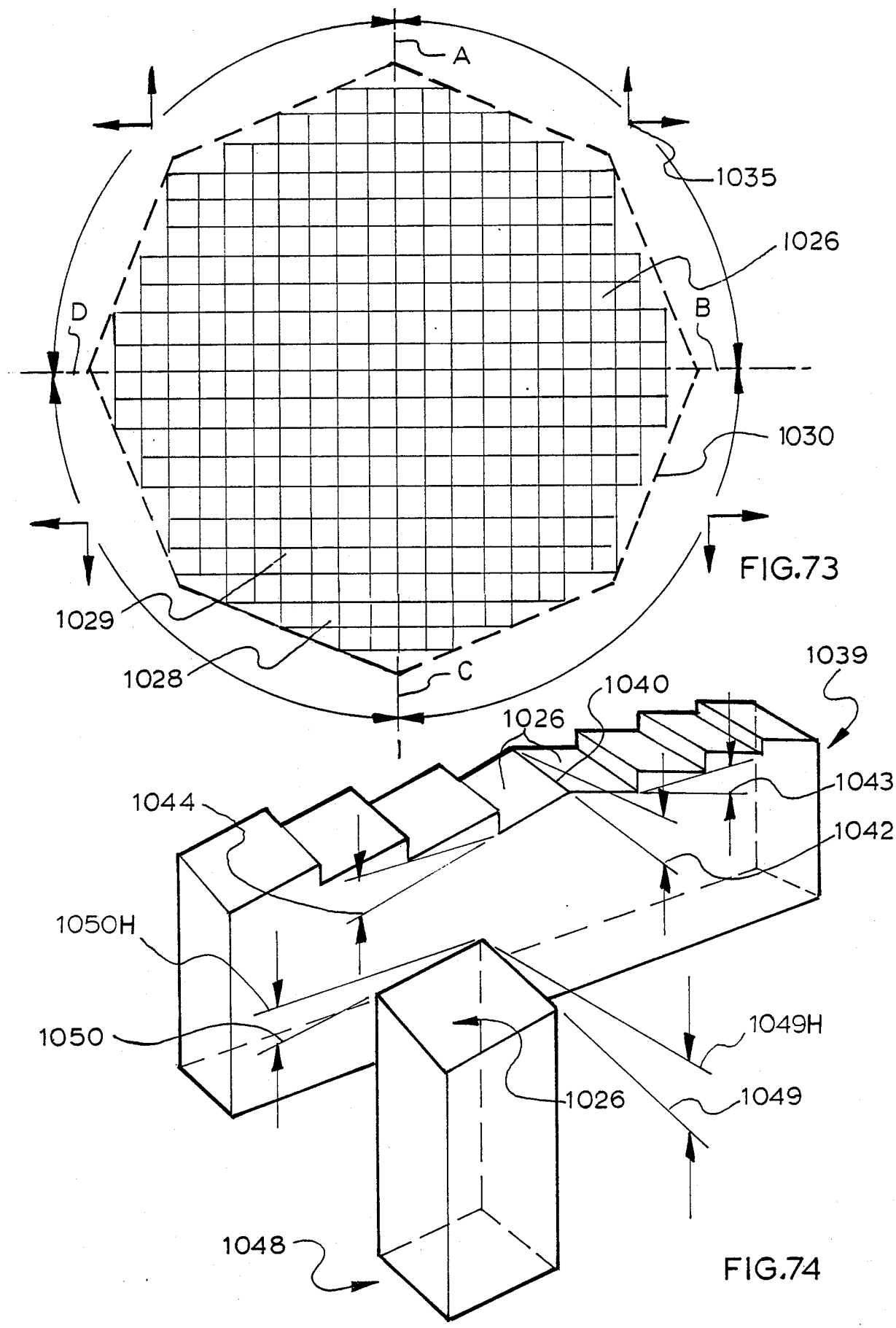
FIG. 73 is a plan view of tooling for making the lens of FIGS. 70-72, parts of the tooling have been illustrated in FIG. 74.
FIG. 74 is a perspective view of the nested bar and nested plate tooling elements removed from FIG. 73. The surfaces of the tooling illustrate the bi-directional inclination of the lens elements with opposite inclination in different sectors of the lens, corresponding with vector indications in FIG. 73.

FIGS. 73 and 74 illustrate two alternative forms of tooling which may be used to form the prismatic elements of lens 906 shown in FIGS. 68-72B. FIG. 73 is a plan view of the forming surfaces of the lens tooling which forms the underside of the lens with its prismatic elements. In this figure, the tooling includes facets 1026 arranged around a central axis within the outline 1030 of the lens. The facets of the tooling have, of course, bi-directional inclination, elevations and horizontal dimensions corresponding precisely to those of the prismatic element emitting surfaces which they are intended to form. Since the directions of inclination of the facets correspond with the directions of inclination of the prismatic elements, the facets 1026 in the tooling are arranged into sectors having vector couples (e.g., 1035) corresponding to those of the emitting surfaces of the lens. Here as in FIGS. 68-72B, the facets of the tooling are divided into four sectors or quadrants defined respectively by radial reference lines A and B, B and C, C and D, and D and A.

According to one of two embodiments of the tooling, both shown in FIG. 74, each facet 1026 may be formed individually on the end of an upright bar 1048, the bi-directional inclination of which is indicated by reference lines 1049 and 1050 and by reference lines 1049H and 1050H, which indicate a horizontal plane. One such bar is indicated by the area 1029 in FIG. 73. To form a complete set of prismatic elements, one may, for example, fabricate as many bars 1048 as there will be prismatic elements in the completed lens, controlling the dimensions of the bars and the angles used in forming their facets 1026 so that the bars and necessary fillers, when assembled into an array corresponding with outline 1030 of FIG. 73, will cause facets 1026 to exhibit the elevations, inclinations and other parameters described in Table II and the succeeding paragraphs. This array may be incorporated into an injection-molding die including the necessary forming members for forming the remaining interior and exterior surfaces of the lens, so that the lens may be molded as a unitary assembly.

As is also shown in FIG. 74, a number of facets may be formed on the edge of plate-type tooling. For example, facets 1026 may be formed along the upper edge of plate-type tooling 1039 standing upright on its opposite edge. Bi-directional inclination of the eight facets 1026 in this tooling is indicate by reference lines 1042 (signifying north/south declination) as well as reference lines 1043 and 1044 (indicating eastward and westward declination). The ridge 1040 separating two groups of four facets 1026 on the tooling corresponds with the boundary between sectors BC and CD in which there are groups of planar inclined surfaces which are respectively inclined for refracting rays in directions which include opposite vectors. Eight squares in a horizontal row which includes square 1028 in FIG. 73 represent the upper surface and facets of the illustrative plate type tooling 1039 of FIG. 74. To form a complete set of prismatic elements, one can fabricate so many pieces of plate type tooling 1039 with varying numbers of facets 1026 at appropriate elevations and angles of bi-directional inclination so that when the plates are assembled with appropriate fillers into an array corresponding with outline 1030 of FIG. 73, the facets will conform to Table II and the other parameters set forth above.

Then, as described above in connection with the bars 1048, the plate-type tooling may be assembled into a die for forming the other surfaces of the lens.

As this disclosure shows to persons skilled in the art of designing and fabricating complex injection molds, the mold surface shown in FIG. 73 may be built up entirely from individual bars 1048, or may be built up entirely from plates 1039 whose lengths and numbers of facets will vary depending upon the number of facets required along a particular north south or east west line in the mold surface. Moreover, plate and bar type tooling may of course be combined in the same mold. In any event, the angles of inclination and the heights of the bar and/or plate tooling will be varied as required to produce the desired shape, size, and elevation in the emitting surfaces, such as for instance have been illustrated by Table II and the related discussion.

The lens tooling can and preferably does contain also the necessary forming members to mold an integral flange around the periphery of the lens. Also, preferably, the flange includes securing means, such as a snap action formation in or connected to the flange, to sealingly engage the lens with the reflector and prevent entry of foreign matter and discourage convection. The lens and reflector can be hermetically sealed to one another, and where the lens and reflector are both formed of synthetic resinous material, heir joinder and sealing may be accomplished by ultrasonic welding.

Figure 75:
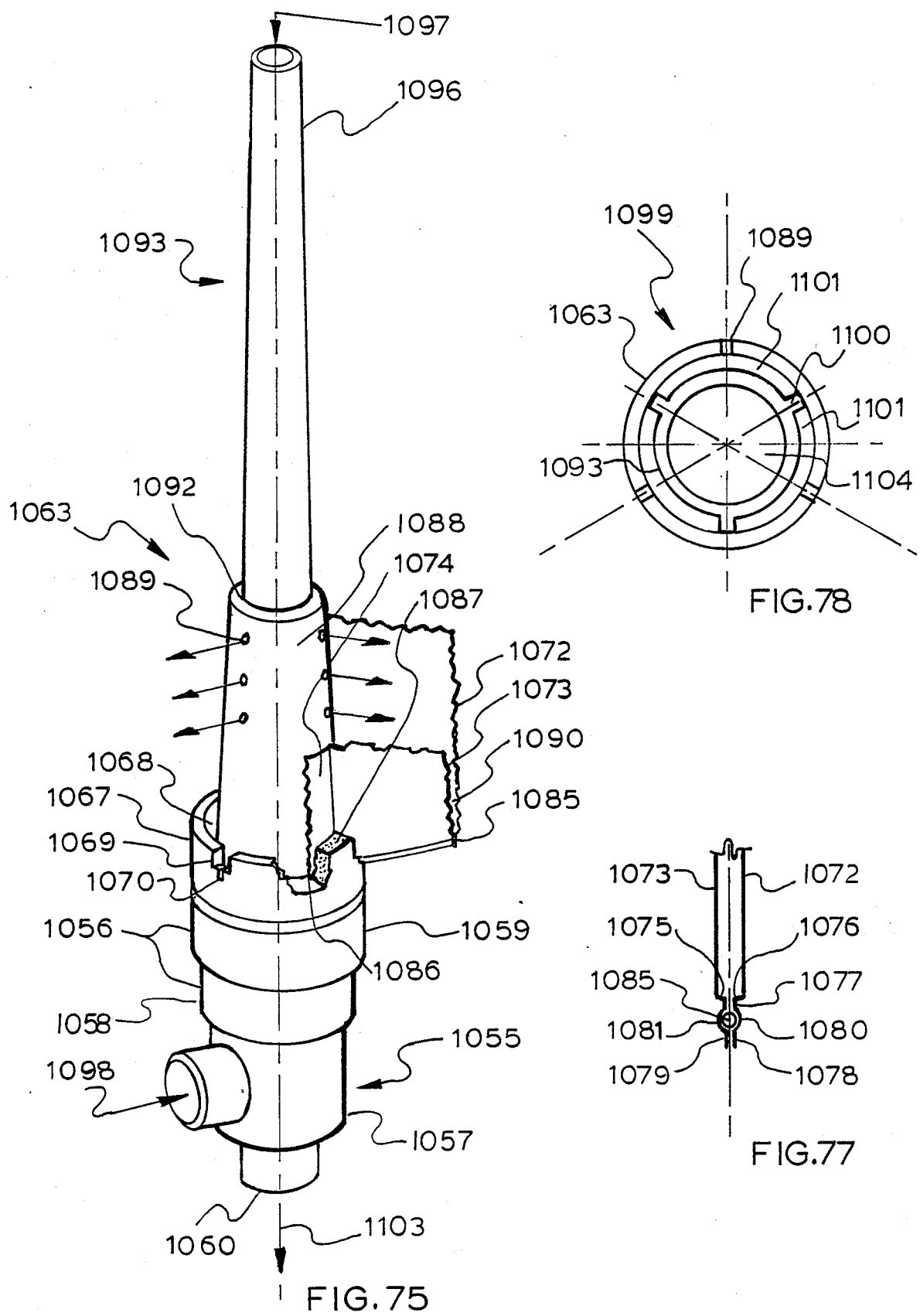
FIG. 75 is a perspective view of fluid control means useful for admitting and discharging heat exchange fluid to and from any of the radiant energy absorbers shown above, and includes a broken out portion of an absorber wing and a mounting arrangement therefor.
Figure 76:
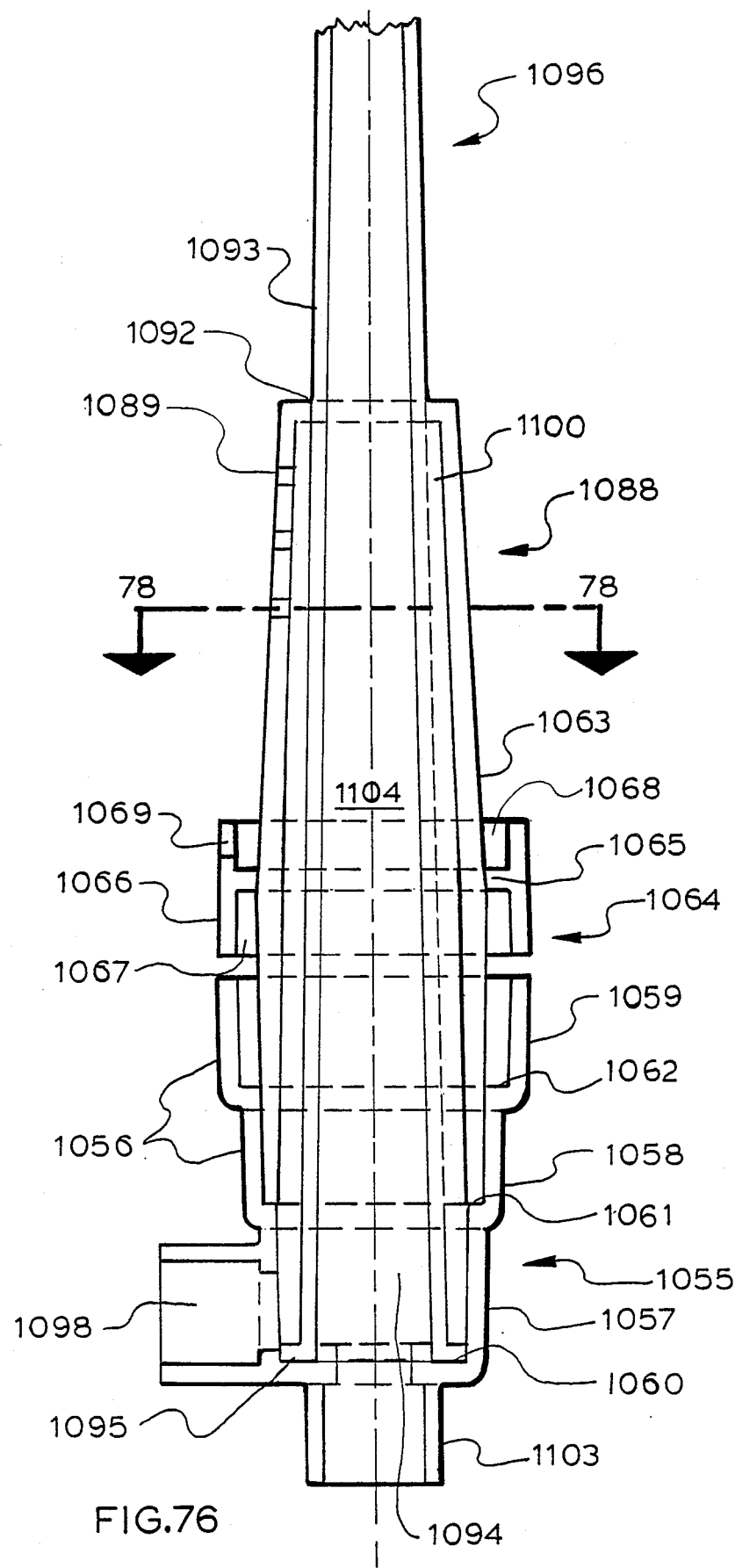
FIG. 76 is a vertical cross-section of the lower portion of the fluid control means of FIG. 75.

FIGS. 75–78 disclose a particularly preferred form of mounting and fluid handling arrangement for the absorber. This mounting combines in one assembly the fitting shown in the bottoms of some of the above-described reflector assemblies (e g. fitting 658 of FIG. 39), as well as a mechanical support for the absorber wings and necessary fluid handling tubes, along with necessary seals. FIG. 75 is a perspective view of the principal components of the device with parts removed for the sake of clarity, while FIG. 76 is a vertical cross-section through the lower portion of the apparatus depicted in FIG. 75. FIG. 77 is a vertical cross-section through the lower edge of an absorber wing shown in part in FIG. 75, and FIG. 78 is a horizontal cross-section through FIG. 76. In FIG. 78, the components have been rotated counter-clockwise 30° from the position they would normally occupy.

Referring together to FIGS. 75–78, the fluid handling and absorber supporting apparatus includes a lower housing 1055 having a stepped outer wall 1056 in which there are two step-wise increases in diameter. Within wall 1056, as best shown in FIG. 76, are a lower receptacle 1057, an intermediate receptacle 1058 and an upper receptacle 1059, having, respectively, a bottom 1060, a first annular ledge 1061 and a second annular ledge 1062. Ledge 1061 serves as the foundation for the bottom of an upright tapered cylindrical shell 1063 whose mid-portion 1064 includes a circumferential flange 1065 which secures a cylindrical skirt 1066 in outwardly spaced relationship with the outer surface of shell 1063. Shell 1063, flange 1065 and skirt 1066 form an inverted receptacle 1067, the cylindrical inner and outer surfaces of which correspond in diameter with the inner and outer surfaces of upper receptacle 1059. During assembly of a collector according to the present embodiment, lower housing 1055 and shell 1063 are assembled in such a manner that these two receptacles enclose a tubular member formed about the aperture 657 in the bottom of the reflector bowl as shown in FIGS. 38 and 39.

The upper portion of skirt 1066, above flange 1065, forms an annular groove 1068 having three notches 1069, formed at angular intervals of 120° around the periphery of groove 1068. As best shown in FIG. 75, each notch 1069 includes a cut 1070 in its lower edge. FIG. 75 also shows in part the central tubular portion 1074 of an absorber and portions of two absorber walls 1072 and 1073 of an absorber wing. The absorber is preferably formed from a single sheet of material so that the upper edges of the absorber wings are formed by folded material, and the lower edges of the absorber wing walls are formed by the marginal edges of the material from which the assembly is formed. It is preferred that the spacing between the two walls which form each absorber wing be relatively narrow, to produce a thin wall of heat transfer fluid within the wing, thereby minimizing temperature stratification in the fluid while promoting rapid and uniform distribution of energy across the large available surface area of the fluid.

In order to provide a liquid tight sealing together of the bottom edges of the absorber wings, they are united in the manner shown in FIG. 77. This seal is provided by forming convergent wall portions 1075 and 1076 extending inwardly from, and along the entire length of, the bottom edges of walls 1072 and 1073. Convergent wall portions 1075 and 1076 abut one another in a first contact zone 1077 which also extends the full length of the bottom edges of wall portions 1075 and 1076. This contact zone is separated, by bulges 1080 and 1081, from flanges 1078 and 1079. The bulges and flanges just mentioned also extend the entire length of the exposed lower edges of the absorber wings. The flat inner surfaces of flanges 1078 and 1079 provide a second contact zone between walls 1073 and 1072. Joining means 1085, such as adhesive or solder, may be provided in the first and second contact zones and within the confined space between bulges 1080 and 1081 to firmly seal the lower edges of walls 1073 and 1072 together.

The absorber tubular portion 1074 has a lower edge 1086. It and the absorber wings are assembled in surrounding relationship to shell 1063 so that lower edge 1086 bears against the floor of groove 1068, while the lower edges of the wing walls extend radially outwardly through notches 1069, the flanges 1078 and 1079 of FIG. 77 extending through the cuts 1070. To provide a mechanically strong and leakproof assembly, a light, heat, moisture and oxidation resistant potting compound 1087 fills groove 1068, cementing the absorber to the remainder of the assembly.

Heat exchange fluid is supplied to the absorber wings through upper portion 1088 of shell 1063 which includes fluid discharge ports 1089 aligned with the interiors of the absorber wings. Ports 1089 are supplied with fluid through manifolds shown in FIGS. 76 and 78. These manifolds are formed in part by central tube 1093, which extends up the center axis of the device. The outer surface of tube 1093 is spaced inwardly from the inside of shell 1063. Longitudinal spacers 1100 projecting radially from the outer surface of tube 1093 engage the inner surface of shell 1063 intermediate fluid discharge ports 1089, as shown in FIG. 78, thus forming a plurality of manifold subpassages 1101. Subpassages 1101 communicate with fluid inlet 1098 through the space separating the outer surface of tube 1093 from shell 1063 and lower receptacle 1057. Spacers 1100 terminate at the bottom of intermediate receptacle 1058 and are therefore omitted from lower receptacle 1057 so that fluid entering through inlet 1098 may freely circulate around the entire perimeter of tube 1093 in the lower receptacle.

The bottom flange 1095 formed at the lower, open bottom end of tube 1093 is sealingly engaged with the bottom 1060 of lower receptacle 1057, while the upper projecting portion 1096 of this tube passes through and is sealingly engaged with a bore 1092 in the upper end of shell 1063. The projecting upper portion 1096 of the tube, which is fully shown in FIG. 75 but only partly shown in FIG. 76, continues upward to an open top end 1097 within and just below the top of the absorber. Heated fluid withdrawn from the upper portions of the absorber wings enters the central tube 1093 at 1097, passes through the open tube interior 1104 and is discharged through the outlet 1103.

The above described embodiments have the property of accepting light from a source as it moves to any position within a predetermined volume of space arranged about the axis of the collector. This volume is characterized by lateral boundaries which extend from the collector out into space and which diverge from one another and from the collector axis at progressively greater distances from the collector. For certain of the embodiments already shown, this volume has a shape substantially resembling that of a geometrical cone or a regular polyhedron, whereby the cross-sectional areas of these volumes, as viewed in planes perpendicular to the collector axis, define what are substantially symmetrical figures such as circles or polygons.

The shapes of the aforementioned volumes and cross-sectional areas are dictated by the shape of the lens and the orientation of the prismatic elements therein. It is a feature of the invention that any suitable shape of lens may be employed, resulting in a diversity of shapes in the resulting volumes and cross-sectional areas within which light will be accepted. Of course, variation in the shape of the lens may in most if not all circumstances require corresponding alteration in the shape of the reflector and the absorber. With the benefit of these teachings, the examples given herein an their own background knowledge, persons skilled in the art should be able, without undue experimentation, to fabricate alternative embodiments of the invention of varying shape.

From the standpoint of an observer or solar collector in the northern hemisphere facing in a southerly direction, the apparent change in the direction of the sun's rays as projected on a horizontal, east-west plane will substantially exceed the angular change in the projection of those rays upon a vertical, north-south plane. Hence, for many if not all seasons of the year, collectors constructed according to the invention can capture larger quantities of solar radiation (without the use of expensive tracking devices) by providing increased acceptance angles in easterly and westerly directions without requiring the same large acceptance angles in northerly and southerly directions. Collectors with lenses having shapes differing from those of FIGS. 1-78 may be used to take advantage of the difference in acceptance angle requirements in the N-S and E-W directions.

Figure 79:
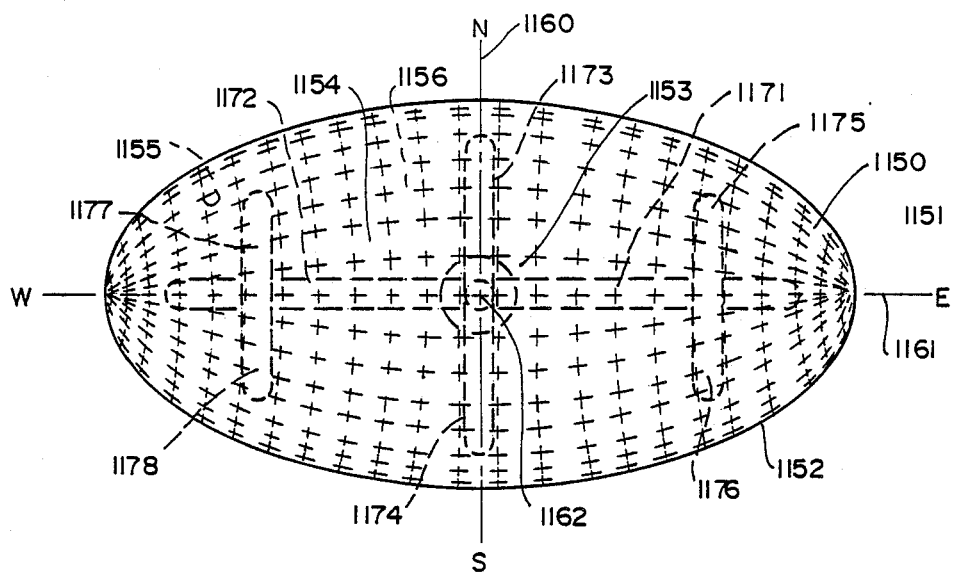
FIG. 79 is a top view of still another embodiment of the collector of the present invention in which the lens has an oval perimeter and cross-sections.

For example, use of an oval (e.g. elliptical) lens and reflector makes it possible to extend or maximize the radiation acceptance angle in an east-west direction while restricting the acceptance angle, or providing only so much as may be required, in a north-south direction. This is illustrated by the embodiment disclosed in FIGS. 79 and 80. In the collector 1150 shown in plan view in FIG. 79, the lens 1151 as viewed from above has an oval shape at its perimeter 1152 and its horizontal cross-sections at various elevations between the lens perimeter and its apex 1153 are also oval. As in prior embodiments the upper surface 1154 of the lens is smoothly curved while its under surface 1155 is composed of bi-directionally inclined small prismatic elements 1156 with planar lower surfaces as in the embodiments of FIGS. 38-78, which may be square as shown or rectangular.

Reference characters N-S and E-W identify north-south reference planes 1160 and 1161 respectively, which each include the lens and collector vertical axis 1162. Plane 1161 corresponds with the longest dimension of the lens oval. Together, the planes 1161 and 1162 divide the lens into four quadrants, in which the respective prismatic elements are bi-directionally inclined in directions which correspond with the directional vectors AB, BC, CD and DA of FIGS. 68-71. Individual prismatic elements preferably have linear or planar lower surfaces whose angle of declination in the horizontal or east-west direction differs from the angle of declination in the vertical or north-south direction for limiting the vertical and increasing the horizontal solar ray input. For example, the vertical slope of a typical element relative to the outer or first surface of the lens (e.g. 20 degrees) may be steeper than the horizontal slope of that same element relative to the outer surface (e.g. 10 degrees).

Figure 80:
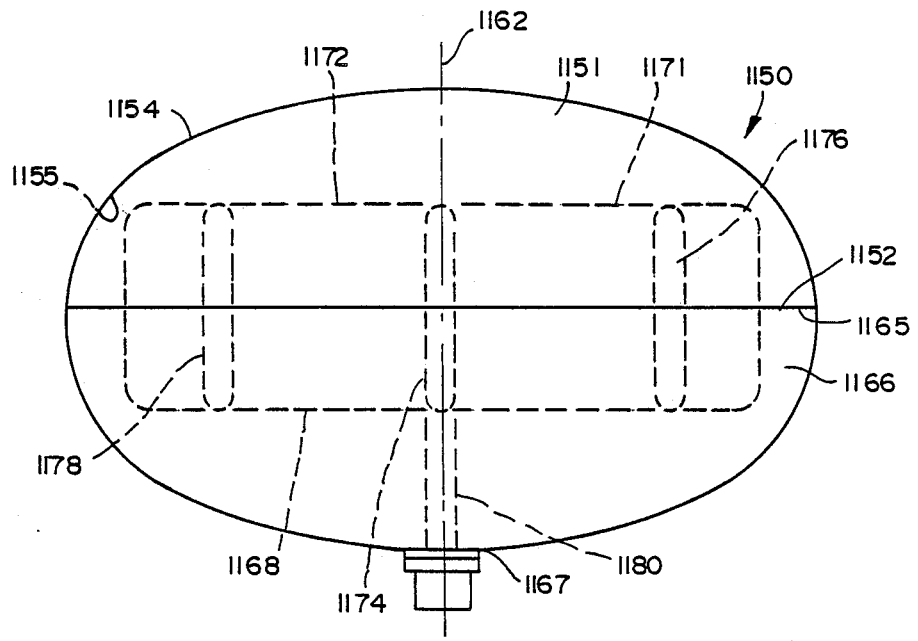
FIG. 80 is a side view of the collector of FIG. 79.

As in the prior embodiments the lens perimeter 1152 is mated to the correspondingly shaped mouth 1165 of a cooperating reflector 1166 as shown in side view in FIG. 80. Between its mouth and its bottom 1167, the horizontal cross-sections of the reflector (perpendicular to the collector axis 1162) are oval. An absorber assembly 1168 is located within the central void defined and surrounded by the lens and reflector. When employing an oval lens and reflector as shown, it is recommended that additional wings be provided in the absorber assembly. Thus, the absorber of the present embodiment not only has long east and west wings 1171 and 1172, and shorter north and south wings 1173 and 1174, but also auxiliary north-south wings, including auxiliary wings 1175 and 1176 supported on and perpendicular to east wing 1171, and auxiliary wings 1177 and 1178 supported on and perpendicular to west wing 1172. The entire absorber assembly may be mounted on and in communication with concentric fluid-carrying conduits 1180 (similar to those of FIGS. 75-78).

In this embodiment, the reflector shape, lens shape, angles of declination of the prismatic elements and absorber shape are selected to continue to direct substantially all of the incident radiation in a concentrated but unfocussed radiation onto the absorber assembly 1168 as the radiation source moves anywhere in a predetermined pseudo-conical volume. This volume may for example be characterized by an acceptance angle of 50 degrees in the vertical or north-south plane and 100 degrees or more (e.g. 130 degrees) in the east-west or horizontal plane, and by oval cross-sections throughout the volume.

Best Mode

Many features of the best mode for practicing the invention will be apparent to persons skilled in the art as a result of reviewing the foregoing disclosure. Many features of the best mode, as contemplated by the inventor, have been specifically discussed above. The discussion which follows, interpreted and augmented according to the knowledge of persons skilled in the art, is intended to complete the inventor's best mode disclosure.

According to the inventor's present opinion, the invention's best use is as a solar energy collector. In designing solar collectors intended to give optimum performance in accordance with the principles of the invention, the following guidelines should be followed. A fundamental principle of design which contributes to optimum performance is distributing the incident flux widely and reasonably uniformly over the available surface area on the absorber wings. Thus, the collector parameters, including prismatic element aiming, are selected to distribute rather than focus energy at the absorber surface. The prismatic elements are aimed, i.e., their emitting surface inclinations are selected, so that as the angle of incidence varies, the incident flux continues to be widely and reasonably uniformly distributed over the available surface area on the absorber wings.

Refer to prior portions of this disclosure for specific examples of prismatic element aiming, i.e., angles of declination, and for discussions of horizontal and vertical control of the incident energy and the use of such control in spreading the flux on the absorber surfaces individually and collectively for increasing the uniformity of distribution. In this connection, it is beneficial to provide the lens with a large number of relatively small prismatic elements as illustrated above, so that many elements can feed energy to the same absorber surface and distribute that energy widely over the available surface.

However, when winged absorbers are used, some concentration of the available energy upon those portions of the wings containing the hottest portion of the heat exchange fluid can be of assistance in providing the necessary thermal gradient to insure a good rate of heat transfer. Since provision of some concentration of this type represents the best mode for practicing the invention, it is embodied in the specific examples discussed above. Of assistance in attaining such concentration is the repetition of the same angles of declination in the emitting surfaces of pairs of adjacent prismatic elements, as has been illustrated in the specific examples set forth above.

The best mode for practicing the invention also involves concentration in another sense. Although the incident energy is distributed widely over the available absorber surfaces rather than being focused, the reflector is shaped and proportioned, and the prismatic elements are aimed, to distribute the rays of the beam of incident flux onto a total active absorber area which is substantially smaller than the cross-sectional area of the beam. An indication of this may be seen in the comparison of the lens area with the total "area" of the liquid "film" in the absorber wings. A 3 to 1 ratio is considered best. In this ratio, the lens area is expressed in terms of the projected area of the lens in plan view, while the liquid "film" in each absorber is considered to have only one "surface", so that the area of the film is not the total area of its front and back sides, but rather the area of only one of those sides. Expressing this same concept in different terms, about 1.5 is considered the best ratio of projected lens area to total absorber wing surface area, including the areas of both surfaces of all absorber wings.

The body of liquid present in the absorber wing chambers is described as a "film" because it is considered best from the standpoint of rapid and efficient heating if its thickness, which will normally be the same as the spacing between the internal walls of the absorber wings, should be as small as possible. However, in actuality, if the thickness of this "film" were too small, the device would have insufficient throughput capacity. Therefore, a wing interior wall spacing of about one tenth of an inch is considered optimum, with spacings of up to 0.25 inches or more being contemplated.

Another principle used in designing for optimum performance is that the size, shape, number and angular distribution of the absorber wings; the size and shape of the reflector; and the size, distribution and aiming of the prismatic elements of the lens, as well as the lens radius, are selected to maintain a balanced distribution of direct and indirect transmission of radiant energy to the absorber throughout the range of acceptance angles for which a given unit is designed. More specifically, the foregoing parameters are adjusted so that as the angle of incidence of radiation varies within the desired range of acceptance angles, the amounts of energy distributed to wings facing toward the energy source is kept in balance with the amount of energy distributed to wings facing away from the source. As has been illustrated by specific examples given above, the sizes, shapes and positions of the collector components are selected and the prismatic elements are aimed, i.e., their emitting surface inclinations are selected, so that as the angle of incidence varies, variable but balanced proportions of the incident energy will continue to be distributed (a) directly from some of the prismatic elements to absorber wing surfaces facing toward the radiant energy source and (b) indirectly from other prismatic elements, by way of reflection on the reflector, to other absorber wing surfaces facing away from the energy source.

Other design factors contribute to optimum efficiency by minimizing the extent to which incident radiation, having entered the collector, can traverse various paths within the collector and then find its way back out through the lens, thus escaping without absorption. These include disposition of the bottom portions of these walls so that they have a significant angular elevation from the horizontal and disposition of the upper portions of the reflector walls so that they are vertical or approaching vertical. This may for example be accomplished when working with polygonal reflectors whose wall segments describe arcs when viewed in vertical cross-section, through appropriate placement of the generating loci of such arcs and through the use of arcs of differing radii in the same wall segment. This has been illustrated in the specific embodiments of FIGS. 39 and 58 and the related portions of the foregoing description. Inclination of the reflector walls near the bottom cooperates with the prismatic elements to ensure capture on the absorber of incident radiation which enters the lens on a path parallel or nearly parallel to the reflector axis and is transmitted indirectly from the elements to the absorber by reflection in the bottom of the reflector. Vertical or near vertical upper reflector wall portions cooperate with the upward components of refraction imparted by the prismatic elements to minimize opportunities for escape in the indirect transmission of incident radiation to the absorber when the incident radiation is approaching the maximum acceptance angle.

From the standpoint of minimizing escape of rays without absorption, it is also considered best for the elements to be aimed and for the remaining collector parameters to be selected so that as much as possible of the indirectly transmitted radiation will pass from the lens to the absorber with a single impingement on the reflector. Preferably, the components are positioned for passing at least about 70%, more preferably at least about 80%, still more preferably at least about 90% and most preferably substantially all of the indirectly transmitted flux from the respective prismatic elements to the absorber with a single intervening reflection from the reflector surface. Minimizing opportunities for rays passing from the lens to experience second reflections on the reflector while passing to the absorber minimizes opportunities for reflected rays to escape from the collector without impingement on the absorber. Of assistance in this regard is the use of a large overall radius of curvature in the lens. Note that in the specific example set forth above, the ratio of the spherical radius of the lens to the maximum width of the reflector exceeds 1.5 and in this example approaches 2, i.e., 57.7/30. Also of assistance for this purpose is the use of polygonal reflector walls and absorber wings which point into and approach as close as possible to the reflector wall segment intersections.

While the absorber surface will normally be of very low reflectivity, polygonal reflector walls and absorber wings which closely approach the reflector wall segment intersections are also potentially useful for trapping any energy which impinges upon and is reflected from the absorber wing surfaces. In the type of structure just described, when polygonal reflector walls are disposed at acute angles and adjacent to the absorber wing surfaces, they tend to trap absorber reflections by redirecting them to the absorber wings, including for example that wing surface nearest the point on the reflector at which such redirecting occurs. Use of three or more absorber wings having six absorbing surfaces positioned upright at a variety of angular positions about the collector axis provides the designer with more opportunities to aim prismatic elements so that light coming from varied source positions will be directed more nearly normal to the absorber surfaces; and the ensuing fact that any energy reflected from the absorber surfaces will depart those surfaces on a more nearly normal path facilitates their capture by re-reflection from the reflector wall segments to the absorber.

FIGS. 38-42, 49-54B, 57-61, 68-72B and 75-78, discussed above, relating to hexagonal and octagonal devices, are believed to represent the best configurations for the lens, reflector and absorber. At present, the inventor does not possess the information required to establish whether the hexagonal or octagonal design is superior overall, as compared to the other. However, it is apparent that each may be found superior over the other in certain specific aspects and circumstances. Thus, the octagonal lens design with rectangular prismatic elements can be manufactured with less costly tooling, while the hexagonal lens design, which appears more compatible with the more costly ring-configuration prismatic elements, leads to collectors which can be more closely grouped in compact arrays. However, the octagon is not lacking in compactness or rigidity.

While the hexagon is readily fabricated in the preferred lens face to liquid film area ratio of 3:1, the presently preferred mode of fabricating the absorber from folded copper sheet, when applied to the three-winged absorber which is preferred for use with hexagonal lenses and reflectors, involves use of a circular blank with ensuing waste of material in cutting out the blank. While the four-winged absorber is preferred for use with octagonal lenses and reflectors and avoids this wastage because it can be formed from a square blank of copper, it is considered that the three-winged absorber involves simpler and less costly sealing operations. Moreover, the three-winged absorber may represent the best compromise between absorber simplicity (number of wings) and ability to capture reflected radiation that might otherwise avoid interception by the absorber and escape through the lens.

The energy collection efficiencies of the hexagonal and octagonal designs have not yet been compared. Thus, the user is left to choose between the hexagonal and octagonal designs, depending on which of the above-mentioned relative advantages of the two designs is considered most important for the user's particular application of the invention. Except where the contrary is indicated, the following discussion is applicable to both types of devices.

From the standpoints of efficiency in performance, economical construction, and simplicity of assembly, the best mode is believed to include injection molded plastic lens and reflector components which enclose a winged absorber component to provide a permanently sealed assembly. Described below are tooling methods for use in producing an injection molded lens and reflector with precise optical features, as well as assembly methods which assure the correct orientation of the lens and reflector with the absorber and fluid control component. The lens is an optical product and requires precision workmanship in tooling and molding.

In its best mode, the lens has a smooth first or upper surface of uniform radius and a second or inner surface, a major portion of which surface is occupied by prismatic elements having radiation emitting surfaces which slope outward from the lens central axis and downward from its lower surface. The slope of each emitting surface is such that the angle between it and the portion of the lens upper surface above it is less but only slightly less than the critical angle beyond which rays incident to that element within the normal operating range of the unit will be reflected rather than refracted. This assures correct performance of the optics. Optical flat surfaces are employed in the tooling and molding of the emitting surfaces. An SPE-SPI standard #2 finish is used on the molding surface of a cavity mold which forms the lens upper surface and on optical flats (including the draft angles) in the surface of a plug mold used to form the prismatic elements and inner surface. Outer flange and ultra sonic weld points on the lens may be a standard #5 finish.

Where the tooling system for the plug mold surface employs nested square bars with selected angles ground on the top face of each bar as shown in FIGS. 73-74, the bar stock should be of uniform width for nesting and may require grinding to achieve such uniformity. The length of each bar is determined by the curvature of the lens face and the distance between the position of the bar and the lens central axis. Two-way vector angles on the tops of the bars are ground and polished to an optical flat while holding the bars in a fixture. Exact duplicates may be ground and polished in the same manner. Otherwise the fixture is re-set as required.

If correctly ground, polished and assembled, the high points of the respective flats in the tooling will present an array of points distributed on a curved "surface" which is spaced apart from but generally corresponds with the curvature of the outer lens face, and preferably is of slightly longer radius to allow sufficient space between the flats and the opposed inner surface of the mold to permit flow of molten plastic material between the plug and cavity molds. It is best if the volume of each prismatic element is substantially less than the volume of the adjoining portion of the shell, to avoid localized sinking of the lens face. For stress free molding the mold gate should be located on the axis or center of the lens face. This results in substantially equal distances from the gate to all points on the outer rim of the mold, providing uniform distribution and cooling of the plastic material in the mold.

An acrylic plastic (transparent colorless) material with maximum heat resistance is considered best for injection molding of the lens. A well molded lens will result in uniform sharp corners on the individual prismatic elements. A visual check of the lens with reflected light will reveal optical flats or variations in the optics.

The reflector is also an optical product. Precision and uniformity in tooling and molding of the reflector and its facets are important contributing factors to attainment of highest performance. In general, the reflector is also injection molded, with a plug whose surface conforms to the facets in the reflector interior surfaces, and with a mold cavity conforming to the outer surface of the reflector.

The outline of the reflector upper edge corresponds with that of tee outer and lower edge of the lens. The reflector facets are each of the same width and appear to have flat sides when viewed in horizontal planes. The facets appear as developed curves when viewed in vertical planes. These curves start at the top edge of the reflector and continue downward to the flanged hole located on the reflector vertical centerline. Two radius points are specified to generate each curved reflector facet, with the radius points located on the opposite side of the reflector vertical centerline. Specific locations are shown in FIGS. 39 and 58, discussed above.

It is anticipated that close tolerances should be maintained on the reflector curvature and on the parallelism of the opposing reflector facets. There should be an SPE-SPI #2 finish on the reflecting area of the reflector. All other surfaces may be finished with a standard #5 finish. It may be convenient to divide the tooling for the plug and the cavity into eight segments to facilitate exact reproduction of the reflector facets. This may also result in uniform polish of the segment surfaces.

Structural ribs and flanges are provided on the reflector exterior surface. Ribs extend the entire length of the intersections between the sides of the facets to prevent sinks in the reflector surfaces. These ribs extend upwards from the sides of the flange surrounding the hole at the bottom of the reflector, to the underside of an outwardly extending flanged ring at the top edge of the reflector.

An ABS (Acrylonitrile-Butadiene-Styrene) or Lexan (Polycarbonate) plating grade resin is considered best for fabricating the reflector. Chrome plating is applied on the inside surface o the reflector and is limited to the area within the top edge downwards to the upper edge of the flanged hole. This provides virgin material for ultra-sonic welding at the upper and lower flange locations.

There are several significant inter-relationships between the lens and reflector. These components and the respective prismatic elements and element sectors are configured to cause at least the majority of reflected light to be reflected but once before encountering the absorber. Also, the components are arranged to spread the light across substantially more than half of, and preferably over substantially all of the available absorber surface at any given angle of incidence of light (relative to the lens and reflector central axes) throughout a substantial range of, and preferably throughout substantially all of such angles of incidence, including variations in the angle of elevation and azimuth. Also, the lens and reflector are preferably configured so that impingement of flux on the absorber is substantially restricted to portions of the absorber surface at and below the level of liquid within the absorber. From the standpoint of efficient heating of heat transfer fluid it is considered best to arrange the angles of declination of the prismatic elements, the radii of the reflector walls and the dimensions of the absorber wings to distribute the flux on the wings so that the flux impinges at a higher rate per unit area on the upper elevations of the wings than on the lower elevations thereof. Thus, assuming the fluid within the wings is cooler at the lower elevations, the foregoing rate differential is sufficient to maintain an adequate thermal gradient for heating the warmer or hotter fluid at the higher elevations. It is also considered beneficial to control the contour of the bottom portion of the reflector so that those rays which enter the lens at small horizontal distances from the axis and which are parallel to the axis reflect from the bottom portion in a direction that will lead to impingement of the resultant reflected rays on the absorber at elevations which are about one third of the way up the overall height of the absorber.

As presently contemplated, the absorber comprises a winged component and an injection molded plastic three piece fluid control core (FIGS. 75–78) which are installed so that they are centered upon the reflector/lens axis. The winged absorber is die-formed from a sheet of copper. For a four-winged absorber, the sheet is first die stamped to provide a hole at the axis. A soldering ridge is formed at the edges of the sheet, also by die stamping. This sheet is then folded into three or four wings which enclose a thin walled fluid space (0.125 to 0.25 inches wide) in each wing. The adjacent edges of the wing walls are then joined together by inserting a solder rod into the solder ridge (as shown in FIG. 77) and are sealed with the aid of heat and clamping. The entire outer surface of the winged copper absorber is then black chrome plated for maximum absorption of solar energy.

The absorber fluid control system consists of an assembly of three injection molded plastic sleeve components which nest together tightly for assembly by ultrasonic means as described in connection with FIGS. 75–78. This assembly provides for fluid input involving directing streams of liquid into the cavity of each wing, and an internal tube for evacuation of heated fluid.

The fluid control system components may be formed in injection molds having an SPE-SPI #5 finish for convenient release of parts from the molds. Polysulfone, polypropylene or similar resin is required for structural and heat resistance characteristics, as well as for ultra-sonic welding requirements.

A simple step-by-step procedure for assembly of the collector module is outlined below, utilizing ultra-sonic welding techniques.

(1) The winged copper absorber component may be potted in the top groove of the middle fluid control component (shell 1063 of FIGS. 75 and 76) with the wings extending through the notches provided. See FIG. 75. Alternatively, the wing assembly may be sealed in the groove by ultra-sonic welding of plastic wedge inserts into the groove to lock the absorber in position.

(2) The assembled winged copper absorber and middle fluid control component is then ultra-sonic welded to the ring flange at the bottom of the reflector component (see FIGS. 39, 58, and 76) with the wings oriented so they point into the groins of the valleys formed by the wall intersections of the polygonal reflector (see FIGS. 41 and 60).

(3) The top (inside) fluid control tube component (central tube 1093 of FIGS. 75 and 76) is then ultrasonic welded to the bottom component (lower housing 1055 of FIGS. 75 and 76). Additional ultra-sonic welds between these components are provided as described in connection with FIG. 76. This assures a permanent upright and correct orientation of the winged absorber.

(4) The assembly prepared in step (3) is then inserted through the ring flange at the bottom hole of the reflector and ultra-sonic welded to complete the assembly of all the components.

Pressure tests should be conducted to assure permanent ultra-sonic bonds between the foregoing components before completing the assembly of the lens to the reflector. The lens should be assembled with the prismatic elements and the respective sectors oriented with respect to the reflector and absorber as shown in FIG. 49 or FIG. 68. Finally, ultra-sonic welding of the lens to the reflector results in a solar energy collector module which is permanently sealed and ready for attachment to a source and an outlet for heat exchange fluid.

To maintain high levels of effectiveness without the necessity of tracking, the optics, reflector, and absorber of the solar energy collector module may be configured to capture incident radiation throughout a cone with an apex angle of 90 degrees surrounding the central axis of the device. This makes possible a fixed position orientation for all seasons of the year, if the module axis is positioned in a plane perpendicular to the earth's surface which includes the sun at solar noon and if the elevation of the module axis is midway between the two extremes of winter and summer sun elevations at solar noon. Between the equator and 60° north or south latitude, the optimum elevation for the collector axis, measured in degrees relative to the horizontal at the collector location, will be substantially the same as the number of degrees of earth latitude at that location. Alternate orientations include a horizontal installation for summer and a vertical installation for winter use. Other orientations of the module may be selected to compensate for trees or other intercepting items.

In many locations in which the invention will be used, the distance through which the sun appears to move from east to west will considerably exceed its apparent change in elevation. Put differently, at such locations, the change in the angle of azimuth of the sun during the day, measured relative to a plane which includes the collector axis at solar noon, is greater than the change in sun elevation during the day. Thus, for a fixed collector to operate efficiently when oriented in the optimum manner described above, it need not accommodate to as much apparent north-south change in sun position as it must in the east-west direction. For this reason, it is not essential that the prismatic elements of the lens be arranged to capture incident radiation throughout a cone, i.e., the acceptance angle need not be uniform in all directions surrounding the collector axis. In fact, the lesser need to accommodate north-south change provides an opportunity to utilize some of the capacity available for absorbing north-south change to increase the capacity available to absorb east-west change. Accordingly, it appears possible to design collectors in which the elements are oriented so as to maximize acceptance angle in the east-west direction at the expense of north-south acceptance angle. For purposes of designing and building such a unit, prismatic elements arranged between intersecting parallel lines and the above-described bar tooling for forming such elements ideally provide the required degree of freedom and flexibility needed in the establishment of varying inclinations in the emitting surfaces of the prismatic elements. On the other hand, a unit of this type has certain limitations, including greater criticality of the collector axis angle of elevation and diminished ability to accommodate to the larger seasonal changes in sun elevation which are characteristic of greater earth latitudes.

Due to its potential for fabrication in light weight designs the device can be conveniently supported in a plywood panel at a solar input location. Expansion and contraction features will be necessary. For example, the collector may be mounted in the plywood panel in a hole large enough to accommodate it in its expanded condition, and an outwardly extending flange at the upper edge of the reflector or outer edge of the lens may be secured to the face of the panel by a hold-down ring which includes means to confine the flange while permitting it to move parallel to the face of the panel throughout its range of expansion and contraction.

CLAIMS:

The foregoing embodiments are intended to illustrate but not limit the invention, except insofar as may be required by the teachings of the prior art. It should be understood that possession of the foregoing disclosures will enable persons skilled in the art to produce a wide variety of modifications of the foregoing embodiments which will nevertheless embody principles of the present invention; and it is intended that the accompanying claims should protect such modifications. Accordingly, the accompanying claims are intended to be construed as broadly as the prior art will permit to protect the full scope of applicant's invention and all equivalents thereof.

I claim:

1. A radiant energy collector for receiving and collecting incident radiation, comprising:
    A. an absorber;
    B. reflector means surrounding the absorber and having an upright axis and a concave reflective inner surface distributed about the axis for reflecting said radiation onto the absorber; and
    C. a lens member extending across the axis of and above the reflector means for receiving an energy flux from a source of radiant energy and having a plurality of prismatic elements distributed about the reflector axis in the lens member for
        (1) receiving incident radiation on one side of the axis from a source located on the other side of the axis, the axis being viewed perpendicular to a plane including the axis and passing through the source, and
        (2) maintaining, during variation of the angle of incidence between the incident radiation and the axis as viewed in said plane, refraction of the incident radiation and emission of the resultant refracted radiation through emitting surfaces of said elements which are inclined for continuing during such variation, to direct radiation away from the source, above the absorber and toward the reflector with an upward component of refraction as compared to the inclination of the incident radiation and to distribute the resultant reflected radiation across a portion of the absorber which faces away from the source, whereby re-reflection and loss of rays can be controlled and the collector can operate efficiently throughout a substantial range of angles of incidence.

2. Apparatus according to claim 1 wherein said lens means comprises a plurality of concentric annular ring portions, causing varying degrees of refraction of incident radiation passing therethrough.

3. Apparatus according to claim 2 wherein said ring portions comprise at least one divergent ring portion for causing the divergent refraction of incident radiation passing therethrough and at least one convergent ring portion for causing convergent refraction of incident radiation passing therethrough.

4. Apparatus according to claim 3 wherein said convergent portion substantially surrounds said divergent portion.

5. Apparatus according to claim 4 wherein said concentric annular ring portions further comprise a neutral portion intermediate of said convergent and divergent portions for transmitting radiation to said reflector and said absorber along a path substantially parallel to the angle of incidence of said radiation.

6. Apparatus according to claim 4 wherein each of said convergent and divergent portions comprises a plurality of concentric ring sections for producing varying degrees of refraction of radiation transmitted therethrough.

7. Apparatus according to claim 4 wherein said lens means further comprises a substantially central double convex portion.

8. Apparatus according to claim 1 wherein said absorber is a winged member which comprises a thin-walled chamber formed from a continuous sheet of material.

9. Apparatus according to claim 8 wherein said absorber is formed by stamping and drawing said sheet of material into a plurality of wings, and wherein said absorber further comprises a base having a continuous slot defined therein to receive the lower terminal edges of said wings.

10. A radiant energy collector for receiving and collecting incident radiation, comprising:
I. an absorber;
II. reflector means surrounding the absorber and having an upright axis and a concave reflective inner surface distributed about the axis for reflecting said radiation onto the absorber; and
III a lens member extending across the axis of and above the reflector means for receiving an energy flux from a source of radiant energy and having a group of prismatic elements distributed in one or more arrays substantially throughout a working portion of the lens and substantially surrounding the axis, in which arrays individual elements are positioned at progressively greater distances from the axis and in which the horizontal dimensions of the majority of the elements, whether arranged in circular patterns or not, are sufficiently small to individually fit between pairs of radial lines separated by an angular interval of about 15 degrees or less, said prismatic elements having emitting surfaces formed in the underside of the lens member and being inclined for A. maintaining, during relative variations of about 20° or more in the source elevation and azimuth measured from and upon a plane perpendicular to the axis at the bottom of the reflector, refraction of the incident radiation and emission of the resultant refracted radiation, and B. continuing, during such variations, to
1. direct radiation away from the source, above the absorber and toward the reflector with an upward component of refraction through the emitting surfaces of prismatic elements representing a substantial portion of the members of said group, the composition of which portion progressively shifts among different members of said group in response to said relative variations in source elevation and azimuth, and
2. distribute the resultant reflected radiation across a portion of the absorber which faces away from the source, whereby re-reflection and loss of rays can be controlled and the collector can operate efficiently throughout a substantial range of variation of the azimuth and elevation of the incident radiation.

11. Apparatus according to claim 10 wherein there are about 100 or more of said elements in said group.

12. Apparatus according to claim 10 wherein the horizontal dimensions of the majority of the elements are sufficiently small to individually fit between pairs of radial lines separated by an angular interval of about 12° or less.

13. Apparatus according to claim 10 wherein the relative variations of the source elevation and azimuth are about 45° or more.

14. A radiant energy collector comprising:
A. a concave reflector having a reflective inner surface, a mouth and a central axis;
B. an absorber having a plurality of generally upright, angularly distributed wings extending outwardly from said axis in said reflector; and
C. a lens member positioned above said absorber across the mouth and the axis of said reflector and including a plurality of prismatic elements distributed upon said lens member for:
(1) receiving incident radiation on one side of the axis from a source located on the other side of the axis, the axis being viewed from a position perpendicular to a plane including the axis and passing through the source, and
(2) maintaining, during variation of the angle of incidence between the incident radiation and the axis as viewed in said plane, refraction of the incident radiation and emission of the resultant refracted radiation through emitting surfaces of said elements which are inclined for continuing during such variation, to direct radiation away from the source, above the absorber and toward the reflector with an upward component of refraction as compared to the inclination of the incident radiation and to distribute the resultant reflected radiation across an absorber wing surface facing away from said energy source, whereby the re-reflection and loss of rays is controlled and said collector can operate efficiently throughout a substantial range of angles of incidence.

15. A radiant energy collector comprising:
   A. a concave reflector having an upright absorber therein and a lens member mounted above said absorber;
   B. said concave reflector, as viewed in vertical cross-section, having bottom and side walls including portions which are more nearly vertical than horizontal and an upright axis upon which said lens member and absorber are positioned;
   C. said absorber including a plurality of wing members having energy absorbing walls of substantial surface area oriented substantially upright and defining opposite sides of the respective wing members;
   D. said lens member, as viewed in plan view, comprising a plurality of prismatic elements which are distributed in one or more arrays in a working portion of the lens member extending about said axis;
   E. said prismatic elements, as viewed in vertical cross-section, having receiving and emitting surfaces which, within individual elements, diverge from one another and which are oriented and positioned in said lens member for:
      (1) receiving on both sides of said axis the incident rays of an incoming flux from an energy source at varying angles of incidence within a predetermined range of acceptance angles measured relative to said axis, said acceptance angles being measured in, and said axis and rays being viewed along a line of sight perpendicular to, a plane including said axis and passing through said energy source;
      (2) emitting departing rays into a space defined by the walls of said reflector and causing
         (a) a first portion of the flux, including a portion of the rays which entered the lens on the side of the axis farthest from the source when viewed along a line of sight perpendicular to said plane, to pass through the lens, to refract toward adjacent side walls of the reflector and to impinge upon and reflect from the reflector surface at higher impingement elevations than would occur in the absence of the divergence of said receiving and emitting surfaces of said prismatic elements and
         (b) a second portion of the flux, including a portion of the rays which entered the lens on the side of the axis nearest the light source when viewed along a line of sight perpendicular to said plane, to pass directly from the lens to the absorber; and
      (3) cooperating with said reflector and absorber for directing portions of said flux to opposite sides of the wing members,
   F. whereby said reflector, lens and absorber have the capability of promoting retention of emitted and reflected rays within said space.

16. A collector according to claim 15 wherein said reflector bottom and side walls are connected by a transition which includes upper and lower arcuate intervals having upper and lower generating loci respectively, the upper locus being further horizontally from the axis than the lower locus, and the distance between the upper arcuate interval and its generating locus being greater than the distance between the lower arcuate interval and its generating locus.

17. A collector according to claim 15 wherein, as viewed in plan view, said absorber comprises three of said wing members at angular intervals of about one hundred twenty degrees from one another, said reflector bowl side wall segments form hexagonal figures having six corners, and said wing members extend towards alternate corners in said hexagonal figures.

18. A collector according to claim 15 wherein, as viewed in plan view, said absorber comprises four of said wing members at angular intervals of about ninety degrees from one another, said reflector bowl side wall segments form octagonal figures having eight corners, and said wing members extend towards alternate corners in said octagonal figures.

19. A collector according to claim 15 wherein said prismatic elements, as viewed in the plan view of said lens, are arrayed in concentric rings about said axis, a first group of emitting surfaces in a first sector of the lens face being inclined for refracting rays in a direction including a clockwise vector about said axis, and a second group of emitting surfaces in a second sector of the lens face being inclined for refracting rays in a direction including a counter-clockwise vector about said axis, whereby refraction with both clockwise and counter-clockwise vectors both (a) minimizes energy losses by preferentially routing rays from said emitting surfaces to said absorber and (b) spreads such rays over the absorber surfaces when fluxes enter the absorbers at angles of incidence on both sides of said axis, as viewed perpendicular to said plane.

20. A collector according to claim 15 wherein said prismatic elements are of substantially rectangular outline, said one or more arrays include elements whose edges extend along first and second intersecting sets of parallel lines, and first and second groups of emitting surfaces in first and second sectors of the working portion of the lens member are respectively inclined for refracting rays in directions which include opposite vectors.

21. A radiant energy collector according to claim 15 wherein said emitting surfaces are generally planar, bi-directionally inclined surfaces oriented and positioned in said lens member for causing said first portion of the flux to refract with both upward and sideward components of refraction toward adjacent side walls of the reflector and to reflect from said reflector to said absorber wing surfaces.

22. A collector according to claim 21 wherein said reflector bottom and side walls are connected by a transition which includes upper and lower arcuate intervals having upper and lower generating loci respectively, the upper locus being further horizontally from the axis than the lower locus, and the distance between the upper arcuate interval and its generating locus being greater than the distance between the lower arcuate interval and its generating locus.

23. A collector according to claim 21 wherein, as viewed in plan view, said absorber comprises three of said wing members at angular intervals of about one hundred twenty degrees from one another, said reflector bowl side wall segments form hexagonal figures having six corners, and said wing members extend towards alternate corners in said hexagonal figures.

24. A collector according to claim 21 wherein, as viewed in plan view, said absorber comprises four of said wing members at angular intervals of about ninety degrees from one another, said reflector bowl side wall segments form octagonal figures having eight corners, and said wing members extend towards alternate corners in said octagonal figures.

25. A collector according to claim 21 wherein said prismatic elements, as viewed in the plan view of said lens, are arrayed in concentric rings about said axis, a first group of emitting surfaces in a first sector of the lens face being inclined for refracting rays in a direction including a clockwise vector, and a second group of emitting surfaces in a second sector of the lens face being inclined for refracting rays in a direction including a counter-clockwise vector about said axis, whereby refraction with both clockwise and counterclockwise vectors both (a) minimizes energy losses by preferentially routing rays from said emitting surfaces to said absorber and (b) spreads such rays over the absorber surfaces when fluxes enter the absorbers at angles of incidence on both sides of said axis, as viewed perpendicular to said plane.

26. A collector according to claim 21 wherein said prismatic elements are of substantially rectangular outline, said one or more arrays include elements whose edges extend along first and second intersecting sets of parallel lines, and first and second groups of emitting surfaces in first and second sectors of the working portion of the lens member are respectively inclined for refracting rays in directions which include opposite vectors.

27. A radiant energy collector according to claim 15 wherein said lens member is convex and generally spherical.

28. A radiant energy collector according to claim 21 wherein said lens member is convex and generally spherical.

29. A radiant energy collector for receiving rays of an incident flux from an external energy source throughout a range of acceptance angles extending to at least about twenty degrees away from opposite sides of a central axis of said collector and measured in a plane passing through said source and including said axis, said collector comprising:

A. a concave reflector bowl having a reflective internal surface and a convex lens member secured to one another to provide an enclosed cavity between them, said reflector bowl and lens member each being arranged in a substantially symmetrical manner about said axis;

B. an upright absorber mounted within said cavity, said absorber including a plurality of wing members extending laterally from said axis and toward the inner surfaces of the reflector bowl, said wing members having energy absorbing walls of substantial surface area defining opposite sides of the respective wing members, oriented substantially upright and defining confined fluid heating passages between them;

C. said concave reflector bowl having a ratio of axial depth to width at its mouth of about 0.6 - about 0.7 to one, and being defined at least in part by a plurality of side wall segments arranged substantially symmetrically about said axis and forming generally polygonal figures with straight or gently curved sides as viewed in plan view or horizontal cross-sections, said side wall segments narrowing in width as they draw progressively nearer the bottom of the bowl, and, as viewed in vertical cross-section, extending downwardly from an upper portion of the bowl while curving inwardly towards said axis, D. said inwardly curving side wall segments, within a working portion of the reflector bowl viewed in vertical cross section, transitioning from upper side wall portions, which are substantially upright, to a more nearly horizontal orientation as said segments draw nearer to the bottom of the bowl and to said axis, the resultant transition including one or more arcuate intervals of such side wall segments which have been generated from at least one generating locus which is located above, and on the opposite side of said axis from, the position(s) of said interval or intervals;

E. said lens member having an overall shape which is generally spherical and comprising a plurality of inwardly projecting prismatic elements which, as viewed in plan view, are distributed in one or more arrays in a working portion of the lens member extending about said axis;

F. said prismatic elements, as viewed in vertical cross-section, having receiving and emitting surfaces which, within individual elements, diverge from one another, said emitting surfaces being generally planar, bi-directionally inclined surfaces, the angle of inclination of said emitting surfaces in at least one of said directions approaching within about twenty percent of, but being less than, the critical angle which will cause rays be to reflected by the emitting surfaces back through the lens when the radiation is incident upon the lens member at the maximum acceptance angle, said prismatic elements being oriented and positioned in said lens member for:

(1) receiving on both sides of said axis the incident rays of said incoming flux which enter the lens member at varying angles of incidence within said predetermined range of acceptance angles; said acceptance angles being measured in, and said axis and rays being viewed along a line of sight perpendicular to, a plane including said axis and passing through said energy source;

(2) emitting departing rays into said enclosed cavity and causing:

(a) a first and portion of the flux, including a portion of the rays which enter the lens on the side of the axis farthest from the source to pass through the lens when viewed along a line of sight perpendicular to said plane, to pass through the lens member, to refract with both upward and sideward components of refraction toward adjacent side wall segments of the reflector and to impinge upon and reflect from said side wall segments at locations which are positioned laterally for impingement upon the absorber wing surfaces, and which are higher than would occur in the absence of the bi-directional inclination of said receiving and emitting surfaces of said prismatic elements and (b) a second portion of the flux, including a portion of the rays which entered the lens on the side of the axis nearest the source when viewed along a line of sight perpendicular to said plane, to pass directly from the lens to the absorber; and (3) for cooperating with said reflector and absorber for directing portions of said flux to opposite sides of the wing members; and G. said absorber wings extending sufficient distances outwardly from and both upwardly and downwardly in directions perpendicular and parallel to said axis, for intercepting substantially all or a major portion of the rays emitted by said prismatic element emitting surfaces as the angle of incidence of said flux varies throughout said range of acceptance angles, there being sufficient separation between the underside of the lens member and the top of the absorber for light emitted by the lens member on one side of the axis to pass over the top of the absorber to a surface of the reflector located on the other side of the axis when viewed from a position perpendicular to said plane;

whereby said reflector bowl and lens member exert both horizontal and vertical control over the path of the rays emitted into said cavity toward said reflector and, with said absorber, promote retention of emitted and reflected rays within said cavity.

30. A radiant energy collector according to claim 15, 16, 17, 18, 19, 20, 21, 22, 23, 24, 25, 26, 27 or 28 wherein said range of acceptance angles extends to at least about twenty-two and one-half degrees when viewed from a position perpendicular to said plane as said plane moves with the radiation source through a range of azimuth angles of at least about 90°; said prismatic elements are distributed substantially throughout at least about 50% of the area of the working portion of the lens member, viewed in plan view; and said prismatic elements are positioned in said array or arrays for causing the first portion of the flux to include the major portion of the total flux entering the working portion of the lens member when the flux is approaching its maximum acceptance angle, and for causing an amount of flux ranging from a major portion to substantially all of the total flux entering the working portion of the lens member to impinge upon the surfaces of the wing members as radiant energy enters the lens member throughout said range of acceptance angles.

31. Apparatus according to claim 14, 15, 16, 17, 18, 19, 20, 21 or 29 wherein said absorber wings or wing members have outer surfaces defined by walls which enclose fluid chambers within said wings or wing members, and said collector includes means for introduction and withdrawal of heat transfer fluid into and from said chambers.

32. A radiant energy collector according to claim 14, 15, 16, 17, 18, 19, 20, 21, 27, 28 or 29 wherein a first group the inclined surfaces of the prismatic elements in at least a first sector of the lens faces are inclined in a first direction for refracting rays with vectors having a gives horizontal senses or orientation, and a second group of the inclined surfaces of the prismatic elements in at least a second sector of the lens face are inclined for refracting rays in a second direction with vectors divergent from said given sense or orientation.

33. A radiant energy collector according to claim 14, 15, 16, 17, 18, 19, 20, 21, 17 or 29 wherein said prismatic elements are distributed about the reflector axis and are inclined for maintaining, during relative variations of about 20° or more in the source elevation and azimuth respectively measured from and upon a plane perpendicular to the axis at the bottom of the reflector, refraction of the incident radiation and emission of the resultant refracted radiation through emitting surfaces of the prismatic elements, and for continuing, during such variations, to direct radiation away from the source, above the absorber and toward the reflector with an upward component of refraction as compared to the inclination of the incident radiation and to distribute the resultant reflected radiation across a portion of the absorber which faces away from the source, whereby re-reflection and loss of rays can be controlled and the collector can operate efficiently throughout a substantial range of variation of the azimuth and elevation of the incident radiation.

* * * * *